US012405184B1

(12) United States Patent
Klicpera

(10) Patent No.: US 12,405,184 B1
(45) Date of Patent: Sep. 2, 2025

(54) WATER METER AND LEAK DETECTION SYSTEM

(71) Applicant: Michael Edward Klicpera, Incline Village, NV (US)

(72) Inventor: Michael Edward Klicpera, Incline Village, NV (US)

( * ) Notice: Subject to any disclaimer, the term of this patent is extended or adjusted under 35 U.S.C. 154(b) by 0 days.

(21) Appl. No.: 18/517,292

(22) Filed: Nov. 22, 2023

(51) Int. Cl.
*G01M 3/26* (2006.01)
*G05B 13/02* (2006.01)
*G06Q 10/20* (2023.01)
*G06Q 50/06* (2012.01)
*H04W 12/037* (2021.01)

(52) U.S. Cl.
CPC ........... *G01M 3/26* (2013.01); *G05B 13/0265* (2013.01); *G06Q 10/20* (2013.01); *G06Q 50/06* (2013.01); *H04W 12/037* (2021.01)

(58) Field of Classification Search
CPC ..... G01M 3/26; G05B 13/0265; G06Q 10/20; G06Q 50/06; H04W 12/037
See application file for complete search history.

(56) References Cited

U.S. PATENT DOCUMENTS

| | | | |
|---|---|---|---|
| 2,283,525 | A | 5/1942 | Witham |
| 5,284,523 | A | 2/1994 | Badami et al. |
| 5,580,791 | A | 12/1996 | Thorpe |
| 5,660,198 | A | 8/1997 | McClaran |
| 5,719,564 | A | 2/1998 | Sears |
| 5,971,011 | A | 10/1999 | Price |
| 6,105,607 | A | 8/2000 | Caise et al. |
| 6,181,257 | B1 | 1/2001 | Meek |
| 6,246,677 | B1 | 6/2001 | Nap |

(Continued)

OTHER PUBLICATIONS

ModHopper, The Extended Range http:/www.obvious/Products/R9120-5 May 2009.

(Continued)

*Primary Examiner* — Mohammad Ali
*Assistant Examiner* — Saad M Kabir
(74) *Attorney, Agent, or Firm* — Michael E. Klicpera

(57) ABSTRACT

The present invention is a system comprised of a water meter collection node (i.e., water meter or base station) with a water flow rate sensor(s), water valve control mechanism (water shut-off/on), and leak detection capability. The system uses wireless transceiver technology to communicate with a private or corporate network, or to communicate via an internet connection. The system transfers encrypted water data and information via application programming interface to remote computers and/or server, enabling access of the water data and information by remote electronic communication devices. The water meter collection node is configured to communicate with an authenticated communication hub that functions to extend the range of wireless transmissions of the collection node. The communication hub can by wire or wirelessly communicate with an internet router and transfers water data and information to an internet connection. The collection node(s) and/or communication hub(s) can wirelessly communicate with a private or commercial network system, and to a remote computer/server and/or a cloud service. One or more communication hubs can function as repeater apparatuses and/or can perform complex operations such as using mesh technology, or point-to-point or peer-to-peer connections.

20 Claims, 13 Drawing Sheets

(56) References Cited

U.S. PATENT DOCUMENTS

| | | |
|---|---|---|
| 6,397,687 B1 | 6/2002 | Gamas |
| 6,539,968 B1 | 4/2003 | White |
| 6,543,479 B2 | 4/2003 | Coffey et al. |
| 6,556,142 B2 | 4/2003 | Dunstan |
| 7,012,546 B1 | 3/2006 | Zigdon |
| 7,103,511 B2 | 9/2006 | Petite |
| 7,124,452 B1 | 10/2006 | Bauza |
| 7,360,413 B2 | 4/2008 | Jeffries et al. |
| 7,605,717 B2 | 10/2009 | Olson |
| 7,626,511 B2 | 12/2009 | Lazar |
| 7,671,480 B2 | 3/2010 | Pitchford et al. |
| 7,711,796 B2 | 5/2010 | Gutt et al. |
| 8,013,732 B2 | 9/2011 | Petite et al. |
| 8,073,931 B2 | 12/2011 | Dawes et al. |
| 8,086,702 B2 | 12/2011 | Baum et al. |
| 8,086,703 B2 | 12/2011 | Baum et al. |
| 8,122,131 B2 | 2/2012 | Baum et al. |
| 8,209,400 B2 | 6/2012 | Baum et al. |
| 8,214,496 B2 | 7/2012 | Gutt et al. |
| 8,217,804 B2 | 7/2012 | Laughlin-Parker |
| 8,269,651 B2 | 9/2012 | Zigdon |
| 8,279,080 B2 | 10/2012 | Pitchford et al. |
| 8,335,842 B2 | 12/2012 | Raji et al. |
| 8,451,986 B2 | 5/2013 | Cohn et al. |
| 8,473,619 B2 | 6/2013 | Baum et al. |
| 8,477,011 B2 | 7/2013 | Tubb et al. |
| 8,478,844 B2 | 7/2013 | Baum et al. |
| 8,478,871 B2 | 7/2013 | Gutt et al. |
| 8,539,827 B2 | 9/2013 | Benson |
| 8,602,384 B2 | 12/2013 | Williamson |
| 8,612,591 B2 | 12/2013 | Dawes et al. |
| 8,621,206 B2 | 12/2013 | Chang |
| 8,625,722 B2 | 1/2014 | Rouquette |
| 8,635,499 B2 | 1/2014 | Cohn et al. |
| 8,638,211 B2 | 1/2014 | Cohn et al. |
| 8,644,804 B2 | 2/2014 | Blackwell et al. |
| 8,713,132 B2 | 4/2014 | Baum et al. |
| 8,819,178 B2 | 8/2014 | Baum et al. |
| 8,825,871 B2 | 9/2014 | Baum et al. |
| 8,833,390 B2 | 9/2014 | Ball |
| 8,836,467 B1 | 9/2014 | Cohn et al. |
| 8,843,241 B2 | 9/2014 | Saberi et al. |
| 8,878,690 B2 | 11/2014 | Olson |
| 8,893,320 B2 | 11/2014 | Klicpera |
| 8,963,713 B2 | 2/2015 | Dawes et al. |
| 8,988,221 B2 | 3/2015 | Raji et al. |
| 8,996,665 B2 | 3/2015 | Baum et al. |
| 9,019,120 B2 | 4/2015 | Broniak et al. |
| 9,047,753 B2 | 6/2015 | Dawes et al. |
| 9,059,863 B2 | 6/2015 | Baum et al. |
| 9,061,307 B2 | 6/2015 | Klicpera |
| 9,100,446 B2 | 8/2015 | Cohn et al. |
| 9,141,276 B2 | 9/2015 | Dawes et al. |
| 9,144,143 B2 | 9/2015 | Raji et al. |
| 9,147,337 B2 | 9/2015 | Cohn et al. |
| 9,172,553 B2 | 10/2015 | Dawes et al. |
| 9,253,754 B2 | 2/2016 | Sanderford |
| 9,266,136 B2 | 2/2016 | Klicpera |
| 2002/0148515 A1 | 10/2002 | Coffey et al. |
| 2003/0210151 A1 | 11/2003 | Kimberlain et al. |
| 2003/0227387 A1 | 12/2003 | Kimberlaln et al. |
| 2003/0233885 A1 | 12/2003 | Bird et al. |
| 2004/0069345 A1 | 4/2004 | Doan |
| 2004/0193329 A1 | 9/2004 | Ransom |
| 2005/0065755 A1 | 3/2005 | Mccarter et al. |
| 2008/0001104 A1 | 1/2008 | Voigt |
| 2008/0149180 A1 | 6/2008 | Parris et al. |
| 2008/0183842 A1 | 7/2008 | Raji et al. |
| 2008/0295895 A1 | 12/2008 | Vincent et al. |
| 2009/0035121 A1 | 2/2009 | Watson et al. |
| 2009/0090663 A1 | 4/2009 | Hirata et al. |
| 2009/0096586 A1 | 4/2009 | Tubb |
| 2009/0206891 A1 | 8/2009 | Guimont |
| 2009/0215110 A1 | 8/2009 | Gibson et al. |
| 2009/0303055 A1 | 12/2009 | Anderson et al. |
| 2010/0082744 A1 | 4/2010 | Raji et al. |
| 2010/0207017 A1 | 8/2010 | Horiuchi |
| 2011/0035063 A1 | 2/2011 | Palayur |
| 2011/0186154 A1 | 8/2011 | Klicpera |
| 2011/0303310 A1 | 12/2011 | Klicpera |
| 2011/0303311 A1 | 12/2011 | Klicpera |
| 2012/0030460 A1 | 2/2012 | Chang |
| 2012/0273069 A1 | 11/2012 | Klicpera |
| 2012/0305084 A1 | 12/2012 | Ball |
| 2014/0082351 A1 | 3/2014 | Chang |
| 2014/0238511 A1 | 8/2014 | Klicpera |
| 2015/0204701 A1 | 7/2015 | Klicpera |
| 2016/0076909 A1 | 3/2016 | Klicpera |
| 2016/0163317 A1 | 6/2016 | Klicpera |
| 2016/0378322 A1 | 12/2016 | Klicpera |
| 2019/0234786 A1 | 8/2019 | Klicpera |
| 2019/0281371 A1 | 9/2019 | Klicpera |

OTHER PUBLICATIONS

ModHopper, The Extended Range http:/www.obvious/Products/R9120-May 5, 2009.

FIG. 10

Water Use

Average Time: [ 10 ▼ ] minutes

Average Water Use: [ 25 ▼ ] gallons / minute

Average Cost: $ [ 2.00 ▼ ] / 1000 gallons

Water Heater Use

Energy Type: [ Natural Gas ▼ ]

State: [ California ▼ ]

Cost: $ [ 1.789 ▼ ] per therm

Efficiency: [ .927 ▼ ]

Water Temp: [ 55 ▼ ] °F

Temperature:
[ Hot ▼ ]
[ 115 ] °F

Water Use (gallons)

|  | Day | Week | Month | Year | Five Year |
|---|---|---|---|---|---|
| Water | 25 | 175 | 750 | 9125 | 45625 |
| Energy | 0.194 | 1.359 | 5.824 | 70.858 | 354.290 |

Water Cost

|  | Day | Week | Month | Year | Five Year |
|---|---|---|---|---|---|
| Water | $0.05 | $0.35 | $1.50 | $18.25 | $91.25 |
| Energy | $0.23 | $1.60 | $6.87 | $83.54 | $417.71 |
| Total | $0.28 | $1.95 | $8.37 | $101.79 | $508.96 | ns); Amazon Side-
WATER METER AND LEAK DETECTION SYSTEM

FIELD OF THE INVENTION

This apparatus and the method of use relates to water supply systems. More particularly, the invention relates to a water meter and leak detection system for private and/or public property to monitor and provide water use and water leak information and to minimize water loss and related damage.

BACKGROUND OF THE INVENTION

Water is increasingly becoming a precious resource. While fresh water supplies have been challenged due to climate (short rainy seasons and long droughts) and increased pollution, water demand has been rising due to the growing population along with increased development. The increasingly limited supply of fresh water is a humanitarian concern and water conservation is becoming a major issue for many communities. An apparatus for real-time monitoring of water use, and real-time detection of leak conditions at private and/or public property (e.g., residential structures and yards, business/industrial/commercial facilities, and governmental/institutional sites) can be useful in assessing and controlling water resources and supporting water conservation.

Water losses to private and/or public properties caused by broken or compromised water pipes and by unobserved leaks are enormous. Broken or compromised water pipes are often undetected, for example when the property owner is absent or sleeping, and the resulting water loss and property damage can be catastrophic, Property insurance agencies report that a significant portion of total insurance losses are water related. It has been found that losses due to water leaks in residential homes can amount to a significant percentage of the total water use.

SUMMARY OF THE INVENTION

The water meter and leak detection system monitor real-time water use and provides real-time leak detection and notification, alert, or alarm for private and/or public property (e.g., residential structures and yards, business/industrial/commercial facilities, and/or governmental/institutional sites). The present invention connects in series to the water supply for one or more private and/or public properties. This invention comprises a water meter collection node and an optional communication hub. The collection node is essentially a water meter which can include: one or more water flow rate sensors, one or more optional water control valve mechanisms, one or more optional temperature sensors, one or more optional pressures sensors, one or more optional acoustic sensors, and wireless radio technology. Use of the optional communication hub extends the wireless range capability. The communication hub can also serve as a repeater apparatus or access point for receiving signals or commands and transmitting water data and information while providing longer wireless range capability. In this capability the communication hub functions as a repeater or an access point to communication with an internet or network. The water meter collection node 10 and optional communication hub can utilize wireless technology(ies) including: long range wireless technology such as Li-Fi, LoRa, Sigfox, WiMAX, Ultra Narrow Band (UNB), NB-IoT, M-Bus, 6LoWPAN, standard Wi-Fi, Wi-Fi versions 3/4/5/6, and WiFi7 (with Wi-Fi extenders); Amazon Sidewalk technology; established cellular technology, 3GPP, LTE-M, 4G, and 5G; limited range technology such as standard Wi-Fi, Bluetooth, Bluetooth low energy (BLE), Zigbee, and Z-wave; other wireless technology; and wired and wired technology such as X10, universal powerline bus (UPB), HART Communications Protocol.

In one embodiment, the water meter collection node utilizes Wi-Fi version 3/4/5/6, WiFi7, Li-Fi, LoRa, Sigfox, Ultra Narrow Band, 6LowPAN, NB-IoT, M-Bus, WIMAX, or Amazon Sidewalk transceiver(s); or standard cellular technology, LTE-M, 3GPP, 4G, or 5G cellular transceiver(s) that communicates with a private or corporate network. In another embodiment, the collection node utilizes Wi-Fi version 3/4/5/6, WiFi7, Li-Fi, LoRa, Sigfox, Ultra Narrow Band, 6LowPAN, NB-IoT, M-Bus, WIMAX, or Amazon Sidewalk transceiver(s); or standard cellular technology, LTE-M, 3GPP, 4G, or 5G cellular transceiver(s) that communicates with a communication hub that has a corresponding Wi-Fi version 3/4/5/6, WiFi7, Li-Fi, LoRa, Sigfox, Ultra Narrow Band, 6LowPAN, NB-IoT, M-Bus, WIMAX, or Amazon Sidewalk transceiver(s); or standard cellular technology, LTE-M, 3GPP, 4G, or 5G cellular transceiver(s). The communication hub can also have a Wi-Fi versions 3/4/5/6, Wi-Fi7, or Li-Fi second radio that communicates with a wireless router. The communication hub can also serve as a repeater device, receiving signals and commands and transmitting water data, and can provide longer wireless range capability. Bluetooth, Bluetooth low energy (BLE), Zigbee, or Z-Wave can also be used for shorter range communications. The wireless communication technology can utilize and communicate with an application programming interface (API) protocol, a simple object access protocol (SOAP), a representational state transfer (REST) protocol, or another API technology. The API interface generally resides within a remote server and its software code allows two programs to efficiently communicate with each other such as for website presentation and cell/smart phone communication. The wireless technology is in a half duplex format or in a full duplex format, such as when the water use is monitored and transmitted to a remote server while the leak detection capability needs to send a signal to control the water control valve mechanism (an operational procedure). The wireless technology(ies) transfers data through a private or corporate network system or through a router connected to the internet. The wireless methods of transfer communicate water use, water leaks, and/or water quality data to remote server(s) with database(es). The water meter and leak detection system is connected to the water supply piping and, on water flow event basis or on a demand basis, monitors water data from the main water supply line for a private and/or public property. The present invention can be used with private and/or public water sources such as private wells and other non-municipal related water sources. The remote server and database can be used to support a computer portal that registered users or owners of designated cell or smart phones, computers, or similar apparatuses can use to access and observe water use, leak conditions, and/or water quality parameters for relevant private and/or public property.

The housing of the water meter and leak detection system collection node and optional communication hub can be fabricated from materials of technologies that provide moist and wet conditions, hot environments, and cold/freezing protection properties. The water meter and leak detection system includes a central processing unit (CPU), microprocessor and/or microcontroller, data storage memory, timing and wireless circuitry, water flow rate sensors, optional water quality sensors, optional pressure sensors, optional acoustic sensors, and an optional power generation technology. The types of water flow sensor(s) can be invasive type (i.e., located within water pipe and exposed to the water source; e.g., turbine sensor), non-invasive (i.e., located outside water pipe and isolated from the water source; e.g., ultrasonic sensor), and/or sensitive water flow sensors (e.g., pressure sensor). The water meter and leak detection system has the capability to utilize several different sensors to accomplish the goals of real-time monitoring water use and detecting leaks and performing leak detection analysis. Furthermore, the water meter and leak detection system can monitor separately indoor and outdoor water use or can monitor one or more designated areas of one or more sites. Optionally, a temperature sensor can be incorporated into the water meter collection node to determine, communicate, and address temperature conditions, e.g., assess freezing conditions (water temperature is approaching 32 degrees Fahrenheit or 0 degrees Celsius) and to communicate with the property structure's thermostat or heating system to maintain a specified temperature within the structure, drain water from pipes, and/or perform other damage protection methods. The optional pressure sensor, with associated use of the control valve, can be used for detecting extremely small leaks. This is accomplished by shutting off the water supply with the control valve and monitoring pressure over a period (an operational procedure). The resulting loss of pressure can be shown e.g., by graphical decay curves. The pressure sensor monitors pressure patterns and establishes pressure signatures for leak detection analysis that identifies type of small leak, e.g., leaking faucet, leaking toilet flapper valve.

The water meter and leak detection system with water control valve mechanism(s) can be shut-off/on manually or by a programmed or set command or schedule using a cell or smart phone, computer, or other electronic apparatus (an operational procedure). The water meter and leak detection system can be programmed to follow a work, vacation, or other custom schedule. The water meter and leak detection system can be set to automatically shut-off the water control valve mechanism when the property is un-occupied or vacant. The occupancy of the property can be determined by feedback from electronic lock(s), passive infrared sensor(s) (PIRs), alarm(s), security system(s), or other security devices. Furthermore, the water meter and leak detection system is designed with electrical and communication circuitry to send a signal to the cell or smart phone, computer, or other electronic apparatus that the water supply line is on or off.

The water meter and leak detection system provides wireless remote leak detection and notification, alert, or alarm using water flow event or water flow event basis monitoring and software analysis. Alternately, continuous data monitoring can be stored in a data module in the water meter collection node and periodically transferred wirelessly to a remote computer or server for leak detection analysis. The water meter and leak detection system monitors water use and detects non-typical, abnormal, or continuous water use and alerts, signals, or messages via a cell or smart phone, computer, or similar apparatus to one or more property owners, users, responsible individuals, or monitoring facilities, of any water leak condition(s). Thus, leak notification can be provided when the property is vacated or unsupervised.

The water meter and leak detection system's collection node communicates with a private or commercial network system or communicates with the optional communication hub through a router to the internet.

The water meter and leak detection system's collection node with shut-off/on or water control valve mechanism can be battery operated and can utilize re-chargeable batteries or super capacitators. The re-chargeable components can be connected to electrical generation means such as a water turbine generator(s), solar cell(s), or wind generation means to supplement electrical energy. The water meter and leak detection system with shut-off/on or water control valve mechanism can be AC or DC powered.

Finally, many other features, objects and advantages of the present invention will be apparent to those of ordinary skill in the relevant arts, especially considering the following discussions, drawings, detailed descriptions, and claims.

BRIEF DESCRIPTION OF THE DRAWINGS

FIG. 1 also shows several methods of wireless capability for the water meter and leak detection system to communicate water use and leak detection and analysis information to a remotely located cell or smart phone, computer, or similar apparatus, FIG. 1 shows wireless communication by the property owner and/or municipal representative using a custom display/recorder for a governmental, civil, commercial, or municipal operators or agencies. In one example, FIG. 1 shows a wireless means for communicating directly to an offsite central monitoring computer using long range wireless technology and/or telephone lines via satellite, microwave technology, the internet, cell tower, telephone lines, and other similar technology.

FIG. 10 is an illustration of an "APP" or programmed application that provides water use data in various example formats that is transferred from the water meter collection node to a database allowing access for a remote display/recording apparatus, web portal or a cell or smart phone, computer, or similar apparatus.

Figure 1:
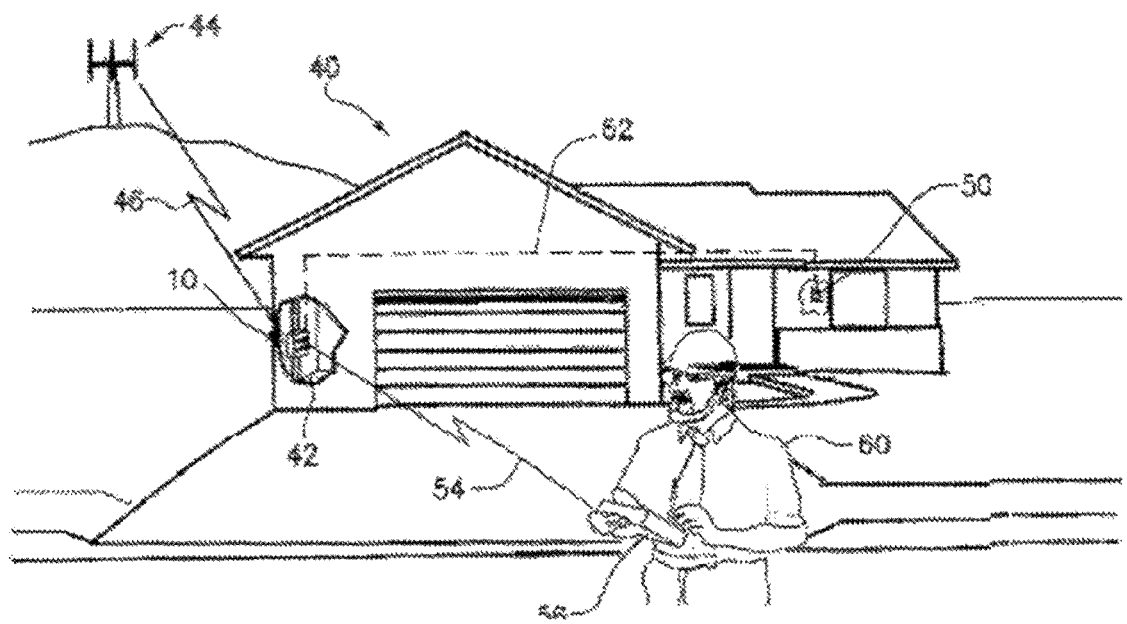
FIG. 1 is an illustration of the embodiment comprising a water meter and leak detection system connected to the water supply piping to monitor water use and detect leak(s) for an example property, a residential structure.

The figures are not intended to be exhaustive or to limit the disclosed technology to the precise form disclosed. It should be understood that the disclosed technology can be practiced with modification and alteration, and that the disclosed technology can be limited only by the claims and the equivalents thereof.

DESCRIPTION OF THE PREFERRED EMBODIMENTS

The following description is non-limiting and is made merely for the purpose of describing the general principles of the disclosed embodiments. Numerous specific details are set forth to provide a full understanding of various aspects of the subject disclosure. It will be apparent, however, to one ordinarily skilled in the art that various aspects of the subject disclosure may be practiced without some of these specific details. In other instances, well-known structures and techniques have not been shown in detail to avoid unnecessarily obscuring the subject disclosure.

Water use refers to the total volume or volume of water used over a period or duration of time. Water use requires the water flow rate and any changes during the monitoring period and the duration to calculate the actual volume of water used.

Water flow event or water flow event basis is defined as monitoring and sensing the initiation of water flow until the water flow is stopped, whereby the water flow rates, the water flow durations, and the total water volumes can be monitored (at a frequency of every 1-20 seconds), calculated and recorded. The water flow event will inherently save CPU, microprocessor, and wireless transmission energy by not recording or transmitting no water use periods and allowing the CPU or microprocessor and wireless communication transceiver(s) to go into a sleep mode between each water flow event and providing a superior analysis of water patterns and signatures for reliable discernment of leaks and leak locations. The CPU, microprocessor, or microcontroller and the wireless communication transceiver(s) enter a sleep mode until awakened by a water flow event, leak detection ananlysis, or signal, command, alert or notification.

Water energy use refers to the ratio of cold or ambient water to heated water use or to the ratio of hot water to total water use.

Water patterns and water signatures refer to one or more patterns of water monitored by the water flow rate sensor and used to identify the water use device, fixture or appliance. The resulting water signature is then recorded in memory for the particular water use device, fixture or appliance. The water signature can be further derived using sound and pressure patterns.

Sound patterns and sound signatures refer to one at more patterns of sound monitored by the acoustic sensor and used to identify the water control valve of the water use device, fixture or appliance. The resulting sound signature is then recorded in memory for the particular water control valve. Wherein the sound patterns and sound signature can assist in defining water patterns and water signatures and determining water leak locations.

Pressure patterns and pressure signatures refer to one or more patterns of pressure monitored by the pressure sensor and used to identify leak condition and/or type. The resulting pressure signature is then recorded in memory for the particular leak. Periodic pressure observations and/or decay curves can also be recorded. Wherein the pressure patterns and pressure signature can assist in defining water patterns and water signatures and determining leak locations.

Private and/or public property refers to the structure(s), site(s), area(s), land(s), and/or location(s) whether indoor, outdoor, or a combination thereof that is/are owned, controlled, used by or designated for use by any type of entity (i.e., personal, residential, commercial, corporate, business, industrial, establishment, government, administrative, institutional, organizational, etc.). Examples include but are not limited to homes and yards, office buildings, commercial structures and grounds, farming lands, government or institutional facilities, multi-unit apartments, condominiums or townhomes, hospitals, dormitories, university or corporate campuses, water or irrigation system defined areas, water wells, sports fields, exercise facilities, parks, golf courses, homeowner association (HOA) areas, and military bases.

Authentication refers to the technology that confirms or ensures that a message(s), control/command signal(s), data, and/or information that is downloaded and/or transferred from a person(s) or device(s) to another is received only by the intended person(s) or device(s). The cemmunication hub(s) is configured to 1) perform an authentication pairing procedure to establish a remote wireless communication connection with the base station(s), 2) communicate with the base station(s), 3) communicate with the base station(s) using mesh or point-to-point er peer-to-peer technelogy, and/or 4) communicate with access point(s). One example of an authentication method is the Challenge Handshake Authentication Protocol (CHAP) which provides authentication technology for a user to communicate with a network entity. CHAP may be used with any remote private or corporate server and/or the internet with service provider (e.g., ATT U-verse, Xfinity/Comcast). CHAP provides users authenticated passwords when accessing remote servers, which also are authenticated prior to allowing the user access. For example, short distance wireless technology Bluetooth, Bluetooth low energy (BLE), Zigbee, Z-wave and Wi-Fi, Wi-Fi versions 3/4/5/6 short range wireless technologies can be used for an authentication pairing procedure to initially establish remote wireless communications. Such authentication pairing procedure can be inputting a Service Set Identifier (SSID) and password which can include two-factor or three-factor authentication.

Encryption refers to a privacy technology that prevents anyone but the intended recipient(s) to access, download, read, or review a message(s), control/command signal(s), data, and/or information that provides a confidential transfer.

Integrity refers to technology that ensures that a message(s), control/command signal(s), data, and/or information is not altered, compromised, or corrupted during transmission or when accessed or downloaded.

Non-repudiation refers to the technology that confirms or ensures, and prevents a sender or receiver from denying, a message(s), control/command signal(s), data, and/or information was sent or received.

Cellular format technology refers to all current and future variants, revisions and generations of wireless mobile telecommunication(s) technologies [e.g., third-generation (3G), fourth-generation (4G), 3GPP (and enhancement revisions), fifth-generation (5G), 3GPP cellular technology, all future generations of Global System for Mobile Communication (GSM), General Packet Radio Service (GPSR), Code Division Multiple Access (CDMA), Evolution-Data Optimized (EV-DO), Enhanced Data Rates for GSM Evolution (EDGE), 3GSM, Digital Enhanced Cordless Telecommunications (DECT), Digital AMPS (IS-136/TDMA, Integrated Digital Enhance Network (iDEN), HSPA+, WiMAX, LTE, Flash-OFDM, HIPERMAN, Wi-Fi, IBurst, UMTS, W-CDMA, HSPDA+HSUPA, UMTS-TDD, other formats for utilizing cell or smart phone technology, telephony antenna distributions, and/or any combinations thereof] and includes the use of cellular transceiver(s), satellite, microwave technology, the internet, cell tower, telephony, and/or public switched telephone network lines. With the water meter in communication with one or more communication hubs, a cellular network can be established whereby multiple or numerous water meters are in communication with multiple or numerous communication hubs. The communication hubs can function as repeaters or access points. The cellular network can use the internet, other private or commercial networks to transfer data to one or more remote computers with one or more databases. The components of the cellular network with water meters, cellular radios, network systems can be sold in individual parts.

Cell or smart phones, computers, or similar apparatuses includes all cellular phones and mobile electronic communication devices using access and format methods (with cellular equipment, public switched telephone network lines, satellite, and/or mesh technology); personal digital assistants (PDAs); tablets (refers to all current and variants, revisions, and generations of the APPLE®, SAMSUNG®, HP®, ACER®, MICROSOFT®, NOOK®, GOOGLE®, SONY®, KINDLE®, and other tablets manufactured by these and other manufacturers); APPLE IPOD TOUCH®; smart or internet capable televisions; wireless timepieces or wireless watches; other electronic apparatuses with Wi-Fi, Wi-Fi versions 3/4/5/6 and wireless capability; remote computers and controllers having internet, cellular technology, Wi-Fi, Wi-Fi versions 3/4/5/6, ZigBee, Bluetooth, Bluetooth low energy (BLE), and any combinations thereof.

LoRa, also known as LoRaWAN (and referred to as "LoRa" herein) comprises a low-power wide area and long-range network protocol based on LoRa technology for IoT devices, LoRa networks, and machine-to-machine (M2M) applications. LoRa uses low-power and long-range chirp spread spectrum (CSS) modulation technology originally developed by the company Semtech. It focuses on secure bi-directional communications in an asynchronous protocol that is designed for long wireless range with extended battery life. LoRa manufacturers use the entire allocated bandwidth to broadcast a communication or signal, making the LoRa protocol robust to minimize channel noise and excellent at handling interference and overlapping networks. The LoRa protocol provides interoperability among smart devices without the need for complex local installations. All communication is generally bi-directional or duplex format, but LoRa also supports multicast operations for enabling software upgrades or mass distribution messages to reduce the on-air communication time. Communication between end-devices and gateways is spread out on different frequency channels and data rates. The selection of the data rate is a trade-off between communication range and message duration. Due to the spread spectrum technology, communications with different data rates do not interfere with each other and create a set of "virtual" channels increasing the capacity of the gateway. LoRa data rates range from 0.3 kbps to 50 kbps. To maximize both battery life of the end-devices and overall network capacity, the LoRa network server can manage the data rate and radio frequency output for each end-device individually by means of an adaptive data rate (ADR) scheme. The LoRa technology offers high penetration, low bandwidth, low energy, long range, and secure data and is gaining significant access into the IoT networks.

The LoRa wireless system makes use of the unlicensed frequencies below 1 GHz that are available worldwide:
  868 MHz for Europe
  915 MHz for North America
  433 MHz band for Asia Using lower frequencies than those of the 2.4 or 5.8 GHZ ISM bands enables much better coverage to be achieved, especially when the nodes are within buildings, enabling superior penetration of tall buildings and solid walls. With the water meter in communication with one or more communication hubs, a LoRa or LoRaWAN network can be established whereby multiple or numerous water meters are in communication with multiple or a number of communication hubs. The communication hubs can function as repeaters or access points. The LoRa or LoRaWAN network can use the internet or other private or commercial networks to transfer data to one or more remote computers with one or more databases. The components of the LoRa or LoRaWAN network with water meters, LoRa radios, network systems and monitoring facilities can be sold or leased individually. LoRaWAN network uses the low-power and long-range chirp spread spectrum modulation technology.

With traditional Wi-Fi (a wireless network protocol based on IEEE 802.11 standard), most networks were designed on the range delivered by 802.11 standard operating frequencies 2.4 and 5.8 GHz and protocol for distance and performance. Another Wi-Fi technology developed is known as Wi-Fi3. In the foreseen near future, companies like Edgewater Wireless will develop and market Wi-Fi3 powered technology that will deliver reliable, high-capacity indoor and outdoor Wi-Fi wireless communication and protocols for high-density environments. The high channel density will enable multiple channels of a single chip meaning aggregate output on a single Wi-Fi3 enabled device will outperform traditional, single channel Wi-Fi technology. Thus, the fewer access points will deliver higher quality of service that can considerably lower the cost of deployment of IoT devices. Remote and rural infrastructure installations are easily achievable due to the extended network coverage and performance capabilities of Wi-Fi3. There are further improvements in Wi-Fi with Wi-Fi4, Wi-Fi5, Wi-Fi6 and Wi-Fi6e. Wi-Fi 6 is backward-compatible with earlier Wi-Fi standards but Wi-Fi 6E is not. Wi-Fi 6E creates a "fast lane" for compatible devices and applications, resulting in faster wireless speeds and lower latency. Lastly other improvements in Wi-Fi have been proposed and are under development. A new IEEE 802.11bb light communications standard is under development intended for emerging Li-Fi technology. Li-Fi uses an infrared light transmission scheme instead of traditional radio signals like Wi-Fi to transmit networking data wirelessly. There is potential for data transfer speeds that approach 100 times faster than traditional Wi-Fi, but the development is yet to be finally determined. This next generation of wireless networking breaks away from traditional radio signals reliant on standards like Wi-Fi6E and its upcoming successor, Wi-Fi7, in favor of harnessing an infrared 'Li-Fi' that is invisible to the human eye. Firms are ready to embrace this emerging technology, with PureLiFi and Fraunhofer HHI among those companies promoting the light-based improvements over traditional Wi-Fi. Concurrently Wi-Fi7 under the official standard 802.11 (with extremely high throughput) aims to achieve this by building on the groundwork of the last two Wi-Fi standards and extending them. From Wi-Fife, Wi-Fi7 borrows functions from such as Orthogonal Frequency-Division Multiplexing (OFDM) and BSS, which ensure that even in very large networks every device can transmit data with a minimal delay. Wi-Fi 6e also utilizes the 6 GHz transmission frequency, which facilitates fast Wi-Fi WLAN speeds. The advantages of Wi-Fi 7 are encouraging device manufacturers to advance this technology, such as AVM in Germany. With the water meter in communication with one or more communication hubs, Wi-Fife, Wi-Fi7 and Li-Fi networks can be established whereby multiple or numerous water meters are in communication with multiple or numerous communication hubs. The communication hubs can function as repeaters or access points. The Wi-Fi6e, Wi-Fi7 and Li-Fi networks can use the internet or other private or commercial networks to transfer data to one or more remote computers with one or more databases. The components of the Wi-Fi6e, Wi-Fi7 and Li-Fi networks with water meters, Wi-Fi or Li-Fi radios, network systems, and monitoring facilities can be sold or leased individually.

WiMAX is a wireless communication technology based on IEEE 802.16 standards. WiMAX refers to interoperable implementations of the IEEE 802.16 family of wireless-networks standards ratified by the WiMAX Forum. WiMAX was initially introduced to many international countries. WiMAX can be installed faster than other internet technologies because it can use low height towers with the support of non-line-of-sight coverage across an entire city or country. WiMAX transmitters can span several miles with data rates reaching up to 30-40 megabits per second (Mbps) (1 Gbps for fixed stations). Wireless WiMAX suffers like most other wireless technology that the further away from the source the slower the connection becomes. This wireless technology might attain 25 Mbps in one location, but moving away from the WiMAX site can reduce that speed to 1 Mbps. The WiMAX Forum has proposed an architecture that defines how a WiMAX network can connect with an IP based network, which is typically chosen by operators that serve as the Internet Service Providers (ISP) and can provide integration capabilities with other types of architectures. WiMAX Forum published three licensed spectrum profiles: 2.3 GHZ, 2.5 GHz, and 3.5 GHz to establish standardization. With the water meter in communication with one or more communication hubs, a WiMAX network can be established whereby multiple or numerous water meters are in communication with multiple or numerous communication hubs. The communication hubs can function as repeaters or access points. The WiMAX network can use the internet or other private or commercial networks to transfer data to one or more remote computers with one or more databases. The 802.16 standard essentially standardizes two aspects of the OSI model, the physical layer (PHY) and the media access control (MAC) data link layer. The components of the WiMAX network with water meters, WiMAX radios, network systems, and monitoring facilities can be sold or leased individually.

Ultra Narrow Band (UNB) refers to wireless technology that transmits over an ultra narrow band or very narrow spectrum (for example less than 1 KHz) to achieve ultralong-range (5 km in the urban environment and 25 km+ in the suburb environment) for data communication between a sensor collection node transmitter and a communication receiving hub. By transmitting via a UNB channel, little power is required to transmit data over a considerable distance, UNB systems are frequently used in one-way, half duplex, e.g., from collection node sensor(s) to an optional communication, but can mimic two-way duplex communication when the receiver/sensor is sleeping most of the time and opens to listen for signal commands or messages. With the water meter in communication with one or more communication hubs, a UNB network can be established whereby multiple or numerous water meters are in communication with multiple or numerous communication hubs. The communication hubs can function as repeaters or access points. The UNB network can use the internet or other private or commercial networks to transfer data to one or more remote computers with one or more databases. The components of the UNB network with water meters, UNB radios, network systems, and monitoring facilities can be sold or leased individually.

M-Bus technology is another wireless technology that competes with LoRa and LoRaWAN, Sigfox, and NB-IoT. M-Bus can provide date transmission with less interruptions, and robust interference protection. The Wireless M-Bus or Wireless Meter Bus is an open standard developed for very power efficient smart metering and Advanced Metering Infrastructure (AMI) and it is quickly spreading in Europe for electricity, gas, water and heat metering. A wireless M-Bus network is based on a star, ring, or bus topology network with master and slave devices described in the EN 13757 standards and comprises a number of different operating modes: S, T, R, C (868 MHz), F (433 MHz), and N (169 MHZ). Mode S uses the 868 MHz band for S1 (unidirectional) and S2 (bidirectional), the T Mode uses the 868 MHz band fer T1 (unidirectional) and T2 (bidirectional), the R mode uses the 868 MHz band for the R2 (bidirectional), the N mode uses the 169 MHz bend fer N1 (unidirectional) and N2 (bidirectienel), the F-mode used the 433 MHz band for F2 (bidirectional), and the C-mode uses the 868 MHz band for C1 (unidirectional) and C2 (bidirectional). The half-duplex format is used for transmitting meter identification and other, limited one-way information. The half-duplex format transfers water data and receives commands or signals. M-Bus is not disturbed if one of the components fails. M-Bus adheres to the OSI model. Manufactures offer a range of sub-1 GHz transceivers and microcontrollers together with a large set of software libraries, including a free wireless M-Bus firmware stack for evaluation, a sample implementation of a wireless M-Bus gateway, and hardware tools that enable quick development and deployment of wireless M-Bus networks. With the water meter in communication with one or more communication hubs, an M-Bus network can be established whereby multiple or numerous water meters are in communication with multiple or numerous communication hubs. The master and slave hubs can function as repeaters or access points. The M-Bus network can use the internet or other private or commercial networks to transfer data to one or more remote computers with one or more databases. The components of the M-Bus network with water meters, M-Bus radios, network systems, and monitoring facilities can be sold or leased individually.

Amazon Sidewalk is a wireless network that provides cloud connectivity for IoT devices and uses smart speaker(s) and/or bridge device(s). Amazon Sidewalk is a secure community network that uses Amazon Sidewalk Gateways (also called Sidewalk Bridges), such as compatible Amazon Echo (smart speakers) and Ring devices, to provide cloud connectivity for IoT endpoint devices. Amazon Sidewalk uses short-range and long-range connectivity at homes and buildings, etc. using Bluetooth Low Energy for short-distance communication and LoRa and FSK radio protocols at 900 MHz frequencies to cover longer distances. When Amazon Sidewalk Gateways opt to participate in the Sidewalk Network, Sidewalk endpoint devices located within the wireless range of this network can be used for applications such as sensing the environment or alerting when a specific condition or event occurs. Amazon Sidewalk supports a diversity of use cases, from connected sensors, utility meters or appliances in and around the home to trackers, tools, toys and monitoring devices (bridge devices) that are used in and around neighborhoods and on the go. Amazon Sidewalk transfers data between Sidewalk endpoints and Sidewalk Gateways, and between Sidewalk Gateways and the AWS cloud. With the water meter in communication with one or more communication hubs, an Amazon Sidewalk Gateway network can be established whereby multiple or numerous water meters are in communication with multiple or numerous communication hubs. The communication hubs can function as repeaters or access points. The Amazon Sidewalk Gateway network can use the internet, other private or commercial networks to transfer data to one or more remote computers with one or more databases. The components of the Amazon Sidewalk Gateway network with water meters, Amazon Sidewalk Gateway radios, network systems, and monitoring facilities can be sold or leased individually.

6LoWPAN is an acronym that combines the new Internet Protocol (IPv6) with a sub-1 GHz frequency and low power wireless personal area network. The 6LoWPAN supports hundreds of hops for developing wireless mesh networks with high self-healing (node failure) and self-maintenance of mesh routes. The 6LoWPAN allows small devices with limited transfer communication the ability to transmit information wirelessly using the 6LoWPAN Internet Protocol. The 6LoWPAN architecture consists of a local network with routers/servers which utilizes a one or more edge router(s) to connect to the access network. The one or more edge router(s), communicating with the internal servers, then provides the IoT sensor and applications to access the internet. IP networking for low-power radio communication utilizes applications that need wireless internet connectivity at lower data rates for devices that are designed with a limited footprint (form factor). The header compression mechanisms standardized in RFC6282 can be used to provide header compression within IPv6 protocol packets to be used over networks. IPv6 is also in use on the smart grid network enabling smart meters (water meters) and other devices to build a micro mesh network before sending the data back to the main remote servers with database for monitoring and billing operations system using the IPV6 backbone. Some of these networks run over IEEE 802.15.4 defined radios, and therefore these radios use header compression and fragmentation as specified by the RFC6282 standard. With the water meter in communication with one or more communication hubs, a 6LoWPAN network can be established whereby multiple or numerous water meters are in communication with multiple or numerous communication hubs. The communication hubs can function as repeaters or access points. The 6LoWPAN network can use the internet, other private or commercial networks to transfer data to one or more remote computers with one or more databases. The components of the 6LoWPAN network with water meters, 6LoWPAN radios, network systems, and monitoring facilities can be sold or leased individually.

Narrowband IoT (NB-IoT) is a wireless internet of things (IoT) prorocol that uses low-power wide-area network (LP-WAN) technology. It was developed by the 3rd Generation Partnership Project (3GFP) for cellular wireless communication to enable a wide range of NB-IoT devices and services. The NB-IoT communication standard enables IoT devices to operate via carrier networks, either within an existing Global System for Mobile (GSM) communication carrier wave or in an unused guard band between Long-Term Evolution (LTE) channels at independently. NB-IoT accomplishes this communication design by boosting the coverage extension beyond what existing cellular technologies can offer by perferming transmissinn repetitions and utilizing different bandwidth allocation configurations in the uplink transmission.

Sigfox is a network protocol that employs differential keying (GFSK) over a 192 KHz ultra narrow band in the frequency median range of 868 MHz in Europe; the Industrial, Scientific and Medical frequency median range of 902 MHz in the US; 923 MHz in Japan; and 920 MHz in South America, Hong Kong, Singapore and Taiwan. It utilizes a wide-reaching signal that passes freely through solid objects and requires little energy, being termed a low-power wide-area netwcrk (LPWAN). The Sigfox network is based on one-hop star topology. The Sigfox signal can be used to easily cover large areas and to reach underground objects.

Bluetooth Low Energy (BLE) refers to a newer version of standard Bluetooth. Standard Bluetooth was originally designed for continuous streaming of data applications. Both standard Bluetooth and BLE low energy operate in the 2.4 GHz ISM band. However, the BLE remains in a sleep mode constantly except for when a connection is initiated. The actual connection times are on a few milliseconds, unlike standard Bluetooth's continuous streaming. BLE short time connection allows for higher data transfer rates of approximately 1 Mb/s.

Cellular (3GPP) refers to a 3rd Generation Partnership that formulated the original release 8 and the associated enhancements (9-14). 3GPP is a third-generation wireless mobile telecommunications technology. The original release LTE 4G release 8 included high peak data rates, up to 300 Mbps in downlink and 75 Mbps in uplink when using a 20 MHz bandwidth that includes high spectral efficiency and flexible bandwidths (1.4 MHZ, 3 MHz, 5 MHz, 10 MHz, 15 MHz and 20 MHz), 5 millisecond latency for IP packets in ideal radio conditions, simplified Architecture, orthogonal frequency-division multiple access (OFDMA) in downlink and Single-carrier frequency-division multiple access scheme (SC-FDMA) in uplink, all IP network, and using the multiple in and multiple out (MIMO) multiple antenna pattern.

The LTE Cat-MI and LTE (4G) Cat-MI technology is designed for Internet of Things (IoT) devices to connect to a 4G or 5G network, without the typical node/computer network that passes traffic from a local network to other networks or the Internet router (a gateway) and further while running on battery power, 4G is a fourth-generation wireless mobile telecommunications technology. Devices can connect to 4G and 5G networks with microchips that are less expensive to fabricate because these microchips are half-duplex and have a narrower bandwidth. Such designed devices can enter a "deep sleep" mode called Power Savings Mode (PSM) and only wake up periodically while connected. Because the maximum data rate of LTE-Cat-M1 and 5G devices is only about 100 kbits/s, these cellular protocols do not burden the 4G network. Cellular 5G version uses a system of cell sites that divide their territory into various sectors and transmit data and information through radio frequency waves. Each cell sector must be connected to a network architecture, whether through a wired or wireless connection. 5G is a fifth-generation wireless mobile telecommunications technology. 5G networks use orthogonal frequency-division multiplexing (OFDM) encoding. The 5G network interface will be designed for lower latency and greater flexibility than 4G LTE-M. The 5G networks have significantly more, smaller cells that can dynamically change the network size and shape, so 5G networks must be more intelligent than previous cellular technology. With existing macro cells, 5G is expected to boost capacity by utilizing wider bandwidths and advanced antenna technology.

The Wi-Fi versions 3/4/5/6, WiFi7, Li-Fi, LoRa, Sigfox, Ultra Narrow Band, 6LowPAN, NB-IoT, M-Bus, WIMAX, Amazon Sidewalk, standard cellular technology, LTE-M cellular technology and 4G and 5G cellular technology can be used to form a network system. And the water meter base stations, the communication hub and network system can be divided into components or parts that can be sold separately.

A newer technology used with the cellular transceiver is the embedded Subscriber Identity Module (eSIM) or eSIM code. The eSIM technology is a microchip or software code embedded or associated with the cellular radio component of the water meter. An advantages is that eSIM allows remote download of cellular data enabling the water meter to switch cellular service carriers at any time as necessary, such as during installation in various locations or when upgrading to a different carrier. The eSIM technology also provides a higher level of security.

IoT Protocols can use 1) MQ Telemetry Transport (MQTT), a machine-to-machine or "Internet of Things" connectivity protocol on top of TCP/IP. It allows extremely lightweight publish/subscribe messaging transport, 2) Extensible Messaging and Presence Protocol, a communication protocol for message-oriented middleware based on XML. It enables the near real-time exchange of structured yet extensible data between any two or more network entities, 3) Constrained Application Protocol (CoAP), a specialized web transfer protocol for use with constrained nodes and constrained networks for the Internet of Things. The protocol is designed for machine-to-machine (M2M) applications such as smart energy and building automation, 4) Advanced Message Queuing Protocol (AMQP), an open standard application layer protocol for message-oriented middleware. The defining features of AMQP are message orientation, queuing, routing, reliability and security. AMQP mandates the performance of the messaging provider and client to the extent that implementations from different vendors are interoperable, in the same way as SMTP, HTTP, FTP, etc. have created interoperable systems, 5) THREAD, an IPv6-based, low-power mesh networking technology for IoT products, intended to be secure and future-proof specification that is available at no cost, but requires agreement and continued adherence to an end user license agreement, 6) Zigbee, an IEEE 802.15.4-based specification with a group of high-level communication protocols used to create personal area networks with small, low-power digital radios, such as for home automation, medical device data collection, and other low-power low-bandwidth needs, is designed for small scale projects which need wireless connection. Zigbee is a low-power, low data rate, and relatively short-distance wireless ad hoc network, 7) Z-wave, a wireless communications protocol used primarily for home automation but applicable to IoT applications. It is a mesh network using low-energy radio waves to communicate from device to another device, allowing for wireless control, 8) Data Distribution Service (DDS), an Object Management Group (OMG) machine-to-machine standard that aims to enable scalable, real-time, dependable, high-performance and interoperable data exchanges using a publish-subscribe pattern, 9) Hypertext Transfer Protocol (HTTP), an application protocol for distributed, collaborative, hypermedia information systems. HTTP is the foundation of data communication for the World Wide Web, where hypertext documents include hyperlinks to other resources that the user can easily access, and/or 10) a custom designed protocol.

Figure 6:
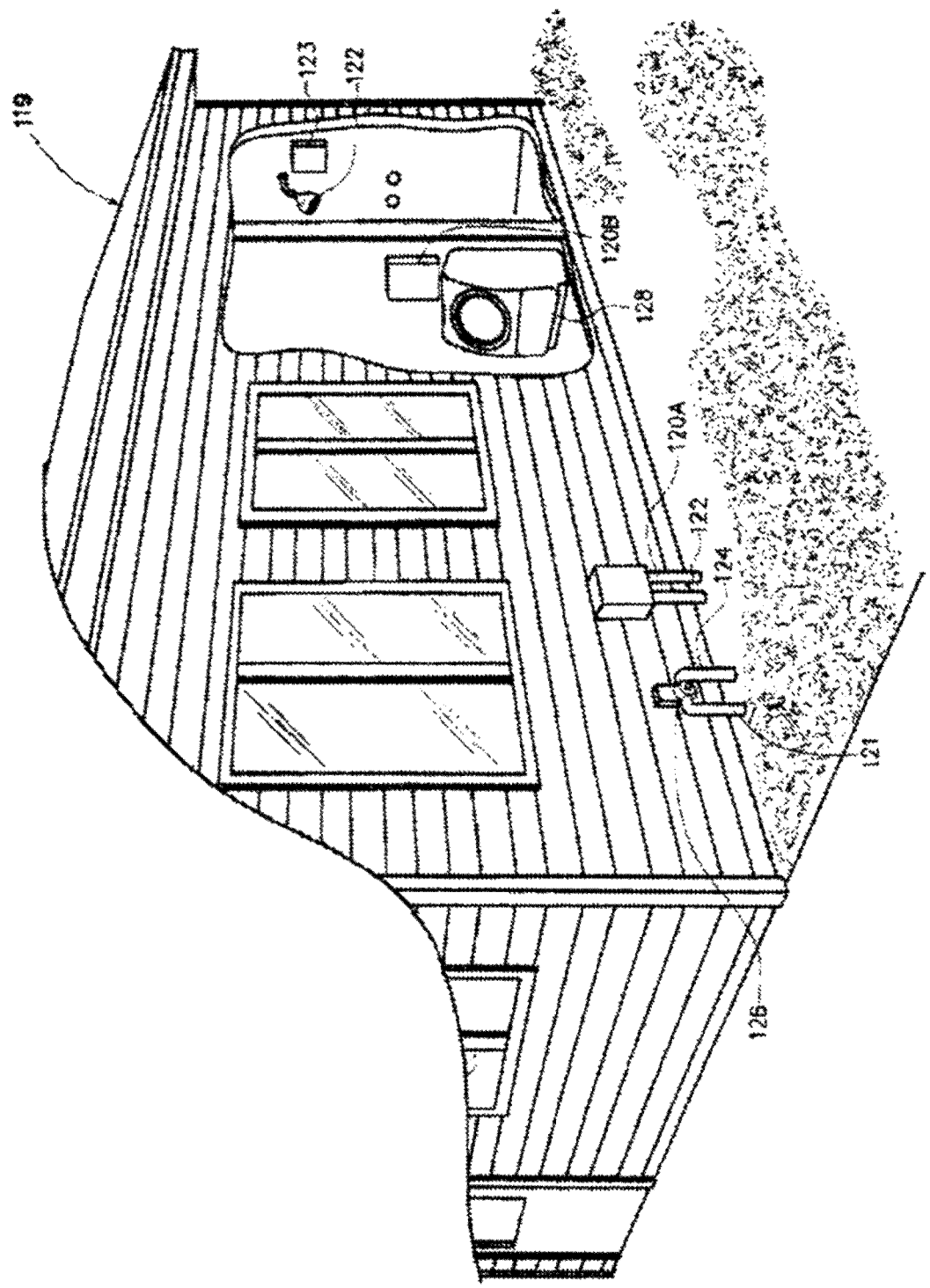
FIG. 6 is an illustration of a plurality of water parameter transceivers attached to various locations for monitoring water use.

Referring now to the drawings and particularly to FIG. 1, shown is an illustrative view of the water meter and leak detection system 10 (126 shown in FIGS. 6 and 200 shown in FIG. 7) connected to the water supply lines in an appropriate location for local water monitoring 42, 50 and used for monitoring water use and leak detection analysis within a private or public property 40. For accurate measurements of water use, the present invention can be installed in the standard water meter location or installed between the pressure reducing valve and the civil, commercial, governmental, or municipal supply water source(s) and before any distribution lines. It is also anticipated by the Applicant that the water meter and leak detection system 10 (126 shown in FIGS. 6 and 200 shown in FIG. 7) can be used for wells and in situations where the water source is not obtained from civil, commercial, governmental, or municipal operations. The water use and leak detection apparatus 10 (126 shown in FIGS. 6 and 200 shown in FIG. 7) can have a sampling rate to upload or download water and energy use data on various frequencies, e.g., one every 1-20 seconds (for monitoring water flow events), once per minute, once per hour, once per day, once per any frequency, or preferably can send information upon sensing the initiation of water flow until the water flow is stopped (defined herein as "water flow event", "water flow event basis", "water event use" or "water event use basis"). Monitoring on a water flow event basis allows for a quantitative analysis using software instructions, algorithms, and artificial intelligence to learn the daily, weekly, or monthly water use patterns and frequencies of the specific private or public property to improve identification and evaluation of water use characteristics and to improve leak detection and analysis. The water parameter information can be viewed on a custom display/recorder screen 50, or cell or smart phones, computers, or similar apparatuses having an application program or APP (shown in FIGS. 10-13). The APP presents historical information of water use and water quality; displays water use of water use devices, fixtures, and appliances; programs schedule(s) to turn off or on the water control valve mechanism; programs alert(s) and notification(s) of water flow rate limit, water use limit, and total volume limit; sets water measurement units, and/or conducts leak detection analyses.

The water parameter information can also be uploaded, either with the use of an optional communication hub (FIG. 14 477) to an internet router using wired or wireless technology which transmits the data through remote servers (for example, Amazon Web Services, Oracle Cloud, Microsoft Azure Cloud) and associated database(s) or, alternately, through a private or commercial network with privately owned servers to a remote computer operation center or web-based company.

Also shown in FIG. 1 is a wireless (or wired) communication transceiver 52 from the water meter and leak detection system 10 (126 shown in FIGS. 6 and 200 shown in FIG. 7) for transmitting water use, water quality and leak detection and analysis information. The wireless (or wired) technology 52 can communicate with a conveniently located remote display 50 in a location for review by a private or public property owner, user, or responsible individual(s). Remote display 50 can be a custom apparatus or TV, computer, ipad, or another conveniently available display technology. All wireless (or wired) communications should preferably be in half or full duplex format. Since the wireless communication 52 is in close proximity to the water meter and leak detection system 10 (126 shown in FIGS. 6 and 200 shown in FIG. 7), the wireless communication can consist of Bluetooth or BLE, Z-wave, ZigBee, 6LoWPAN, Wi-Fi, Wi-Fi3/4/5/6, Wi-Fi7, Li-Fi, or similar technology that can communicate with router technology. It is anticipated that WIMAX, LoRa, Ultra Narrow Band (UNB), Amazon Sidewalk Technology, LTE-M, 3GPP, 4G, and/or 5G technology might be necessary for longer distance communication using long range, low power, and/or high-density technology that can communicate with one or more communication hubs 477. Wireless communication comprises, in part, a segment of the internet of things (IoT) concept. Wireless (or wired) communication 52 can also electronically communicate with a local router, which uses the internet and remote computer servers (cloud technology) or web-based companies to provide remote access of the water data. Alternatively, wireless communication can be transmitted through a private or commercial network with privately owned servers to a remote computer operation center.

Also shown in FIG. 1 is another wireless communication 54 from the water meter and leak detection system 10 (126 shown in FIGS. 6 and 200 shown in FIG. 7) for communicating water use and/or water quality information to a governmental, civil or municipal employee or individual 60 using a second custom remote display/recorder 56 for civil, commercial, governmental, or municipal operators/representatives. If the wireless communication 52 is not relatively close to the water meter and leak detection system 10 (126 shown in FIGS. 6 and 200 shown in FIG. 7), this wireless technology should consist of a longer-range technology such as Wi-Fi version 3/4/5/6, Wi-Fi7, Li-Fi, LoRa, Sigfox, Ultra Narrow Band, 6LowPAN, NB-IoT, M-Bus, WIMAX, Amazon Sidewalk, standard cellular technology, LTE-M, 3GPP, 4G, and/or 5G cellular technology. However, Bluetooth and BLE, ZigBee, Z-wave, or similar wireless protocols are also possible as these technologies are improving in range and security measures and offering better capabilities.

FIG. 1 shows another wireless communication 46 that is designed to communicate information or data utilizing cellular format technology with offsite central monitoring using cellular or other telephone lines including satellite or microwave technology, the internet, cell towers, telephone lines, or similar technologies 44. Such cellular formats could be CDMA, GSM, 3GPP, LTE-M, 4G, and/or 5G, or another cellular format. It is anticipated that the wireless communication 46 can transmit information to a remote database, which communicates with a registered cell or smart phone, computer, or similar apparatus for displaying water use and leak detection and analysis data. The wireless communication 46 should include specific identification information e.g., the private or public property address. The one or more wireless communication transceiver(s) can send data on various frequencies, e.g., once per minute, once per hour, once per day, once upon any frequency, or preferably upon a water flow event basis. The one or more wireless communication transceiver(s) can also send information upon sensing the observation of a leak condition, e.g., alarm situation, to the registered owner or user of a cell or smart phone, computer, or similar electronic apparatus. Alternately, continuous data monitoring can be stored in a data module in the water meter collection node and periodically transferred wirelessly to a remote computer or server as described herein. The water flow event or water flow event basis monitoring can minimize the use of wireless signals within the private or public property or building(s), conserving energy, minimizing the interference with other wireless devices, and reducing the exposure of wireless energy to individuals.

Furthermore, the wireless communication transceiver(s) can consist of two-way transmission, commonly known as half (both devices can transmit the signal, but one at a time) or full (both devices can transmit the signal at the same time) duplex transceiver technology, such that the water meter and leak detection system 10 (126 shown in FIGS. 6 and 200 shown in FIG. 7) can transmit and receive electronic signals with a remote station, cell or smart phone, computer, or similar apparatus. The wireless communication transceiver (s) can also comprise a Radio Frequency (RF) mesh-enabled or point-to-point or peer-to-peer device (meters, relays) technology that is connected to several other mesh-enabled or point-to-point or peer-to-peer devices, which function as signal repeaters, relaying the data to an access point. The access point device aggregates, encrypts, and eventually transmits the data to a commercial or municipal or government agency over a secure third-party private or commercial network. The resulting RF mesh or point-to-point or peer-to-peer network can span large distances and reliably transmit data over rough or difficult terrain. If the water meter and leak detection system or optional communication hub 477 transmitter drops out of the network, its neighboring water meter and leak detection system or optional communication hub 477 will find another route. In this meshing technology the communication hub 477 can also serve as a repeater apparatus receiving signals or commands and transmitting water data to provide longer wireless range capability. The mesh or point-to-point or peer-to-peer technology continually optimizes routing to ensure information is passed from its source to its destination as quickly and efficiently as possible. When the wireless communication (FIG. 1 46) is being used, the water use data can be routed through a Bluetooth, Bluetooth low energy (BLE), Wi-Fi, Wi-Fi3/4/5/6, W-Fi7, Li-Fi, ZigBee, Z-wave, LoRa, Sigfox, 6LoWPAN, WiMAX, Ultra Narrow Band (UNB), NB-IoT, M-Bus, Amazon Sidewalk technology, and/or other wireless technology using a local router/server or private or commercial network that transfers the water use data over the internet and remote servers (cloud technology) or to a web-based company. Signals and/or data can also be transferred by standard cellular format, 3GPP, LTE-M, 4G, and/or 5G cellular technology (using a cell phone, smart phone, computer, or similar electronic apparatus) from cellular towers to remote servers or cloud service companies and then over the internet to a local router/server for a private or public property. The wireless communication transceiver(s) can be half duplex and/or full duplex transmission.

The wireless communications 52, 54 and 46 are preferred to transmit, upload, or download water parameter data or information via a secure wireless communication network. It is anticipated that the wireless communication 54 can be received by a moving vehicle or can communicate with cell phone towers 44 and cellular technology using wireless communication 46. The electronic communication(s) comprises, in part, a segment of the internet of things (IoT) concept. The wireless communication 54 or wireless communication 46 can also electronically communicate with a local router/server which uses the internet to communicate with remote computers (cloud service company) for recording water use data and to allow remote access of the water use data. Such remote computers can be provided by a large commercial cloud computer company or a web-based company.

It is anticipated that the wireless communications 54 and 46 and the wireless or wired communication 52 utilizing wired technologies (X10, UPB etc.) can be used with the water meter and leak detection system 10 (126 shown in FIGS. 6 and 200 shown in FIG. 7) in any combination. For example, the collection node (water meter) can use Bluetooth, Bluetooth Low Energy (BLE), Wi-Fi version 3/4/5/6, WiFi7, Li-Fi, LoRa, Sigfox, Ultra Narrow Band, 6LowPAN, NB-IoT, M-Bus, WIMAX, Amazon Sidewalk, standard cellular technology, LTE-M cellular technology, 3GPP, 4G, and/or 5G cellular technology to communicate with a custom display device FIG. 2 18, FIG. 1 56, FIG. 5 110 or with a cell or smart phone, computer, or similar apparatus 400.

The collection node can also communicate with a local wireless router or through a private or corporate network system to a private, commercial, or government remote computer(s) or server(s). The collection node can also be connected by wired technology directly or through X10, UPB or HART Communication Protocol to communicate with a device such as a smart speaker hub or router. The collection node can also connect directly to a private or commercial network system or to a router that communicates with the internet, all linked to a private, commercial, or government remote computer(s) or server(s). The collection node can also have a standard, 3GPP, LTE-M, and/or 5G cellular technology to communicate wirelessly to the private, commercial, or government remote computer(s) or server(s). Also, one or more collection nodes can wirelessly communicate using Wi-Fi version 3/4/5/6, WiFi7, Li-Fi, LoRa, Sigfox, Ultra Narrow Band, 6LowPAN, NB-IoT, M-Bus, WIMAX, Amazon Sidewalk, standard cellular technology, LTE-M cellular technology, 3GPP, 4G, and/or 5G cellular technology to one or more communication hubs 477 (with point-to-point or peer-to-peer or meshing technology) whereby the communication hub 477 is either hard wired or uses Wi-Fi (Wi-Fi versions 3/4/5/6) to communicate with a wireless router (or cable modem) to communicate over the internet or to a private or commercial remote server. These are just a few examples of combinations using various wired and wireless technologies with the water meter and leak detection system.

Wireless communication transceiver(s) preferably utilize encryption, authentication, integrity, and/or non-repudiation techniques to provide a secure transfer of the water data and information from the water meter and leak detection system 10 to the first custom display/recorder apparatus 50, to the second custom display/recorder apparatus 56, and/or to the cell or smart phone, remote computer, web portal or similar apparatus 400. Also, wireless communication transceiver(s) should include specific identification information e.g., property address, IP address, MAC address. The wireless communication transceiver(s) can send data on various frequencies, e.g., once per minute, once per hour, once per day, or, preferably, will send information on a water flow event basis to a first remote 50, a second remote 56 or a remote computer/database, which will allow data access to registered owners or users of cell phone, smart phone, computer, or similar electronic apparatus 400. Furthermore, wireless communication transceiver(s) can send data or information upon the sending of a request signal. The request signal can be generated by, for example, the pushing of a requesting button located on the first remote 50, the second remote 56 or the cell phone, smart phone, or similar apparatus 400 that transmits a request for water use, water quality information, and/or other data from the water meter and leak detection system 10 (126 shown in FIGS. 6 and 200 shown in FIG. 7). The use of the request signal can minimize the use of wireless signals within the private or public property(ies) building, conserve energy, minimize the interference with other wireless devices, and reduce the exposure of wireless energy to individuals.

The water meter and leak detection system should be able to reliably and securely communicate the water data and information collected to a remote central computer location. Difficult environments and distant locations for water meter installation can present wireless communication challenges. Solutions include using cell technology networks, satellites, licensed and/or unlicensed RF technology, and/or wired power lines. Additional remedies include fixed wireless, mesh, or point-to-point or peer-to-peer (and hybrid) networks, or any combinations thereof. There are several other potential network configurations possible, including the use of Wi-Fi (Wi-Fi versions 3/4/5/6), Wi-Fi7, Li-Fi, and other internet related networks. Rural municipalities such as mountainous regions or areas ill-served by wireless and internet companies have difficult wireless communication issues compared to urban or areas with established utilities.

TCP/IP technology has become a common communication and management platform for sensor to device applications, so software developers can utilize multiple communication systems while using TCP/IP technology. TCP/IP is a combination of two technologies where TCP comprises the fourth layer, and IP comprises the third layer, of the network and transport sections of the Open Systems Interconnect model (OSI model). Wireless technology such as Bluetooth and BLE, ZigBee, Z-wave, LoRa, Sigfox, WIMAX, 6LoWPAN, UNB, NB-IoT, M-Bus, Wi-Fi, Wi-Fi3/4/5/6 (with Wi-Fi extenders), Wi-Fi7, Li-Fi, Amazon Sidewalk technology, Cellular 3GPP, LTE-M, 4G, 5G, or similar wireless protocols, or other communication technologies using the TCP/IP technology, are used to transfer or download water data from a private or public property and used to upload data, information or software updates to the water meter and leak detection system 10 (126 shown in FIGS. 6 and 200 shown in FIG. 7).

FIGS. 10-13 show a cell or smart phone, computer, or similar apparatus 400 running an "APP" or a sequence of "APP" pages that show, e.g., in a pie chart, bar chart, or other format, the water data and historical information of particular areas of the private and/or public property. The water meter and leak detection system's flow rate sensor(s) and software calculate the water flow rate, water use or flow duration, and total volume of water to differentiate water use devices (e.g., shower, faucet, bathtub, toilet, washing machine, water heater, dishwasher, and outside irrigation system) and can show the water data. Other outdoor water uses, such as pool or hot tub or water fountain maintenance, can be included for water use monitoring. The addition of an acoustic sensor can monitor valve movement, vibration, and sound patterns and establish sound signatures. The acoustic sensor can provide more specific differentiation of water use devices, fixtures, and appliances. Using AI software technologies, the acoustic sensor could be calibrated to monitor water rate flow and water pressure.

Figure 12:
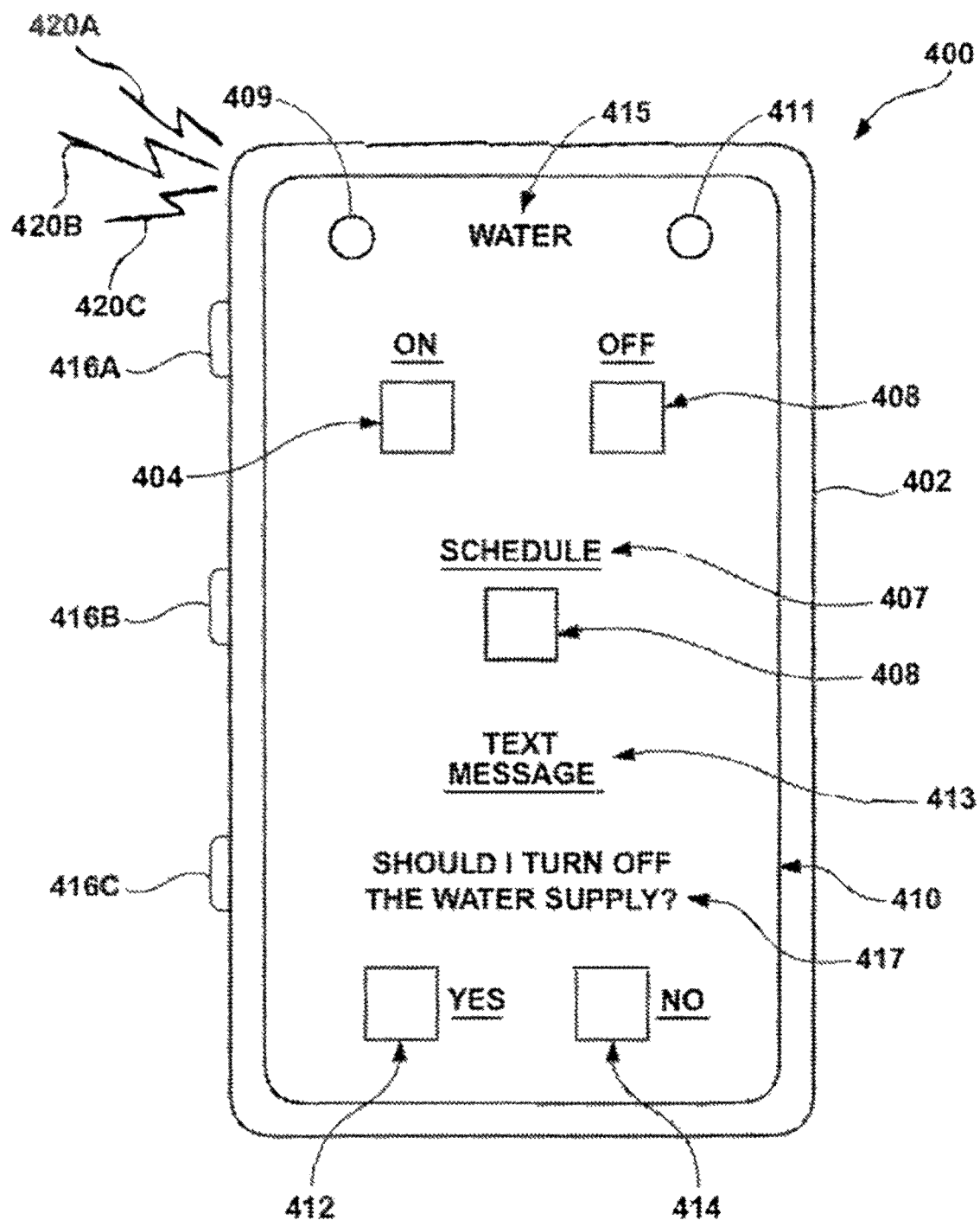
FIG. 12 is an enlarged illustration of another typical cell or smart phone, remote computer, web portal, or similar electronic apparatus having an "APP" or programmed application, or another page of an "APP" or programmed application to display the soft buttons or control activator to turn on/off the water system, schedule the water control mechanism, or receive a text message.

FIG. 12 shows the water meter and leak detection system APP, which manages the water control valve mechanism enabling one to turn the water supply on/off, to program a water on/off schedule, and to receive notification of a leak condition with the option to remotely turn off the water supply. The water meter and leak detection system's flow sensor(s) FIG. 3 105 can communicate wired or wirelessly FIG. 3 101, 102, 103 with the microprocessor or microcontroller FIG. 3 84 that has software that learns about water usage at a private or public property or areas thereof. Calibration of the sensors with the water meter and leak detection system 10 (126 shown in FIGS. 6 and 200 shown in FIG. 7) can be initiated by pressing hard button FIG. 5 114, 116, and 118 and/or soft button activators FIG. 5 140, 142, and 144 on the water meter and leak detection system 10 (126 shown in FIGS. 6 and 200 shown in FIG. 7) or by the custom display and/or a recording apparatus 50, and/or by cell or smart phones, computers, or similar apparatuses 400 can be located remotely from the water meter and leak detection system 10 (126 shown in FIGS. 6 and 200 shown in FIG. 7).

Figure 3:
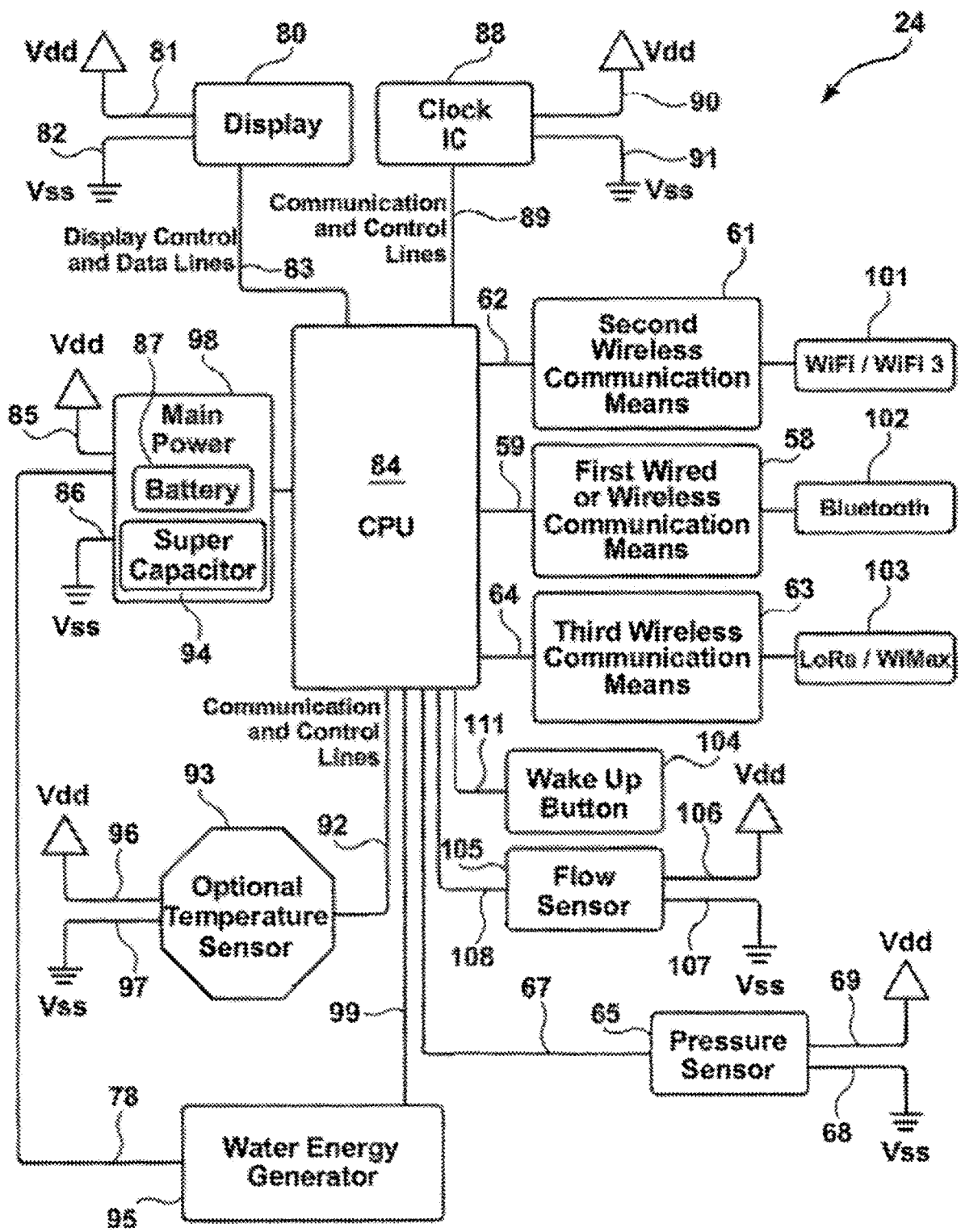
FIG. 3 is an electrical schematic showing the main power, CPU or microcontroller, the analog or digital optional display means, the clock circuit, one or more flow sensors, optional temperature sensor, optional pressure sensor, and optional water energy generator, and a first, second and/or third wireless communication transceiver(s) for data transfer through either a private or public network system and/or the optional collection hub to an internet router. Similar electronic circuitry, without the sensor technology, can be used with the optional communication hub. The communication hub can also serve as a repeater apparatus receiving water data and transmitting water data to also provide longer wireless range capability.

In another embodiment, the multiple independent flow sensors FIG. 3 105 can be connected to the main water supply, irrigation system, or water use devices such as washing machine, water heater, dishwasher, kitchen faucets, bathroom faucets, shower, and/or toilets, and any combinations thereof. Each independent flow sensor 105 sends a unique code to the CPU, microprocessor or microcontroller FIG. 3 84 for identification associated with the water use device. Each independent flow sensor 105 can communicate the water usage and data, by wired or wireless communication and using a unique code, to the water meter and leak detection system 10 (126 shown in FIGS. 6 and 200 shown in FIG. 7). The water data can be transferred to a remote device(s), e.g., remote display and/or a recording apparatus 50, FIG. 5 110 and/or cell or smart phones, computers, or similar apparatuses 400.

In another embodiment, which does not utilize an independent flow sensor at each water use device but rather a single flow sensor, and owner/user can enter into a programmed "Water Use Device Calibration" Mode by pressing a specific hard or soft button on the water meter and leak detection system (collection node) 10 (126 shown in FIGS. 6 and 200 shown in FIG. 7) or touch screen display FIG. 3 80, or by sending an electronic signal from a display and/or recording apparatus 50, 110 and/or another remote device such as a cell or smart phone, computer, remote computer, web portal, or one or more other electronic communication devices 400. During water use device calibration, the software display informs the user to turn on or cycle one water use device, fixture, or appliance (e.g., washing machine, dishwasher, shower) for a period. The water meter and leak detection system's software calibrates or monitors the water flow rate, water flow duration, and total water volume. The user continues the calibration process for each water use device (e.g., mains water supply, irrigation system, washing machine, water heater, dishwasher, kitchen faucet, bathroom faucets, toilets) until the water valves of specific water use devices, fixtures, or appliances are identified. The software can use calibration data from the collection node flow senses for each water use device and record its water use signature (the data may include variations of flow rates ever time). To facilitate or modify a factory specification software, default signatures and patterns which approximate irrigation, washing machine, water heaters, dishwashers, kitchen and bathroom faucets, and toilets, or each independent water use device, can be modified by artificial intelligence (AI) and software algorithms that adjust based on recalibrations of the water use devices at the private and/or public location. The water use data can be communicated to a display and/or a recording apparatus 50, 110 and/or cell or smart phone, computer, server, remote computer, web portal, or one or more other electronic communication apparatus 400, and the flow rates and water use for each water use device can be displayed appropriately. The water flow rate sensor(s) 105, optional pressure sensor(s) FIG. 3 65, optional temperature sensor(s) FIG. 3 93, and/or optional acoustic sensor(s) can contribute to monitoring water flow rates, water flow durations, and total water volumes. The optional pressure sensor 65 can monitor pressure patterns and establish pressure signatures. The optional acoustic sensor can monitor sound patterns and establish sound signatures. Thus, a set of localized sensors (e.g., flow rate sensor 105, optional pressure sensor 65, optional acoustic sensor, and/or optional temperature sensor) can be utilized and incorporated into the water meter and leak detection system 10 (126 shown in FIGS. 6 and 200 shown in FIG. 7). The optional pressure sensor(s) 65 and optional acoustic sensor(s) assist in identifying the specific water valve(s) for each water use device. If applicable, the water use device calibration mode can utilize pressure sensors to observe pressure patterns and establish pressure signatures and utilize acoustic sensors to observe sound patterns and establish sound signatures. The pressure sensor(s) and acoustic sensor(s) can identify water valve movement, and associated pressure and sound readings can also be used, to identify water valves of specific water use devices, fixtures, and appliances. The optional pressure sensor(s) and optional acoustic sensor(s) observe movement, vibration, and noise patterns (sound and pressure patterns) to identify water valves for specific water use devices.

It is anticipated by the Applicant that an "Automatic Learning Mode", where the software learns about the users' water use at a private or public property, can be completed without the calibration steps. The Automatic Sensor Learning Mode utilizes artificial intelligence (AI) and/or other software to perform this operation. In this embodiment, a flow rate sensor(s) FIG. 3 105, with optional pressure sensor(s) FIG. 3 65, optional acoustic sensor(s), and/or optional temperature sensor(s) FIG. 3 93 can be located within or near the water meter and leak detection system 10 (126 shown in FIGS. 6 and 200 shown in FIG. 7). A user can enter into a programmed "Automatic Learning Mode" by pressing a specific hard or soft button on the water meter and leak detection system 10 (126 shown in FIG. 6 and 200 shown in Fig. 7) or touch screen display 80, or by sending an electronic signal from a display and/or recording apparatus 50, 110 and/or another remote device such as a cell or smart phone, computer, remote computer, web portal, or one or more other electronic communication device 400. Such operational procedure initiates software to monitor the water use that occurs during the next days, weeks and/or months and, during this period, the learning AI software performs a comprehensive learning phase. In this Automatic Learning Mode, the water meter with leak detection system automatically tracks water use parameters over the period until sufficient data and information is observed. With the Automatic Learning Mode, the water meter and leak detection system 10 (126 shown in FIG. 6 and 200 shown in FIG. 7) monitors water use. Using the water flow rate sensor(s), water flow rates, variation of flow rates over time, water flow durations, and total water volumes can be monitored to observe water patterns and establish water signatures. The software can also track temporal patterns of water use during a specified time peried (e.g., day or week) to further characterize the water patterns and signatures of water use devices for a public or private building or structure. For example, in a private residence, several showers might occur during the early earning hours as individuals are getting ready for work or school. During weekends, the occurrence of showers might shift to later day hours. Similarly, washing machine and dishwasher water cycles might occur more frequently on weekends. The AI and software algorithms are used to monitor water use associated with the main water supply, irrigation system, and water use devices, fixtures, and appliances (e.g., washing machine, water heater, showers, dishwasher, kitchen and bathroom faucets). The AI software monitors water use data and tracks temporal characteristics and property occupation associated with water use (and non-water use), recording water usage with consideration of time and day/week/month/year. The water meter and leak detection system transfers water date to a remote computer(s) or server(s) with database(s). Subsequently, the water data can be transferred to a designated remote computer and database for registered cell or smart phone, computer, or other electronic apparatus to gain access.

Figure 7:
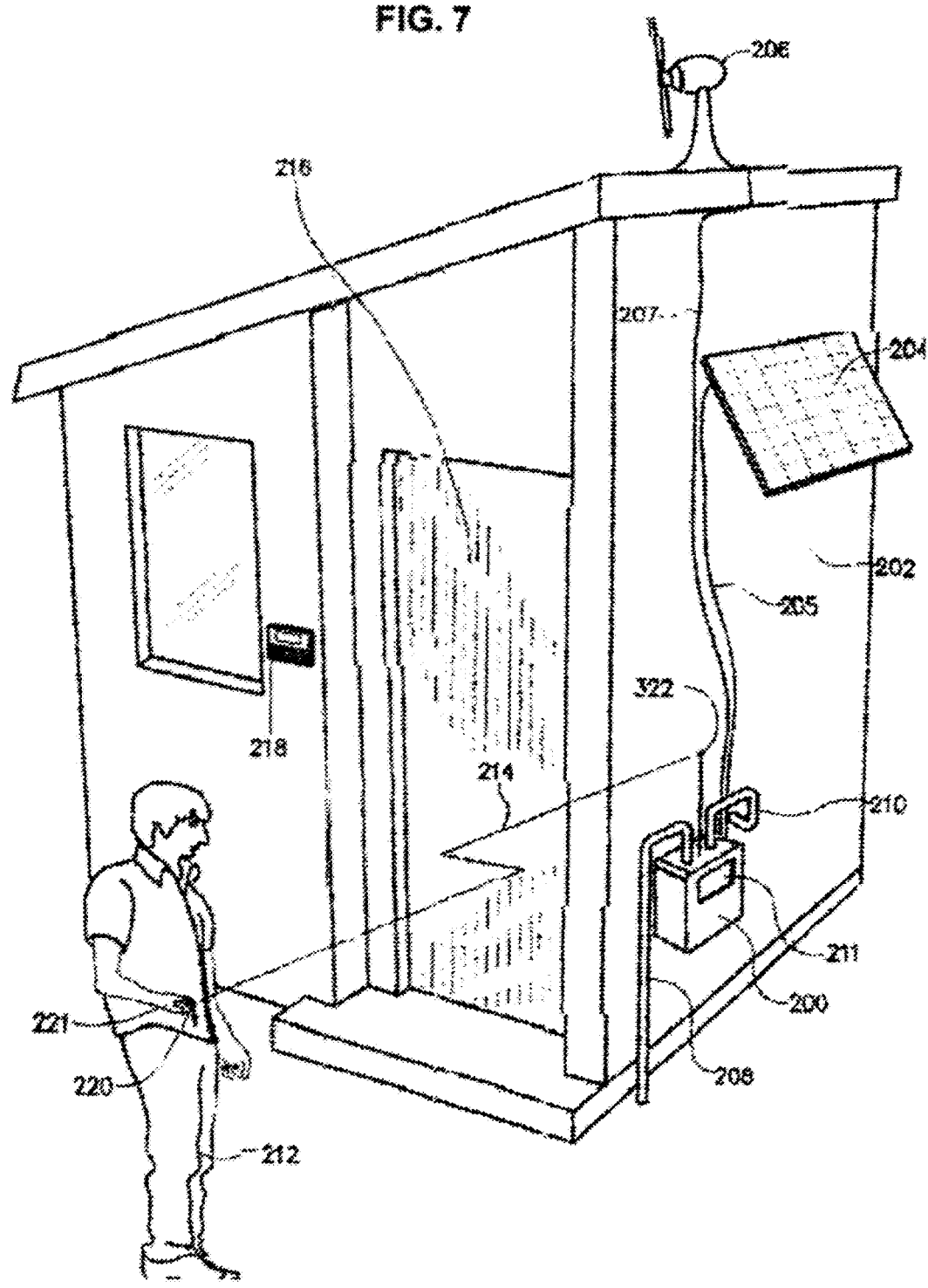
FIG. 7 is an illustration of the water meter and leak detection system attached to a residential building with wind and solar energy generation and a person having a cell or smart phone, computer, or similar apparatus communicating with the water meter and leak detection system for obtaining water parameter data or controlling a water control valve.

Since independent water valves have unique pressures and sounds patterns when closed or opened, the optional pressure sensor 65 and optional acoustic sensor can be incorporated into the water meter and leak detection system 10, 126 shown in FIG. 6 and 200 shown in FIG. 7) and function to assist in identifying the water valve(s) of specific water use device(s). The optional pressure sensor and acoustic sensor can supplement the flow rate sensor, providing pressure or sound patterns and signatures to further characterize water use devices. The optional acoustic sensor(s) observes movement, vibration, and noise patterns to identify water valves for specific water use devices.

For example, after a period of time, Automatic Sensor Learning Mode using AI and other software can monitor a washing machine's range of water flow used and records the water use duration periods, water flow rate patterns (water flow rates for washing machine cycles and variations of water flow rates over time including rate of flow at onset of water flow and rate of flow at completion of water flow). The Automatic Sensor Learning Mode can use optional pressure sensor(s) for determining variations in pressure patterns and can use optional acoustic sensor(s) for identifying water valve movement and sounds when opening and closing and any vibrations during fully open valve with water flowing through the valve. In another example, when a toilet is flushed, the Automatic Sensor Learning Mode software recognizes the toilet water use pattern. If a bathroom faucet is turned on for hand washing, the software can identify the combination pattern of the toilet filling and the faucet water use. In this case an optional acoustic sensor can identify and differentiate the toilet and bathroom faucet water valves to more accurately monitor the water used by these different water use devices at the public or private property or structure. The Automatic Sensor Learning Mode software can analyze, record, and store actual independent flow rates, variation of flow rate over time, duration periods, temporal activities, optionally variations in pressure patterns (e.g., rate of flow at onset of water flow and rate of flow when turned off), and any variations during water flow duration, and optional acoustic sensor observing water valve characteristics to assign the signature or pattern of water use for the toilet and bathroom faucet. In another example, either during or following a shower, the Automatic Sensor Learning Mode software recognizes the shower water use pattern. A non-tankless hot water heater begins adding water to replenish the hot water used for the shower. The software can analyze, record and store actual independent flow rates, variation of flow rate over time, water use duration, variations in pressure patterns (e.g., rate of flow at onset of water flow and rate of flow when turned off), and any variations during water flow duration, and optional acoustic sensor data to assign the pattern of water use to a particular water valve for the shower and hot water heater. In another example, irrigation watering usually occurs at a regular temporal pattern (generally in the morning or evening hours). The Automatic Sensor Learning Mode software can analyze, record and store water flow rates and duration patterns for irrigation cycles. The automatic learning software could record and store actual independent flow rates, variation of flow rate over time, expected duration, variations in pressure patterns (e.g., rate of flow at onset of water flow and rate of flow when turned off, and any variations during water flow duration, and optional acoustic/sound frequency) to assign the pattern of water use to a particular flow sensor for the irrigation cycle(s).

The water meter and leak detection system's water leak detection and monitoring capability can use wireless technology such Wi-Fi version 3/4/5/6 or WiFi7, (with Wi-Fi repeaters, extenders), Li-Fi, LoRa, Sigfox, Ultra Narrow Band, 6LowPAN, NB-IoT, M-Bus, WIMAX, Amazon Sidewalk, standard cellular technology, LTE-M cellular technology, 3GPP, 4G, LTE-M, and 5G cellular technology, Bluetooth and BLE, ZigBee, Z-wave or similar wireless protocols or other communication technologies using the TCP/IP or other OSI technology to transmit an alarm or message to notify of leak condition(s) at a private or public property(ies). Leak notification can be provided via call to a registered or designated cell or smart phone, remote computer, web portal, or similar electronic apparatus or the water meter and leak detection system can send an alarm(s) or message(s) directly to a facility or governing utility or municipality.

To increase wireless range, Wi-Fi meshing technology also provides compatibility with wireless routers. The water meter and leak detection system 10 (126 shown in FIGS. 6 and 200 shown in FIG. 7) can be divided into two main components: 1) "collection node water meter" or "collection node", which comprises a water meter with electrical circuitry with power source, CPU/microprocessor/microcontroller, sensor(s) (water flow rate sensor(s), optional temperature sensor(s), optional pressure sensor(s), and/or optional acoustic sensor(s)) and 2) a receiving hub or "communication hub (repeater apparatus) 477 having electrical circuitry, CPU, and one or more corresponding RF or cellular radios that communicate with the collection node water meter with one or more RF radios or cellular technology. The communication hub can perform as one or more repeater devices. Alternatively, the communication hub 477 can be hardwired or use wireless communication with an internet router. The water meter collection node's electric circuitry includes a generally low power long-range wireless radio with a power source that can be AC or DC voltage, one or more standard or rechargeable batteries (lithium ion), and/or super capacitors. The collection node can utilize one or more rechargeable batteries and/or super capacitors that can be supplemented with a water turbine electric generator. The water meter collection node communicates wirelessly with the communication hub 477. The communication hub 477 has a second CPU, second microprocessor, or second microcontroller and a second electrical circuitry generally with a corresponding second wireless communication transceiver(s) (or low power long-range wireless radio), a Wi-Fi radio (or hard wired), and a second power source (battery or AC or DC voltage). The communication hub 477 extends the range of the wireless communication transceiver(s) of the base station(s) or performs as a repeater device. In one embodiment, the communication hub 477 has one or more second wireless communication transceiver(s), including Wi-Fi version 3/4/5/6, Wi-Fi7, Li-Fi, LoRa, Sigfox, Ultra Narrow Band, 6LowPAN, NB-IoT, M-Bus, WIMAX, Amazon Sidewalk, standard cellular technology, LTE-M cellular technology, 3GPP, 4G, and/or 5G cellular technology 103, that has a corresponding radio that communicates with the water meter collection node (that likewise has a corresponding Wi-Fi version 3/4/5/6, Wi-Fi7, Li-Fi, LoRa, Sigfox, Ultra Narrow Band, 6LowPAN, NB-IoT, M-Bus, WIMAX, Amazon Sidewalk, standard cellular technology, LTE-M cellular technology, 3GPP, 4G, and/or 5G cellular technology. The communication hub 477 can have another second wireless communication transceiver(s) including Wi-Fi (Wi-Fi versions 3/4/5/6 or Wi-Fi7) technology that communicates with a wireless router or, alternately, RF and/or cellular radio that communicates with a private or public corporate network. The communication hub 477 can also have a limited range radio (Bluetooth, Bluetooth low energy (BLE), ZigBee, or Z-Wave) designed to have local authentication pairing technology or to update software procedures. The communication hub 477 can alternately be hard wired to the router and then the Wi-Fi (Wi-Fi versions 3/4/5/6 or Wi-Fi7) radio is not a necessary, or becomes a disabled component, of the electrical circuitry. The communication hub 477 includes software to process the transmissions from the collection node to at least one of Wi-Fi/router and wired/router that connects to the internet, or to a private or corporate network. The communication hub 477 need software instructions to process authentication pairing or software updates. The water meter collection node can communicate with one or more water meters collection nodes and/or with one or more communication hubs 477 (using mesh technology and/or point-to-point or peer-to-peer technology). The communication hub 477 can wirelessly communicate with one or more water meter collection nodes and/or with one or more communication hubs 477 (using mesh technology and/or point-to-point or peer-to-peer technology). The second wireless communication transceiver(s) are configured to: 1) perform an authentication pairing procedure to establish a remote wireless communication connection with the wireless communication transceiver(s), 2) communicate with the wireless communication transoeiver(s), 3) communicate with the wireless communication transoeiver(s) via mesh technology, point-to-point connection, and/or peer-to-peer connection, and/or 4) communicate with one or more access points. The communication hub 477 can also serve as a repeater apparatus receiving water data and transmitting water data to also provide longer wireless range capability.

Some wireless routers support a form of point-to-point or bridging operation which could be used to transfer water parameter data from the water meter collection node to a communication hub 477. Other proprietary protocols can be used with the water meter and leak detection system 10 (126 shown in FIGS. 6 and 200 shown in FIG. 7), for example, ISM (industrial, scientific, and medical) bands. ISM bands are defined by the ITU-R in 5.138, 5.150, and 5.280 of the Radio Regulations. Countries' individual use of ISM bands may differ due to variations in national radio regulations. Communication devices using ISM bands must tolerate any interference from ISM equipment. In the United States, ISM bands use is governed by Part 18 of the FCC rules, while Part 15 Subpart B contains the rules for unlicensed communication devices including those that use the ISM frequencies. Part 18 rules restrict but allow access to using ISM for certain communications such as FCC licensed 450-470 frequencies. The ISM bands defined by the ITU-R or FCC licensed are:

| Frequency range [Hz] | Center frequency [Hz] |
| --- | --- |
| 6.765-6.795 MHz | 6.780 MHz |
| 13,553-13.567 MHz | 13.560 MHz |
| 26.957-27.283 MHz | 27.120 MHz |
| 40.66-40,70 MHz | 40.68 MHz |
| 433.05-434.79 MHz | 433.92 MHz |
| 450-470 MHz | 460 MHz |
| 902-928 MHz | 915 MHz |
| 2.400-2.500 GHz | 2.450 GHz |
| 5.725-5.875 GHz | 5.800 GHz |
| 24-24.25 GHz | 24.125 GHz |
| 61-61.5 GHz | 61.25 GHz |
| 122-123 GHz | 122.5 GHz |
| 244-246 GHz | 245 GHz |

Cell phones receive and transmit electromagnetic waves that exist between 800 and 2400 megahertz and the most popular protocols are CDMA, W-CDMA, GSM, 3GPP, 4G, LTE-M, 5G, EDGE, HSPA, and other generations.

Many newer internet protocols have been developed, commonly known as an application programming interface (API). Via an API, the wireless communication transceivers transmit water data, from the base station to the remote computer systems, and receive, from the one or more remote computer systems or from the one or mere electronic communication devices communicating through the one or more remote computer systems, the signal or the command to conduct an operational procedure. An API for website usage is a code that allows two software programs to efficiently communicate with each other. The API defines the proper way for a programmer or developer to write software instructions in the program separate from an operating system or other application. One such API is the RestAPI system which aims for fast performance, reliability, and the ability to grow, by re-using components that can be managed and updated without affecting the commercial system. A RestAPI uses HTTP requests to GET, PUT, POST and/or DELETE data or send control signals. A RestAPI, also referred to as a RESTful web service, is based on the representational state transfer (REST) technology, an architectural style and approach that has communications often used in web service development. REST technology is the generally preferred API protocol because it leverages less bandwidth, making it more suitable for internet and IoT usage. The REST is used by a web browser and can be thought of as the language of IoT. With cloud company services on the rise, APIs are being developed to facilitate communication with web services. REST is a logical choice for building APIs that allow users to connect and interact with cloud services and web-based companies.

RestAPI has a uniform interface, which serves as the interface between clients and servers. The uniform interface simplifies and decouples the REST architecture, which enables the clients and servers to evolve independently. Four guiding principles of the uniform interface are described below.

First, by using resources for identified the Uniform Resource Identifiers (URIs) as resource identifiers. The identifiers are separated from the representations that are returned to the client. The commercial or private server does not transfer data directly from the database, but rather, utilizes HTML, XML or JSON code that is designed to represent database records expressed in variable width character encoding, depending on the details of the structured query language (SQL) request and the server implementation.

Second, a representation of a resource, including any metadata attached, is verified by the software that will verify enough security information to modify or delete the resource on the server only under proper server permissions.

A third process reviews each message and includes enough information to describe how to process the message invoking specified content by an Internet media type. Responses also explicitly indicate their cache-ability.

Fourth, the delivery of data or information utilizes SQL or non-SQL parameters, body content or headers, and requested URI for transmission communications. Computers or servers respond via body content, response codes, and response headers to the request. Hypermedia as the Engine of Application State (HATEOAS) links are contained in the returned body (or headers) to supply the URI for retrieval of the database objects from a remote computer server(s) with database(s).

Stateless or statelessness of the REST architectural style and associated RestAPI protocol handles any sent requests, whether as part of the URI, query-string parameters, body content, or headers. The URI uniquely identifies the resource, identifies the body content, and contains the state (or state change) of the resource. After server/computer processes the request, the appropriate state (or the piece(s) of state that matter) is communicated back to the requestor via headers, status, and response body. In REST, the client should include all information for the server to fulfill the request.

Well managed caching serves to facilitate client-server interactions, further improving scalability and performance. Since computers and servers are not concerned with the user interface or user state, these devices can be simple and scalable. Computers and servers may be replaced and/or developed independently and the RestAPI interface is maintained unaffected.

A user cannot ordinarily determine whether it is connected directly to the computer or server, or to an intermediary computer. Intermediary computers or servers may improve system scalability by enabling load-balancing and by providing shared caches. And RestAPI protocol layers may enforce security policies and provide redundant data storage.

Once a user sets up a service, an activation application delivers a first display to the user on either a display means of the cell or smart phone, computer, or similar apparatus 400, smart internet TVs, smart central hub listening and speaker devices, or home control systems, or on the water meter and leak detection system 10 (126 shown in FIGS. 6 and 200 shown in FIG. 7), and/or on a display means on the remote devices 480. Pairing technology or other application secure means associates a new user with a remote device and the installed water meter and leak detection system 10 (126 shown in FIGS. 6 and 200 shown in FIG. 7). For example, when the new user activates the APP the first screen will request the SSID and password of the local LAN or wireless router and then records this for subsequent access or, alternately, scan a QR code with the cell phone. A computer program or web portal can use the internet to allow access for a new user's water use and leak detection data by inputting a username and password or by using a two-step or three-step authentication scheme.

There are many transfer protocols that may be used to communicate and transfer water use and water quality data or information with the water meter and leak detection apparatus 10 (126 shown in FIG. 6 and 200 shown in FIG. 7). This list includes Direct Internet Message Encapsulation (DIME); Simple Object Access Protocol (SOAP); an architectural style that sends requests and receives responses using methods to access and process data for different systems over the Internet using GET, POST, PUT, DELETE, PATCH, HEAD, TRACE, CONNECT, and OPTIONS as the Representational State Transfer API (Rest-API protocol); a platform that uses a JAVA development software kit to facilitate communication between APPS and external service over HTPP (JAVA API); a document object module that is written in JavaScript and uses Java to handle operations of a web document (DOM API); a simple event-driven algorithm for lexing and parsing XML documents (SAX API); a bidirectional read and write event-driven method for lexing and parsing XML documents and addresses limitations in SAX and DOM (StAX API); an extensible markup language application programming interface (XML API); and other application programming interface protocols that provide a control system architecture and/or protocol where a response can be incorporated into another protocol or format.

The water meter and leak detection apparatus 10 (126 shown in FIGS. 6 and 200 shown in FIG. 7) can require the transfer of water use and water quality data or leak detection information, using security measures, due to violation of municipal or governmental laws and ordinances, and for obstructing fraudulent activities.

There are several important security techniques that, taken as a whole, or in part, function to meet the objectives to provide secure communications, including authentication, integrity, encryption, and non-repudiation.

Two of the best-known uses of public key cryptography are the Public Key Encryption (PKE) and the Digital Signature protocols. PKE is a message or command signal that is encrypted with a recipient's public key. The message cannot be decrypted by any individual or machine that does not possess the matching private key. PKE is a security protocol that is used to maintain confidentiality. Similarly, Digital Signatures are messages or control signals that are signed with the sender's private key and that can be verified by any individual or machine that has access to the sender's public key. This verification proves that the sender had access to the private key and, therefore, is likely to be the proper individual or machine to gain access to the message or command signal. Usually a one-way hash, a small portion or section of data that can identify and be associated with a large volume of data or information, is utilized, and also provides authentication and integrity security measures. Hash functions are known to be resistant to reverse engineering (Secure Hash Algorithm). The Digital Signature protocol also ensures that the message or command signal has not been tampered with, as the original Digital Signature is mathematically bound to the message and verification will fail for practically any other message or command signal. Both PKE and Digital Signatures protocols can be used with the water meter and leak detection apparatus 10 (126 shown in FIGS. 6 and 200 shown in FIG. 7). The strategy of PKE is that each user has a pair of keys; first, a public encryption key, and second, a private decryption key.

Various encryption algorithms include the original RSA algorithm, Advanced Encryption Standard (AES), Data Encryption Standard (DES) and Triple DES.

Secure technologies include the Secure Sockets Layer ("SSL") which creates a secure connection between two communicating programs or applications. SSL is a standard security technology for establishing an encrypted link between a server and a client; typically, a web server and a mail server or a mail client (e.g., Gmail). SSL uses encryption algorithms to scramble data while in transit, preventing hackers from reading it as it is sent over the internet or other connections. The SSL protocols are commonly utilized by web browsers and web servers in conjunction with HTTP protocol to perform cryptographically secure web transactions. Transport Layer Security (TLS) is an example of an updated, and more secure, version of SSL. A web resource retrievable with HTTP over SSL is usually represented by the protocol identifier "https" in the URL. Secure HTTP (S-HTTP) provides independently applicable security services for transactions using confidentiality, authenticity, and integrity technology.

Another security technology is the Internet Protocol Security ("IPSec") which protects internet protocol traffic across the Internet and is particularly useful for implementing VPNs that utilized tunnel and encryption techniques. IPSec originally utilized an IP authentication header. IP encapsulating security payload is an optional packed header that can provide superior confidentiality through encryption of the packet. Point-to-Point Tunneling Protocol ("PPTP") is another secure protocol that allows entities to extend their local network through private "tunnels" over the Internet. Layer Two Tunneling Protocol ("L2TP") is an extension of the PPTP protocol.

A Media Access Control Address ("MAC Address") is a unique number assigned to a network interface controller for communications with the data link layer of the Open Systems Interconnection Model (OSI Model). The MAC address is appended to a digital message and provides authentication and integrity for the message.

A further security protocol, the extensible Markup Language (XML) Signature associates a cryptographic signature value with Web resources using XML markup. XML signature also provides for the signing of XML data. Javascript object notation (JSON) has become a more popular alternative to XML for various reasons, for example, JSON is less verbose than XML, which uses more words that are necessary, and JSON is faster parsing whereas XML software is generally slow and cumbersome.

The water meter and leak detection system 10 (126 shown in FIGS. 6 and 200 shown in FIG. 7) should communicate securely with remote displays/recorders 18, 56 or cell phone, smart phone, or similar apparatus 400 and, therefore, the systems need to be provided with unique identities. The identity must not be easy to detect either intentionally or accidentally.

Residential and corporate location identity are particularly relevant in multi-site scenarios, where the water meter and leak detection system 10 (126 shown in FIGS. 6 and 200 shown in FIG. 7) are aggregated across a wide geographic area containing multiple sites, serviced by multiple utilities, each site operating on one or more municipal agencies. Each water meter and leak detection system 10 (126 shown in FIGS. 6 and 200 shown in FIG. 7) will need to identify itself when transmitting water use or water quality data or information, or when queried by a civil, commercial, municipal or governmental operator or agency.

Each water meter and leak system apparatus 10 (126 shown in FIGS. 6 and 200 shown in FIG. 7) will have its own identification means that will be recorded in a remote database. The identification can be the Media Access Control (MAC) address (OSI data layer), internet TCP/IP address (OSI transport and network layers), private or public property(ies) building address or users email address, and/or will incorporate a distinctive set of numbers or characters associated with a particular municipality or governmental agency.

It can be essential that water meter and leak detection systems 10 (126 shown in FIGS. 6 and 200 shown in FIG. 7) will have a similar identity within a specific geographical area. It might also be preferred that the entity, municipality or authority name becomes a portion of the unique identification code. During the fabrication process, the unique identification code could include adding a unique municipality or authority name code in the water meter and leak system apparatus 10 (126 shown in FIGS. 6 and 200 shown in FIG. 7) or as software downloaded upon installation or inserted during a repair or maintenance periods.

Public Key Infrastructure (PKI) can also be used in sensor/device in remote receiver situations where encryption and authentication techniques are required. However, many companies and governmental agencies are replacing PKI with a two-step authentication procedure using recorded personal information including alternate email addresses and telephone numbers.

A unique identification code registry is maintained within a remote database that is associated with the installation and operation of water meter and leak detection system 10 (126 shown in FIGS. 6 and 200 shown in FIG. 7). The unique identification code registry may be updated whenever a water meter and leak detection system 10 (126 shown in FIGS. 6 and 200 shown in FIG. 7) is brought into or removed from service. The unique identification code registry may be incorporated into the relevant remote database with a unique host name (e.g., municipality or governmental agency) or installation region encoded within the unique identification code. This would result in several databases that are unique to a given municipality, governmental agency or geographic region. Alternatively, the unique identification registry can be implemented as a single large database. The registry can be implemented as a relational database (e.g., MySQL, MariaSQL), non-relational database (e.g., Amazon DynamoDB), XML files, Comma Separated Value (CSV) Excel files, or Resource Description Files (RDF), or any mechanism that allows associated verification when combined with the appropriate software analysis. The unique identification registry enforces distinctiveness, thereby preventing two water meter and leak detection systems 10 (126 shown in FIGS. 6 and 200 shown in FIG. 7) from having the same unique identification code.

Encryption, authentication, integrity, and non-repudiation may be important characteristics when the water meter and leak detection system 10 (126 shown in FIGS. 6 and 200 shown in FIG. 7) is transferring water use/data or water quality data or information to a remote server/database via a public or private network or providing subsequent access to registered computers and cell, smart, and mobile phones 400. When water meter and leak detection system 10 (126 shown in FIGS. 6 and 200 shown in FIG. 7) receives or uploads data and information such as a control command signal to send or transmit data and information, it is important that the device can authenticate the sender and ensure the integrity of the data and information. Encryption provides privacy by converting the data or information into an "encrypted" code to prevent unauthorized access. Encryption can be provided point-to-point or peer-to-peer or end-to-end, and messages can be transmitted using encryption schemes such as Pretty Good Privacy (PGP), Secure/Multipurpose Internet Email (S/MIME), XML, or SSL encryption protocols. Non-repudiation prevents the sender from denying that they sent or received data/information or a message. Non-repudiation can be provided by signing, electronic witnessing, and technologies that assert a document was read before it was signed.

A newer form of encryption is known as zero-knowledge encryption. In zero-knowledge encryption, a recipient's data is always secured because the decryption key lies with only the intended recipient. The service provider knows nothing about your encryption key and the data you are processing. In the event of a server attack on your service provider, hackers will get nothing except gibberish text because you hold the encryption key. The objective of zero-knowledge encryption is simple-only you can access encrypted data.

Block chain is a collection of data records that is recorded into a decentralized digital ledger. The digital data is organized into pieces that are sequentially arranged and encrypted. A block chain is a trustworthy chain of blocks, each of which contains a list of previously validated transactions. The block chain network functions as a decentralized database since it is maintained by numerous computers that can be located worldwide. This means that each participant/computer or node maintains a copy of the blockchain data and interacts with one another. Block chain transactions utilize a peer-to-peer global network as block chain is not under the control of a single entity. Mining, which is based on the hashing algorithms, is an essential component of almost every block chain. Bitcoin employs the SHA-256 algorithm (Secure hash algorithm 256 bits). In this example, the final output is generally known as a "hash," and it is consisting of 64 characters (256 bits). After determining that the transaction is authentic, miners encode the transaction into a block (sometimes with many other transactions) and attempt to mine the block. This is performed by running the SHA-256 algorithm on the block. Miners try random nuances until they achieve a correct output hash since a little change in the input substantially impacts the result. The miner publishes the block to other miners after it has been mined. They then confirm the authenticity of the block before adding it to their copy of the block chain, and the transaction is complete. However, miners must also include the preceding block's output hash in the block so that all blocks are associated, thus the word "blockchain". Blockchain technology is becoming more commonplace in the financial industry. But blockchain technology can be used for many types of data, such as water flow event data. One of the main advantages of blockchain technology is that non-repudiation is nearly immutable. Blockchain technology can be used to transfer the water flow data utilizing a blockchain format to one or more remote computers or servers, to a cloud service company or a web-based company. Here, the water meter and leak detection system 10 (126 shown in FIGS. 6 and 200 shown in FIG. 7) can include digital signature technology, data packets or messages using PGP, S/MIME, XML Signature or TLS/SSL to provide for non-repudiation of those messages, information or data. The wireless communication transceiver(s) and/or the second wireless communication transceiver(s) are configured to use a blockchain technelegy to transmit the water data and receive the signal or the command.

The water meter and leak detection system 10 (126 shown in FIGS. 6 and 200 shown in FIG. 7) will transfer data to remote computers or servers whereby a user can obtain water use data, water energy data, or water quality information on a predetermined or programmed frequency. The preferred method of water flow sampling rate and data transfer will be on a water flow event basis which monitors the initiation of water use, the initial water flow rate, and intermediate water flow rates and, when the water ceases to flow (turned off), the water use duration and total water used is calculated. The frequency or water sampling rate can be programmed for various periods, e.g., once every 1-30 seconds (for monitoring the water flow event), once per minute, once or twice per hour, once per day, once per week, once per month or once per year and can be transferred to a remote computer/server and accessed by a cell phone, smart phones, mobile phone, computer, or other mobile electronic communication device. Also, there is flexibility as to when the data or information is sent to be processed by an automated system, e.g., when reports are only created every day, or week, or month. The water meter and leak detection system 10 (126 shown in FIGS. 6 and 200 shown in FIG. 7) can be programmed to automatically have a sampling rate (after a sleep mode) and communicate at every 1-30 seconds or other time frequencies, such as every 5 seconds or every minute, for various purposes, for example, to identify leaking conditions. In this case, data transfer and signature calculations can be executed when there is free processing time. This scheme performs well with the water meter and leak detection system 10 (126 shown in FIGS. 6 and 200 shown in FIG. 7) where important real-time calculations can take up significant available calculation time for small periods, but over time periods of a few hours, when water is not flowing, there is processing time to spare.

In an alternate embodiment, the encrypted data is transmitted optionally to a local router/server and then across the Internet or cell tower technology, or via directly to a public or private network as it has been described herein. This is accomplished directly by the water meter collection node or by using remote receiving stations or communication hub 477 with Wi-Fi, Wi-Fi versions 3/4/5/6, Wi-Fi7, Li-Fi, LoRa, Sigfox, WiMAX, Ultra Narrow Band (UNB), NB-IoT, M-Bus, 6LoWPAN, and Amazon Sidewalk technology 103 wireless or wired directly to the internet router that communicates to remote servers. In the LoRa, Sigfox, WiMAX, Ultra Narrow Band (UNB), NB-IoT, 6LoWPAN, M-Bus, standard Wi-Fi, Wi-Fi versions 3/4/5/6, Wi-Fi7 (with Wi-Fi extenders), and Amazon Sidewalk technology 103 wireless communications, the current marketed routers would have to be modified to receive the LoRa, WiMAX, M-Bus, UNB, 6LoWPAN, NB-IoT, or SigFox wireless half or full duplex transmission. This has the advantage that the water meter and leak detection system 10 (126 shown in FIGS. 6 and 200 shown in FIG. 7) does not need to store data but can continue to encrypt data.

The water meter and leak detection system 10 (126 shown in FIGS. 6 and 200 shown in FIG. 7) can include a removable or a non-removable storage device that can contain water use and/or water quality data. This removable storage device may be removed when there is a disruption in wireless transmittal of data, to upgrade configuration programs, or to download stored data for subsequent analysis. The water meter and leak detection system 10, (126 shown in FIGS. 6 and 200 shown in FIG. 7) may be fitted with a physical lock that prevents unauthorized individuals from detaching the removable storage device.

Software may be designed to validate digital signatures before water use data, water quality data, or information can be downloaded or allow registered users to upload updated software and/or firmware. The water meter updated software and/or firmware may incorporate its own code (e.g., RestAPI) to verify digital signatures to ensure that the original software and/or firmware has not been tampered with and is from an authorized source. The uploaded firmware or software can be written in various languages, such as Java, Javascript, NodeJS, Prolog, Haskell, binary executable code, C+ and C++, and ECMA Common Language Runtime ("ECMA CLR"). In additional, the water meter and leak detection system 10 (126 shown in FIGS. 6 and 200 shown in FIG. 7) or the remote display means 18, 50, 56, or computer, cell, smart or mobile phone 400 could include a microprocessor that has a data memory bank with data memory that stores the water data that can be compared with the data that has been transferred and uploaded by the government or municipal second remote display/recorded means 56.

In addition, any stored data, including cached data and data stored in a database, is identified with a digital signature. When the data is retrieved, the digital signature can be used to verify that the data has not been tampered or changed.

Figure 2:
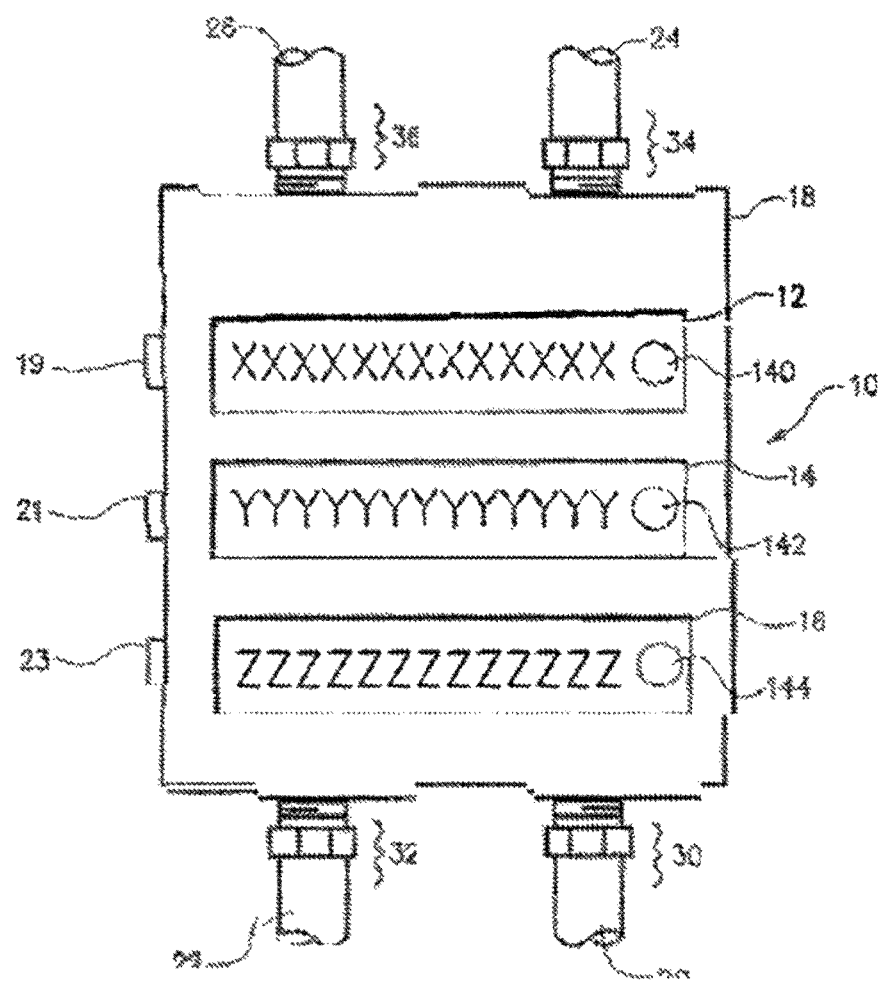
FIG. 2 is a front illustration of an optional display on the apparatus base showing one or more inputs and outputs of water supplies lines with a display means having one or more display screens and a plurality of hardware and/or software buttons.

Referring now to the drawings, and particularly to FIG. 2, is a perspective view of the first embodiment comprising an optional primary or secondary water meter and leak detection system 10 (126 shown in FIGS. 6 and 200 shown in FIG. 7) attached to the cold and hot input water supply piping and water supply piping. The plurality of water pipe unions or joints 30, 32, 34 and 36 can be fabricated from typical metallic or polymeric materials.

Also shown in FIG. 2, one or more optionally and ergonomically 19, 21, and/or 23 placed buttons or activators can be incorporated into the display housing to allow modification of certain parameter units (e.g., metric to US), set alarm conditions, or set water flow rate limits, water use limits, or total volume limits, or to program certain settings, e.g., over water use alarm, continuous leakage alarm (e.g., irrigation or toilet flapper valve not completely shut off). It is anticipated by the Applicant that alarms and set points can be programmed remotely using a wireless electronic communication device or remote computer.

A visual alarm or signal can be incorporated into the present invention whereby a preset alarm or programmed alarm, changes one or more of the screen displays, for example, blinking a parameter, or changing the color of a parameter (green to red).

An optional visual alarm might include visual reference on the water meter or on a cell phone, or other device, for example, an in-operative condition, broken sensor, low power source, no flow, reverse flow, and/or some default limits. Programmed visual alarms would allow for individual selection (e.g., volume over set point, flow rate set point, total volume exceeded set points) which might be restricted or not by the default settings.

In addition, an auditory alarm can be incorporated into the present invention whereby a preset alarm or programmed alarm, changes the screen display, for example, using sound or pulsing a specific noise, or changing the color of a parameter. For example, the temperature or pressure display can change from green to red when a preset temperature or pressure is beyond a specific or programmed limit. A preset alarm might include visual reference, for example, an in-operative condition, broken sensor, low power source and some default limits. Programmed auditory alarms would allow for individual selection (e.g., water use over set point, time past set point, flow rate set points) which might be restricted or not by the default settings.

In addition, the water meter and leak detection system 10 (126 shown in FIGS. 6 and 200 shown in FIG. 7) can include an operational procedure that allows the water control valve mechanism to shut off or turn on the water supply if an alarm condition or setting point is exceeded and has been activated. The water control valve mechanism 310 (FIG. 8 and 9) can also be programmed or used to turn the water supply on and off during a work or vacation schedule. The water control valve mechanism (shut off/on valve) 310 is electrically connected to the CPU or microprocessor and has an electrical power to move a ball valve position or energize a solenoid valve, controlling the application of electrical power to activate or de-activate the water control valve mechanism. The water control valve mechanism can comprise, for example, a typical electronically controlled ball valve or solenoid shut off valve incorporated into, or in series with, the water meter collection node. The electronically controlled ball or solenoid valve can also be incorporated into the water meter collection node as an integrated unit. The water control valve mechanism (shut off/on means) 310 can be activated if an alarm state has been achieved, e.g., 200 gals/day of water is exceeded, or e.g., a total of 50 gallons of water has flowed in an unusual duration since the water source was opened. The alarm or settings can be a default setting installed by the manufacturer or programmed by the user. In addition, the water meter and leak detection system can have capabilities such as a vacation mode that turns off the water on a specific date and then turns on the water on a return date. A scheduling mode can also be programmed that turns off the water when the home is unoccupied, e.g., when the family is at work from 8 a.m. to 5 p.m. In addition, the scheduling can be coupled with the vacation mode to allow the water to be turned on only for the date and times the irrigation is desired (operational procedure). The water control valve mechanism 310 can have a variable open design whereby different openings of e.g., ball valve by electrical activation or de-activation can change the resulting flow rates. The water control valve mechanism 310 can be a three-way design that functions to control the turning on or off the water supply and uses the third port to drain water from the home or corporation if freezing conditions are observed.

Now referring to FIG. 3, shown is a is a timing clock integrated circuit 88 with data transfer means 89 for communicating with the CPU or microprocessor, or microcontroller 84 and having a power line 85 and ground line 86. The timing circuit 88 can communicate with the CPU, microprocessor, or microcontroller 84 to an optional display 80 such information, such as the time of day and current date and/or a time stamp for the duration that the water supply has been turned on and off. For monitoring the time stamp parameters of the water flowing through the present invention, the use of various types of trip switches or water sensors close to the flowing water can be monitored. The timing clock IC 88 will assist by communicating a signal to the CPU or microprocessor 84 that the water supply has been turned on and then shut off such that the software instructions and CPU or microprocessor can calculate various parameters, such as, but not limited to, the duration of water supply, total number of gallons or liters of water used, and flow rates.

FIG. 3 shows an optional temperature sensor and associated temperature integrated circuit 93 with a data transfer means 92 for communicating with the CPU, microprocessor and/or microcontroller 84 and having a power line 96 and ground 97. Also shown is one or more flow sensors 105 (e.g., flow rate, pressure, ultrasonic, turbine, acoustic), a data transfer means 108 for communicating with the CPU, microprocessor and/or microcontroller 84, a power line 106, and ground line 107. The integrated circuits for the timing clock 88, temperature sensor 93, and flow sensor 105 can include circuitry to convert analog data to a digital format. Also shown is a first wireless electronic communication radio or means 58 consisting of Bluetooth, Bluetooth low energy (BLE), Z-wave, Zigbee, or other similar short-range wireless technology 102 with a data transfer 59. A second wireless electronic communication radio or means 61 with a data transfer 62 consisting of Wi-Fi, Wi-Fi versions 3/4/5/6, Wi-Fi7, Li-Fi, and other similar wireless technology where data transfer means 62 communicates with the CPU 84. A third wireless electronic communication means 63 with a data transfer means 64 consisting of LoRa, Sigfox, WiMAX, Ultra Narrow Band (UMB), NB-IoT, M-Bus, Amazon Sidewalk Technology, 6LoWPAN, and other long-range wireless technology where data transfer 64 communicates with the CPU 84. The third wireless communication can also include cellular technology (46 as shown in FIG. 1) that is designed to communicate data utilizing a cellular format (standard 2G, 3GPP, LTE-M, 4G, and/or 5G cellular) with connection to offsite central monitoring computer(s) using cell towers and other telephone lines via satellite, microwave technology, and the internet. Such cellular format could be CDMA, GSM, or another advanced cellular formats (3GPP/LTE-M, 4G and 5G).

Also shown in FIG. 3 is an optional display 80 with a power line 81 and ground line 82. The display can utilize LCD, LED, gas plasma, fluorescence, incandescent, halogen, halide, or other lighting technologies.

An optional water energy generator 95 with data transfer communication 99 for communicating with the CPU, microprocessor and/or microcontroller 84 with a power line 78 to the main power supply 98. The water energy generator 95 can be a turbine, paddle, Pelton type, or other similar technology. Recharging batteries 87 or super capacitors 94 can be accessed from a waterproof door of the collection node housing or with a water-proof electrical coupler on the housing where the one or more batteries reside outside of the housing for periodic maintenance.

Also shown is an optional pressure sensor 65 with data transfer communication line 67 and a power line 69 and ground line 68. Pressure sensors are valuable in detecting small changes in water pressure for determining valve opening and closing and generating decay curves. Pressure sensors are also particularly advantageous for detecting small leaks when the water control valve mechanism 310 is closed and pressure changes are monitored.

Main power 98 includes a power line 85 and a ground line 86. The main power 98 is preferably one or more batteries 87 and/or one or more super capacitors 94 as the power source. With one or more batteries or super capacitors, it would be possible to have the water energy generator 95 to supply energy generated during periods that water flow occurs, An example of long-life batteries that can be used with the water meter with leak detection system 10, 126, 200 are the industrial lithium thionyl chloride ($LiSOCl_2$) bobbin-type or spiral wound batteries produced by companies such as Tadiran Battery company. Super capacitors store energy by the method of static charge caused by a voltage differential on positive and negative plates. Super capacitors should have a high capacitance which is ideal for applications that require frequent charging and discharging at high currents and short durations. A super capacitor can also operate like a battery with the addition of special electrodes and electrolytes to increase its energy density. Higher voltages can be produced, but the trade-off is shorter service life. To obtain higher voltage, super capacitors must be connected in series. When two or more super capacitors are connected in series, protective circuitry is required to prevent any cell from going over-voltage. The self-discharge rate of a super capacitor can be much higher than a Li-ion battery, as certain super capacitors can discharge 50% to 100% of their available capacity in 30 to 40 days. A $LiSOCl_2$ bobbin type battery with a hybrid super capacitor would be an ideal cell power source that offers the highest capacity and highest energy density of any sole lithium cell, along with an extremely low annual self-discharge rate.

It is anticipated that solar panels (water meter box cover) or a wind generator can be also used to supply electrical energy. It is also anticipated that AC or DC (AC-DC adapter) can be used for electrical energy.

The CPU, microprocessor or microcontroller 84 that processes the information supplied by the flow sensor 105, the optional temperature sensor 93, the optional pressure sensor 65, and the timing circuit 88 uses internal instructions to control the information projected on a display, transfer water use data by wired or wireless communication, and process leak detection alarm states. The CPU, microprocessor, or microcontroller 84 can include an EPROM or any type of memory section that allows for specific programming to be incorporated as processing instructions. Furthermore, the microprocessor may have the capability to convert analog signals into digital information for decoding and processing.

In addition, a means to record and digitally store the water parameters or data can be incorporated into the present invention. An integrated memory circuit can be incorporated into the CPU or microprocessor 84, or a separate memory circuit can be used and can include associated circuitry with a means to transfer the recorded data to a removable media, such as a flash mount on an electronic circuit board to control the display means and communicate with the sensors The memory includes instructions that, when executed by the CPU, the microprocessor, or the microcontroller, monitors water data of the building(s) or structure(s), the watar data comprising water flow rates, water flow durations, total water volumes, or water energy uses.

Because the water meter and leak detection system can be used in situations where the source of water comes from a well or non-commercial operation and, furthermore, where the commercial operations water treatments plants are under pressure to provide more water supplies or where problems, breakdowns or accidental situations can cause contamination of the water source, the present invention can be fitted with one or more water quality sensors to display parameters of, and provide warning for, numerous mineral, elements and biological contaminates.

Figures 4, 5:
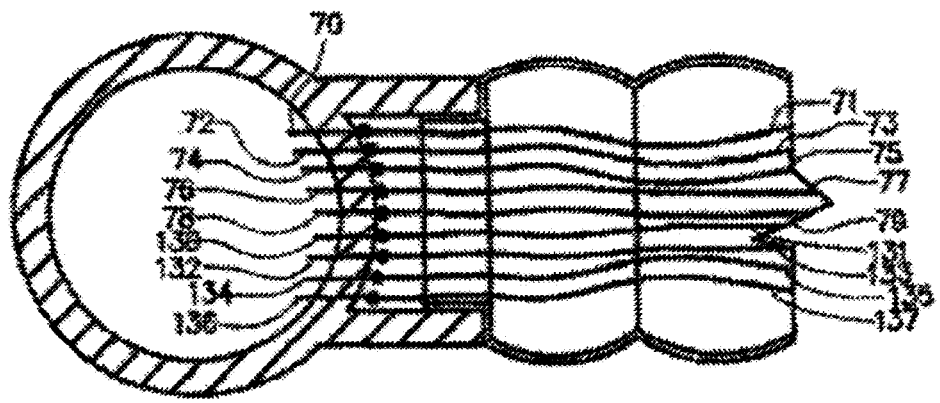
FIG. 4 is a cross-section illustration showing a plurality of water flow and water quality parameter sensors located in relative positions within the water supply line lumen and the connecting wires.
FIG. 5 is an illustration of an optional custom wireless display/recording remote apparatus having a plurality of display means and a plurality of software controlling buttons.

As illustrated in FIG. 4 is a cross-section showing the one or more sensors 70, 72, 74, 76, 78, 130, 132, 134, and 136 located in or close to water supply line 20, 22 and/or a water delivery supply line 24, 26, and the relative position of the sensors in or close to the supply line lumen and the connecting wires 71, 73, 75, 77, 79, 131, 133, 135 and 137 for the display means, data transfer, etc. For exemplary purposes, sensor 72 could be a timing sensor e.g., to monitor when water is flowing, sensor 74 can be a temperature sensor, sensor 76 can be a flow sensor, 78 can be a halogen (e.g., chloride or fluoride) sensor, 130 can be a total dissolved solids sensor, 132 can be a biological or fecal sensor, and 134 can be a water hardness sensor, and 136 can be a specific iron or other mineral sensor.

There are many types of sensors that can be used with the present invention. Since a significant small change involves an exchange of energy, sensors can be classified according to the type of energy transfer that they detect. For measuring or monitoring the temperature of the water flowing through the water meter various thermocouples or thermistor sensors 70 can be used as depicted in FIG. 3 within the water supply lumen or in close proximity to the water to be measured or mounted within the joint mechanism 22. Wires 71 is shown extending from the sensor 70 to electronically communicate with the CPU or microprocessor 84 and display unit.

Thermocouples measure the temperature difference between two points, not absolute temperature. In traditional applications, one of the junctions, the cold junction, was maintained at a known (reference) temperature, while the other end was attached to a probe.

A thermistor is a type of resistor used to measure temperature changes, relying on the change in its resistance with changing temperature. Thermistors can be classified into two types depending on the sign of k. If k is positive, the resistance increases with increasing temperature. If k is negative, the resistance decreases with decreasing temperature, and the device is called a negative temperature coefficient (NTC) thermistor.

It is anticipated by the Applicant that various types of thermocouples or thermistors can be used for the present invention. It is not important what type of thermocouple or thermistor is utilized for monitoring the water supply lines, except that it is accurate for the appropriate temperature range monitored or measured.

To monitor or measure the flow rate of the water being delivered by the water supply line, various flow measuring technologies are applicable to the present invention water meter.

The flow sensor 105 can utilize pressure sensor technology (differential pressure sensor). Pressure sensors can be particularly useful in monitoring the water valve opening and closing operations, or in measuring small leaks by shutting off the water supply line and then monitoring the pressure loss over time. The memory includes instructions that, when executed by the CPU, microprocessor, or microcontroller, perform, based on pressure data from the pressure sensor: 1) monitoring pressure patterns and establishing pressure signatures, 2) detecting the leak condition, and/or 3) monitoring pressure changes when the base station closes the water control valve mechanism 310.

There is also a category of pressure sensors that are designed to measure in a dynamic mode for capturing very high-speed changes in pressure. These sensors are commonly manufactured out of piezoelectric materials like quartz. Pressure sensors can perform as a flow rate sensor (e.g., the differential pressure gauges Motorola MPX5700). Pressure sensors can be sensitive types that can sense pressure waves and pressure changes for water pattern analysis. One particular use would be to use the pressure sensor (e.g., ceramic capacitive pressure sensor) to monitor the pressure of a private or public property after a water control valve has turned off the water supply. The pressure sensor can then measure the decay in pressure to observe and indicate small leaks (dripping faucet).

Acoustic sensors are advancing to the point where they can monitor water flow and pressure readings that are approaching actual quantifiable results. The acoustic sensor's main function is to listen to and record water valve noises and vibration frequencies. It is anticipated that all water devices have a valve with a unique "open" and "close" noise and vibration frequency. An acoustic sensor can therefore be significantly useful for identifying various water devices such as showers, washing machines, toilets, irrigation valves, bathroom, and kitchen faucets, etc. and other water fixtures and appliances. As each of the water use devices is used, the acoustic sensor can specifically identify the particular water use device. It is also useful in apartment or condo situations where there is is only a single water meter all or multiple apartments or condos. The acoustic sensor will be able to characterize all the various water use fixtures, appliances, and devices contained within these apartments and condos. The acoustic sensor can also be used to detect water leaks as water leaks make noises like water valves opening and closing. But water leaks (e.g., toilet flapper valves, dripping faucets) tend to have more continual noise patterns that can last for longer periods. The acoustic sensor identifies water use valve movements and noises (e.g., when the water valve is being opened or closed) and/or observes vibrational frequencies when water is flowing past the water valve (e.g., toilet flapper valve). To supplement the acoustic sensor, various noise making orifices or vibration devices can be installed at various place for identification by the acoustic sensor. With artificial intelligence (AI) and other programming software, the acoustic sensor can now monitor water flow characteristics. Like a flow rate sensor, the acoustic sensor with programming software can also monitor, or add information to augment, the flow rate, the duration, and the total water volume to determine water signatures and patterns of water fixtures and appliances. The memory includes instructions that, when executed by the CPU, microprocessor, or microcontroller, perform, based on acoustic data from the acoustic sensor: 1) monitoring sound patterns and establishing sound signatures to identify one or more water control valves, and/or 2) detecting the leak condition.

In addition, various flow measuring technologies can be utilized as the flow sensor 105. In general, a flow sensor is a device for sensing the rate of fluid flow. Typically, a flow sensor is the sensing element used in a flow meter, or flow logger, to record the flow of fluids. There are various kinds of flow meters, including some that have a vane that is pushed by the fluid, or similar device. Flow meters are related to devices called velocimeters that measure velocity of fluids flowing through them. Another approach is Doppler-based methods for flow measurement. Hall effect sensors may also be used, on a flapper valve, or vane, to sense the position of the vane, as displaced by fluid flow. Alternatively, pressure sensors can be placed at each node, and the fluid network can be solved by knowing the pressure at every node. Flow meters generally cost more than pressure sensors, so it is often more economical to solve a fluid dynamics network monitoring problem by way of pressure sensors than to use flow meters.

Somewhat older and proven technology, such as Positive Displacement Water Meter ("PD") including nutating disc meters, measure water volume with an oscillating piston or a nutating disc is still being used in water meters today. The disc or piston has very high tolerances between it and the water meter chamber. Water flows through the chamber which causes the disc to nutate or wobble. Water must push or "displace" the measuring element disc or piston to be able to go through the meter. Each disc nutation represents a fixed quantity of water, so the total flow is calculated by the total number of nutations. The movements of the disc are transmitted by electromechanical (e.g., gear train) to a register/totalizer or pulse transmitter, or a magnetic solid-state register is utilized. Because of high tolerances, new and well-maintained, PD meters can be very accurate. One disadvantage is that PD meters can have more pressure loss and be somewhat noisier in indoor locations at high flow rates than ultrasonic (see below) or multi-jet meters. Also, as PD meters wear out, they cannot be recalibrated but must be rebuilt with a new chamber or just replaced with a new meter. Because water cannot pass through the meter without moving the measuring element, they are good candidates for incorporating a stop mechanism such as a solenoid activated mechanism or pin that impedes the oscillating piston or nutating disc from operating and restricts the flow of water. Such activated mechanisms can be wirelessly (or wired) controlled remotely as described herein.

The paddle wheel translates the mechanical action of paddles rotating in the liquid flow around an axis into a user-readable rate of flow (GPM, LPM, etc.). The paddle tends must be at least partially inserted into the water flow. The Pelton wheel turbine (better described as a radial turbine) translates the mechanical action of the Pelton wheel rotating in the liquid flow around an axis into a user-readable rate of flow (GPM, LPM, etc.). The Pelton wheel tends to have the water flow travelling around it. The turbine flowmeter (better described as an axial turbine) translates the mechanical action of the turbine rotating in the liquid flow around an axis into a user-readable rate of flow (GMP, LPM, etc.).

It is anticipated by the Applicant that the paddle wheel, Pelton wheel and/or turbine flow meter can be modified to also be used to generate electrical energy using typical wire and magnets technology. And it is anticipated by the Applicant the paddle wheel, Pelton wheel and/or turbine flow meter can generate electrical energy and perform as a flow meter simultaneously. As electrical energy is generated, back EMF becomes a factor and reduces the rotational speed. Intelligent software must be employed to compensate for the paddle wheel, Pelton wheel or turbine flow meter slowing its rotation when generating electrical energy. The calibration for the energy generated versus the loss in rotation speed for a measured flow of water can be calculated appropriately. Alternately, the intelligent software can switch energy generation off and on over a period of time and only monitor water flow rate when the energy generation is switched off.

In addition, various magnetic, ultrasound and Coriolis flow meters can be utilized with the present invention to function as the flow sensor 105. Modern innovations in the measurement of flow rate incorporate electronic devices that can correct for varying pressure and temperature (i.e., density) conditions, non-linearities, and for the characteristics of the fluid. The most common flow meter apart from the mechanical flow meters, is the magnetic flow meter. A magnetic field is applied to the metering tube, which results in a potential difference proportional to the flow velocity perpendicular to the flux lines. The physical principle at work is Faraday's law of electromagnetic induction. The magnetic flow meter requires a conducting fluid, e.g., water, and an electrical insulating pipe surface, e.g., a rubber lined non-magnetic steel or polymeric tube.

Ultrasonic flow meters are becoming more prevalent in water meters and measure the difference of the transit time of ultrasonic pulses propagating in and against flow direction. This time difference is a measure for the average velocity of the fluid along the path of the ultrasonic beam. By using the absolute transit times, both the average fluid velocity and the speed of sound can be calculated. There are two most common two types of ultrasonic flowmeter technologies, Doppler frequency shift ultrasonic flowmeter and transit time ultrasonic flowmeter.

Measurement of the Doppler shift resulting in reflecting an ultrasonic beam off the flowing fluid is another recent innovation made possible by electronics. By passing an ultrasonic beam through the water pipe, bouncing it off a reflective plate then reversing the direction of the beam and repeating the measurement, the volume of water flow can be estimated. The speed of transmission is affected by the movement of water in the supply pipe, and by comparing the time taken to complete the cycle upstream versus downstream, the flow of water through the supply pipe can be measured. The difference between the two speeds is a measure of true volume flow. Transit time ultrasonic measurement calculates the difference in time from when an ultrasonic signal is transmitted from the first transducer until it crosses the pipe and is received by the second transducer. A comparison is made of upstream and downstream measurements. If there is no flow, the travel time will be the same in both directions. When flow is present, sound moves faster if travelling in the same direction and slower if moving against it.

Multi-jet meters, positive displacement meter (e.g., nutating disc), single jet meters, pressure sensors, magnetic, ultrasound and Coriolis flow meters can be utilized with the present invention to function as the flow sensor 105.

In addition, as shown in FIG. 4, is an optional halogen (chloride or fluoride) sensor 78, Total Dissolved Solids (TDS) sensor 130, optional sensor 136 to measure or monitor the amount of iron and other metallic ions, biological or fecal coliform sensor 132, optional pH sensor, and optional water hardness sensor 134.

Now referring to FIG. 5, which presents an example 110 of either the custom display/recorder 50 or the second optional (handheld) display/recorder 56. The first display/recorder 50 or optional second (handheld) display/recorder 56 includes a housing or container 112, display means 114, 116, and 118, software control buttons 120, 122, and 124, the electronic circuit board with wire or wireless capability, and power source. These are common between the two apparatuses, or a computer, television or cell phone, smart phone or similar apparatus that has an internet, intranet, wire or wireless connectivity could be utilized.

Also shown in FIG. 5, one or more ergonomically 120, 122, and/or 124 placed buttons or activators which can be incorporated into the display means housing 112 to allow the modification of certain parameter units (e.g., metric to US), set alarm conditions (e.g., flow/volume rate-set points), or to program certain settings, e.g., over water use alarm, monitor continuous leakage, and/or water control valve not complete shut off or completely open.

Now referring to FIG. 6 is a perspective view of a plurality of optional water parameter transceivers attached to water use devices at various locations for monitoring water use and furthermore for monitoring for water leaks. In this example, the typical locations for the leak sensitive water flow sensors are at the water input supply lines 121 for a typical washing machine 128, a sprinkler system 122, and at the reduction valve 124. The leak sensitive sensors can also be located on water use devices such as showers 123, sinks, toilets, hot water heaters 120B, bathtubs, washing machines, dishwashers, etc.

The water meter and leak detection system 10, 126 (and 200 in FIG. 7) can include a series of water flow sensors or pressure sensors that can be connected to different locations, such as the irrigation system. In this way, the use of indoor water use (data acquired by the installed water meter and leak detection system 10, 126 and 200 shown in FIG. 7) and outdoor water use (data acquired by flow or pressure sensor at irrigation system) can be independently monitored. This can be useful for an individual or commercial operator to employ water conservation methods (e.g., reduce the sprinkler frequency or duration). Alternately, the monitoring of indoor water use, and outdoor water use, could be utilized by the water supplying municipality or government agency to apply different rates for indoor water use and outdoor water use. In certain situations, water control valve(s) can be located at a particular locations, e.g., near the irrigation manual valve, whereby by utilizing the two-way wireless capability of the water meter and leak detection system 10, 126 (and 200 shown in FIG. 7), whereby the water supplying municipality or government agency can remotely control water use (e.g., send out a code to the water control valve that inhibits outdoor water use on certain days or at certain hours of the day).

Data packet transmissions from the invasive flow sensor, non-invasive flow sensor, pressure sensors and/or sensitive flow sensors with transceivers can be coordinated and programmed on a schedule. The water meter and leak detection system 10, 126, (and 200 shown in FIG. 7) can run a master schedule for querying each invasive flow sensor, non-invasive flow sensor and/or highly sensitive flow sensors with transceivers. For example, water meter and leak detection system 10, 126 (and 200 shown in FIG. 7) can transmit a message to a specific collection node and that collection node can then sequentially request data from each of its invasive flow sensor, non-invasive flow sensor, pressure sensor, and/or sensitive flow sensors with transceivers. This systematic process can reduce data packet collision on the network and can make the water meter and leak detection system 10, 126 (and 200 shown in FIG. 7) immediately aware of any invasive flow sensor, non-invasive flow sensor, pressure sensor, and/or sensitive flow sensors with transceivers that might be having trouble transmitting its data packet. The water meter and leak detection system 10, 126 (and 200 shown in FIG. 7) can transmit an acknowledgement to each invasive flow sensor, non-invasive flow sensor, pressure sensor, and/or sensitive flow sensors with transceivers after successfully processing a data packet.

The software in the water meter and leak detection system 10, 126 (and 200 shown in FIG. 7) is designed to perceive water flow characteristics in the facility for a given unit of time, such as for a day, for every unit in the facility. The software should be designed to identify numerous conditions, for example, faulty toilet valves, periodic and irregular water flow for a toilet or faucet, or a slow constant water flow, which are characteristic of a leak condition.

Referring to FIG. 7, the water meter and leak detection system 10, 126, (and 200 in FIG. 7) with water control valve mechanism (water shut-off/on) 310 (FIG. 8) strategically located between a main supply line 208 from a water main and a household water supply line 210 to a residential building 202. The water meter and leak detection system 10, 126, (and 200 in FIG. 7), with water control valve mechanism 310 can be activated and deactivated by a remote controller 220 to selectively turn on and off the water through the household water supply line 210. In the preferred embodiment of the present invention, the water meter and leak detection system 10, 126, (and 200 in FIG. 7) with water control valve mechanism 310 is located with respect to the main water supply line 208 such that water flow through the household water supply line 210 to the living quarters of the residential building 202 may be prevented while still allowing water flow to non-residential areas, such as to sprinkler lines. It is anticipated by the Applicant that separate water control valve mechanisms 310 can be located on various household water supply lines 210 (e.g., toilet, washing machine) and irrigation water supply lines. The multiple water control valve mechanisms 310 will have electrical circuitry and wireless radios and can be controlled remotely through communication and commands/signals with the remote server over the internet from a cell phone APP. It is also anticipated by the Applicant that the water meter with leak detection system 10, 126, 200 with water control valve mechanism 310 can take the place of, and function as, the main water meter and/or incorporate a pressure reduction valve 304 (FIG. 9). FIG. 7 also shows the water meter and leak detection system 10, 126, 200 with water control valve mechanism 310 connected with a method 205 from a solar electrical generation 204 and/or connected with a method 207 from a wind electrical generation 206. In this regard, the water meter and leak detection system 10, 126, 200 with water control valve mechanism 310 can be battery operated and utilize re-chargeable batteries or super capacitors that can be charged with a water turbine electric generator or have typical batteries that are replaceable. The water meter and leak detection system 10, 126, (and 200 in FIG. 7) with water control valve mechanism 310 can also be AC or DC powered. An antenna 322 is shown extending from the water meter collection node with water control valve mechanism 310. The shut-off/on control valve mechanism can be a simple on/off solenoid mechanism, a ball valve type mechanism, or a three-way mechanism that can be useful to drain water from the main water lines when freezing conditions arise.

The housing for the water meter and leak detection system 10, 126, 200 (optionally with water control valve mechanism 310) can be fabricated from a metallic or polymeric material with sealing technology to protect from moisture damage or freezing conditions.

The joint connections between the water supply lines 208 and 210 and the water meter and leak detection system 10, 126, 200 with water control valve mechanism 310 could be screw and thread fitting, compression fitting, flare fitting, solder, brazed, or sweat joint, adhesive technology, and/or use typical plumbing techniques. The joint may be designed to be permanent or removable.

The water meter and leak detection system 10, 126, 200 can incorporate a freeze protection procedure which, before a freezing condition is encountered, activates a freezing mechanism. The memory includes instructions that, when executed by the CPU, microprocessor, or microcontroller, perform, based on temperature data from the temperature sensor that a water temperature approaches a freeze point of 32 degrees Fahrenheit or 0 degrees Celsius: 1) sending a warning or a message to the remote cementer system(s) or the electronic communication device(s), 2) communicating with an intelligent thermostat with wireless technology to turn on a heating system for the buildingis(s) or structure(s), and/or 3) conducting a water freeze protection procedure including draining the main water supply line or replacing at least a portion of the water in the main water supply line with air, nitrogen, or another gas or liquid having a low freezing point. An optional frost/freeze plug can be incorporated with a draining mechanism or system that allows the water to passively drain from the private or public property water pipes or forcefully removes the water from the water pipes with a power system. And it is anticipated that in extraordinary freezing situations, the draining mechanism or system can also replace the water in the water pipes with air, nitrogen or other gas/liquid that have low freezing points and non-toxic conditions, to withstand the freezing conditions and minimize damage to the water pipes. Furthermore, when communicating with a home router, the water meter and leak detection system 10, 126, 200 can communicate with a remote computer or an electronic communication device to send a warning signal or to turn on the residential or corporation heating system to a temperature that will inhibit freezing water in the residential and corporation interior water pipes. The remote computer or electronic communication device can also communicate directly with an intelligent thermostat with wireless technology to control the heat system temperature.

The water meter and leak detection system 10, 126, 200 with water control valve mechanism 310 can include an optional display means 211 for displaying various information, such as if the water is interrupted or allowed to flow into the private or public property facility or building, or for programming the software for scheduled water interruption times (e.g., off from 8:30 a.m. until 4:30 p.m. then on, off again at 11:00 p.m. until 5:00 a.m. and then on again). The display means 211 can help program the software by displaying calendar information, such as the date and current time (12 hr. or 24 hr. format). In this regard, the water meter collection node 200 can be programmed using a wire or wireless remote keyboard, or touch screen button technology on the display.

One of the key features of the water meter and leak detection system is that it has a convenient and easy means which facilitates activation and/or deactivation of the water flow from the main water supply, e.g., when a private or public property facility or building becomes vacant or unsupervised. In this regard, shown in FIG. 7 is an individual 212 holding a cell phone, smart phones, or similar apparatus 400220 for communicating with the water meter and leak detection system 10, 126, 200 to control the water flow.

For leak detection capability it would be preferred that the water meter and leak detection system 10, 126, (and 200 in FIG. 7) with a water control valve mechanism 310 can include programming instructions with a timing circuit to define a user time schedule. In this manner, the private or public property owner may simply establish that the water supply will be shut off or blocked during non-working hours, during a vacation, and/or during sleeping hours. The scheduling could be daily, weekly, monthly, or annual or on a water flow use basis. The programming of the timing schedule could be input into the water meter collection node's CPU and electrical circuitry via various methods, e.g., wireless or wired communication with a computer with appropriate software, using remote controllers, or using touch screen technology on the display means, etc.

Figure 8:
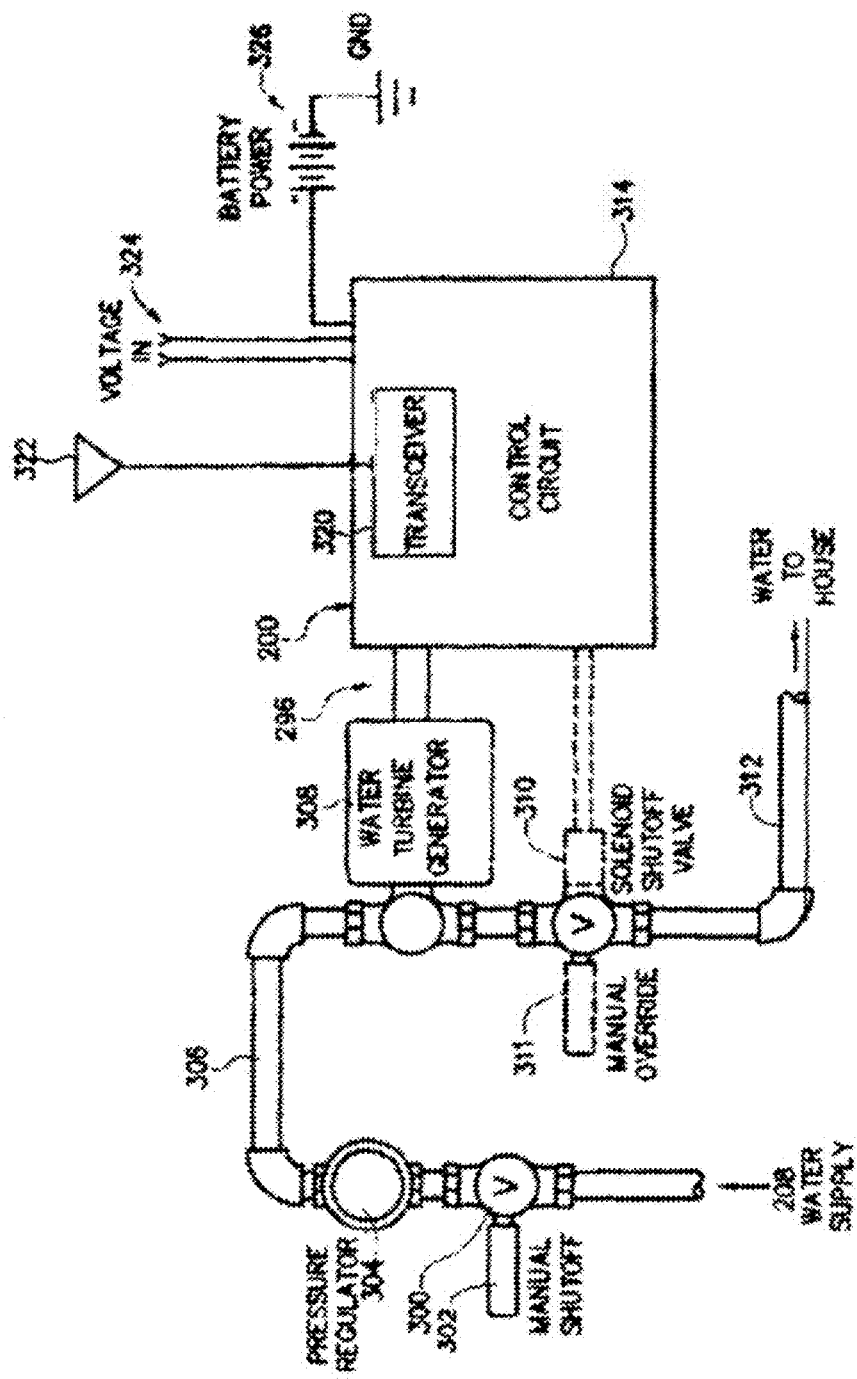
FIG. 8 is a more detailed illustration of the water meter collection node with the control circuit with antenna and power supply, a wireless transceiver, a water shut-off/on or water control valve mechanism with a manual control, and water supply plumbing with optional water turbine energy generator that connects in series to the water supply line.
Figure 9:
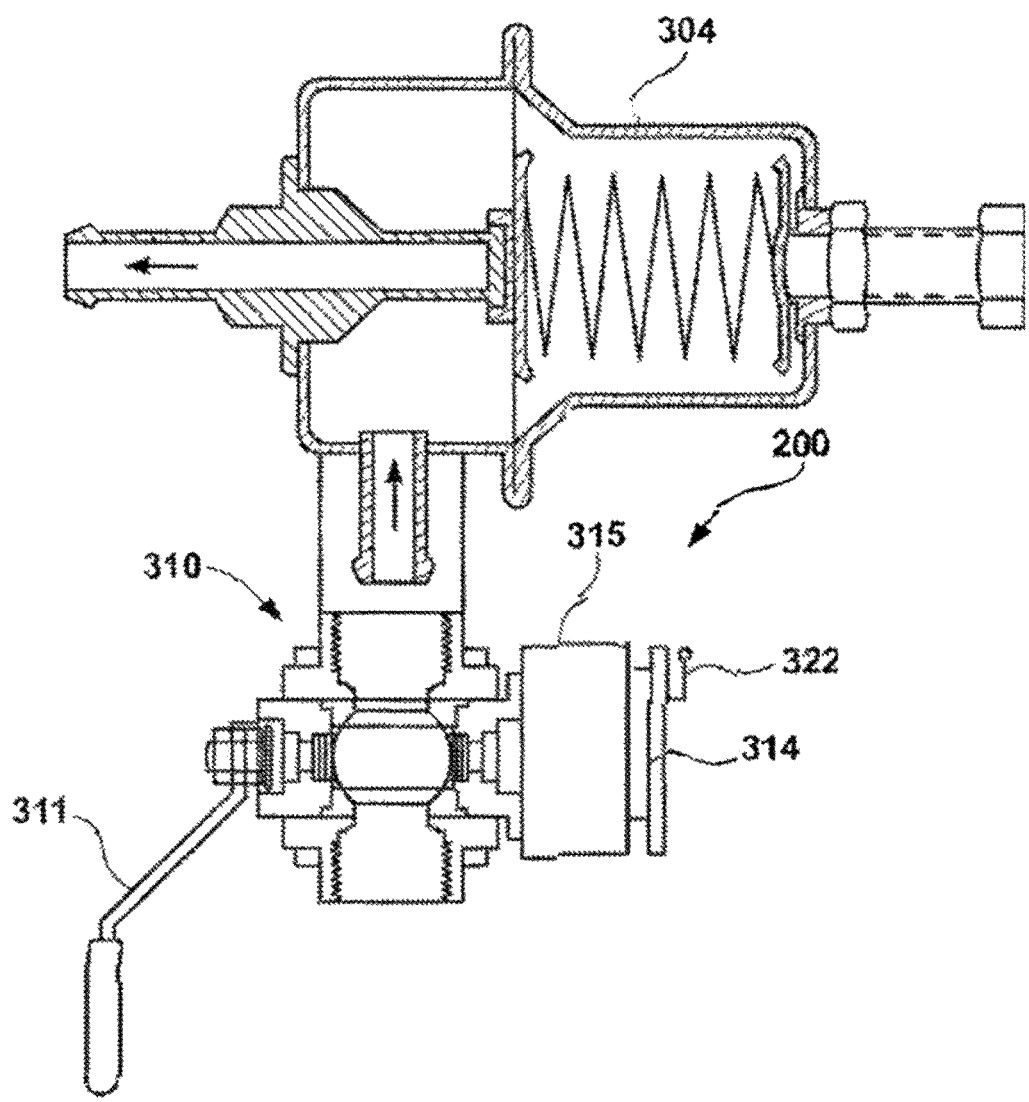
FIG. 9 is another embodiment of the present invention with a detailed illustration view of the water shut-off/on or water control valve mechanism combined with an independent pressure reduction valve and functioning together. The combined system includes a water meter collection node with one or more water flow rate sensors, a water shut-off/on or water control valve with a mechanism having an antenna, and a pressure reduction valve.

Now referring to FIG. 8, shown is a perspective detailed view of the water meter and leak detection system 10, 126, 200 with water control valve mechanism 310 and water supply plumbing 312, and with optional water turbine generator 308 that is located within the water supply line 208. The water supply line from the water main 208 first engages a manual shut-off/on valve 302. The manual shut-off/on valve 302 can be a ball valve, solenoid valve, gate valve, piston valve, variable open design valve, three-way valve, or other known technology. Further along the water supply line is a pressure regulator 304 with a connecting pipe 306 to the water meter and leak detection system 10, 126, (and 200 in FIG. 7) with water control valve mechanism 310. Also shown is an optional water turbine generator 308 that could be utilized to produce electrical energy for recharging the battery source 326. The water shut-off/on mechanism 310 (shown as solenoid shutoff valve) can be a ball valve, solenoid valve, gate value, piston valve, variable open design valve, three-way valve, or other known technology with electronic activation. A mechanical lever or electric button/toggle switch 311 can be incorporated on the water shut-off/on mechanism (solenoid valve) to allow the modification of the mechanism to open or close the water flow in emergency and necessary situations. The water meter and leak detection system 10, 126, (and 200 in FIG. 7) has a transceiver 320 that includes an antenna 322 which can be external or internal. The control circuit for the water meter and leak detection system 10, 126, (and 200 in FIG. 7) shown in more detail in FIG. 3, includes programmable CPU, a power source using either a battery or super capacitor (rechargeable) 326 or typical AC or DC supply 324, and/or electrical circuitry, wireless or hard-wired components, and optional sensors and associated circuitry. The battery voltage 326 which would electronically engage the optional solar cell 204 or wind generator 206 to provide additional electrical energy. It is anticipated by the Applicant that the water shut-off/on mechanism 310 (ball valve or solenoid shutoff valve) and, if used, the optional water turbine generator 308, could be incorporated within the water meter and leak detection system 10, 126, (and 200 in FIG. 7) as a single unit. It is also anticipated that the water meter and leak detection system 10, 126, 200 with water control valve mechanism 310 could replace, and function as, the pressure regulator, eliminating one of the components shown in this drawing. Exiting from water meter and leak detection system 10, 126, 200 with water control valve mechanism 310 is the main water supply 312 to the home (private or public property. It is also anticipated that the water meter and leak detection system 10, 126, 200 with water control valve mechanism 310 could be independent of or function as the main water meter.

FIG. 9 is another embodiment of the water meter and leak detection system 10, 126, 200 with a perspective detailed view of the water control valve mechanism 310 combined with an independent pressure regulator or reduction valve 304 and functioning as a combined system 200 consisting of a water meter collection node with one or more water flow rate sensors having a water control valve mechanism 310 and pressure reduction valve 304. Shown is a typical water pressure reduction valve 304 connected directly with the water meter and leak detection system 10, 126, 200 with water control valve mechanism 200 having a ball valve 310, a manual on-off handle 311, an electric motor 315, electrical circuitry 314 with a wireless antenna 322.

Figure 11:
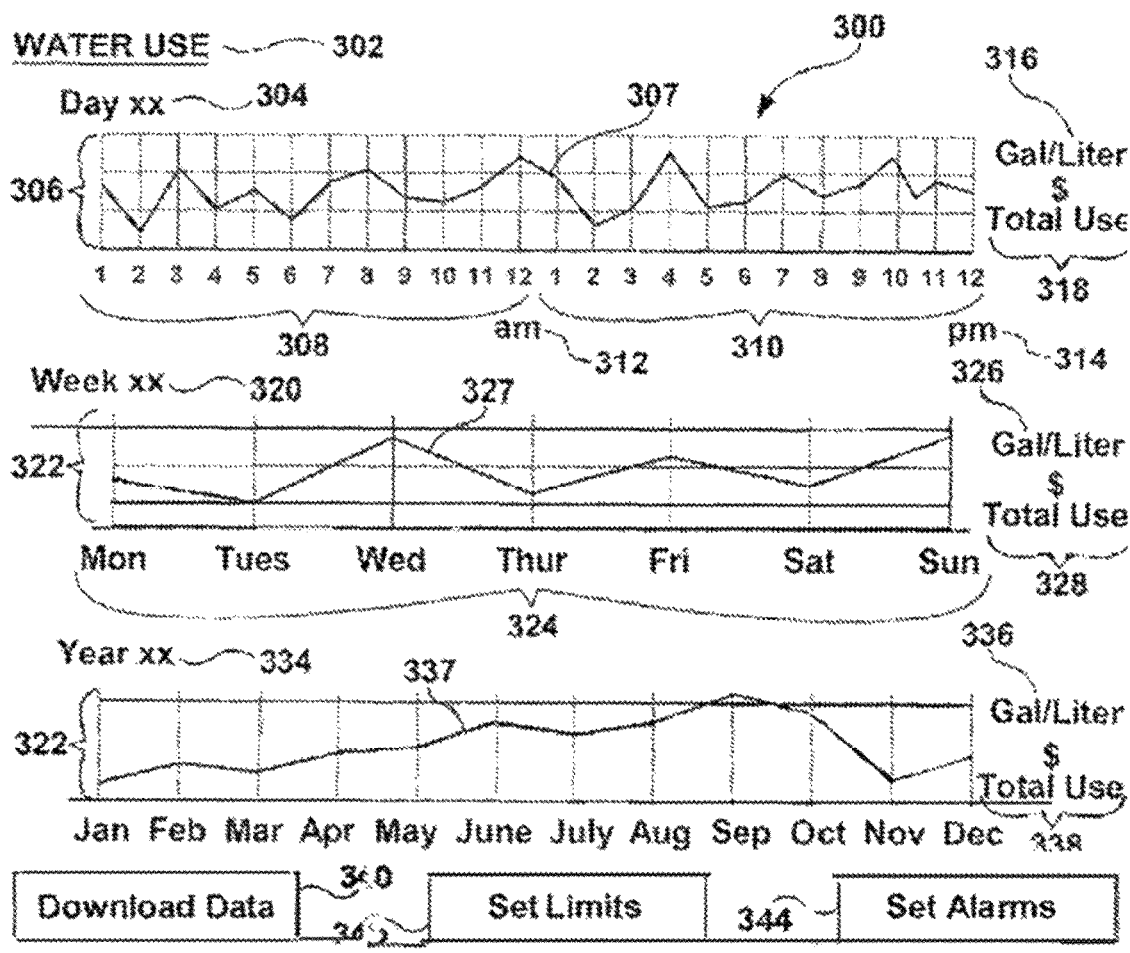
FIG. 11 is an illustration of another "APP" or programmed application, or another page of an "APP" or programmed application that displays water use and water quality data in another format that is transferred from the water meter collection node to a remote database for display on web portal, or a cell or smart phone, computer, or similar apparatus.
Figure 11:
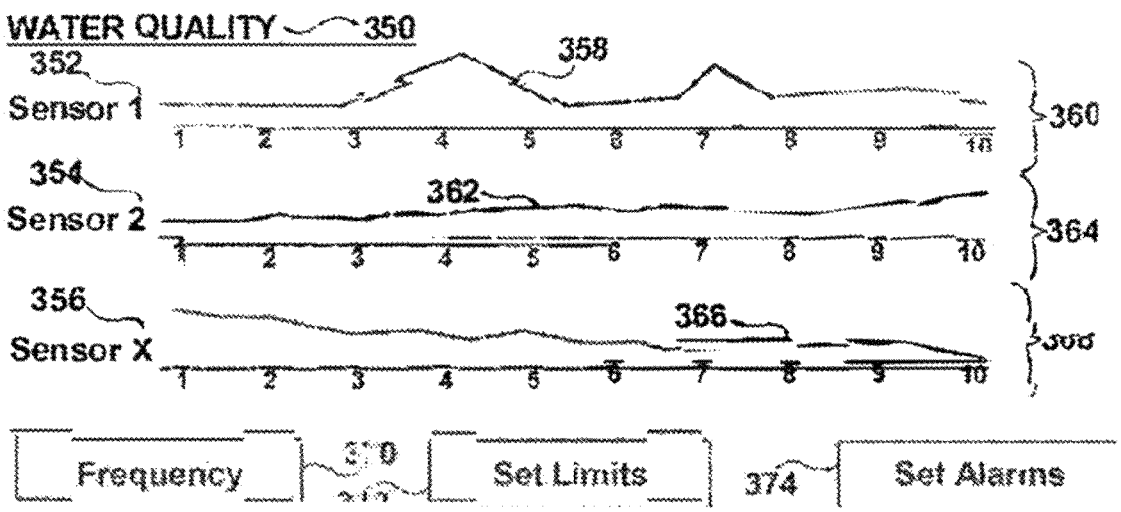
Figure 13:
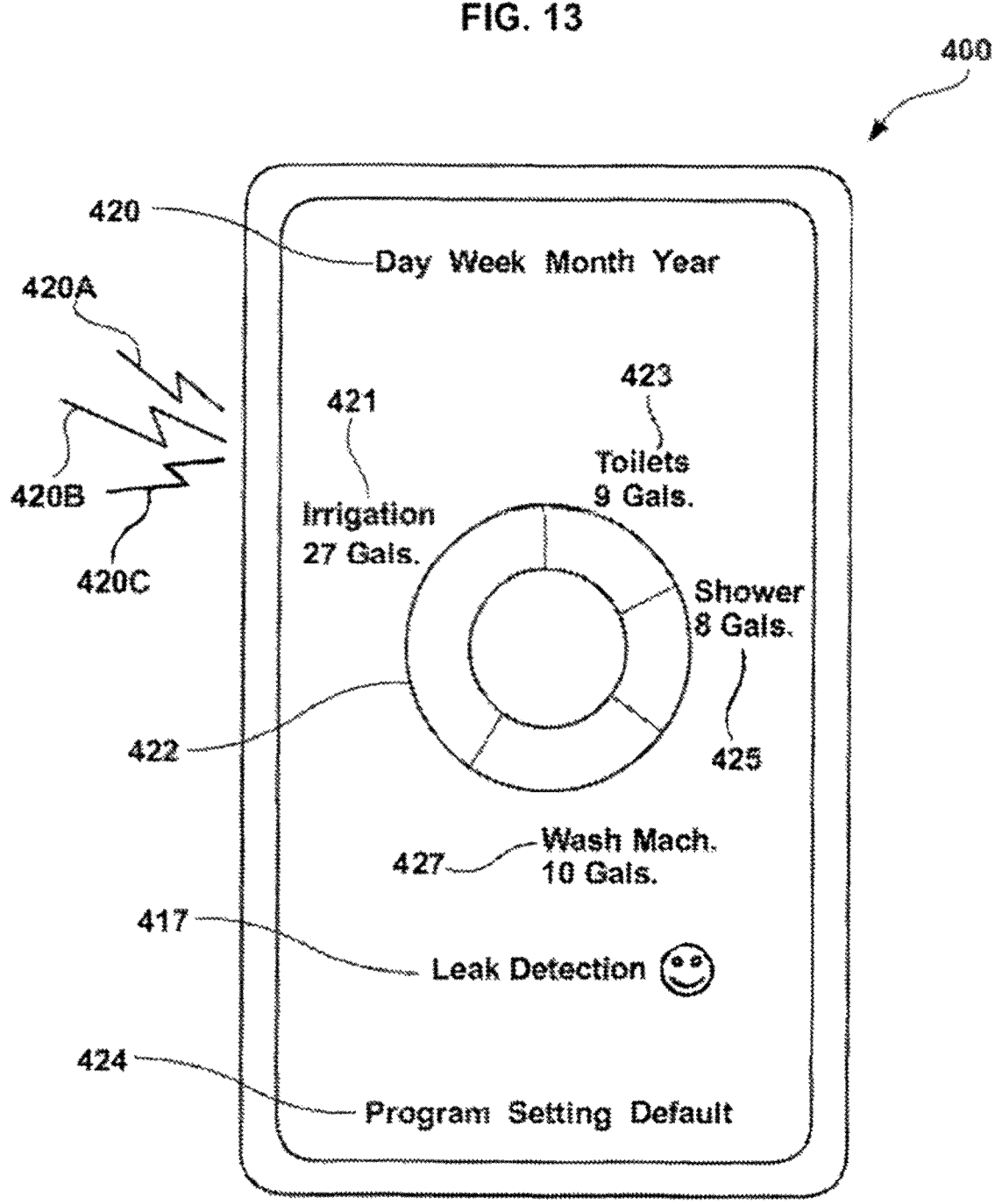
FIG. 13 is an illustration of a typical cell or smart phone, remote computer, web portal, or similar electronic apparatus having another "APP" or programmed application, or another page of an "APP" or programmed application to display the soft buttons to determine the period for displaying, information of water use devices, leak detection and notification, and programming and settings features.

Further detail is shown in FIG. 10, (with different program applications of APPs as shown in FIGS. 11, 12, 13) where water parameter data can be displayed on a cell phone, smart phone, and similar electronic communication device 400 as defined herein.

The cell or mobile phone, smart phone, remote computer, web portal, PDA, tablet, wireless smart watch, internet capable TV, remote computer, or similar electronic apparatus 400 or custom display, recording apparatus 50, 56 and 110 have the convenient function of providing an individual or entity the ability to review water use and water parameter data on a real time basis for auditing or monitoring purposes. It is also anticipated by the Applicant that the optional display means 12, 14, and 16 (shown in FIG. 2) can be located remotely from the water meter and leak detection system 10, 126, 200 containing the CPU or microprocessor 84 with communication and control lines 83 (shown in FIG. 3) that communicate either wired or wirelessly. Hence, the communication and control lines 83 can be used to transfer water use parameters and leak detection alerts to a remotely positioned display receiver apparatus or the display means 12, 14, and 16 can be eliminated to be replaced by the first display and/or recording apparatus 50, 56, 110 or on a cell phone, smart phone, or similar apparatus 400. The wireless communication 46, 52 and 54, can use radio-frequency, Bluetooth, Bluetooth low energy (BLE), ZigBee, Wi-Fi, Wi-Fi version 3/4/5/6, WiFi7, Li-Fi, LoRa, Sigfox, Ultra Narrow Band, 6LowPAN, NB-IoT, M-Bus, WIMAX, Amazon Sidewalk, standard cellular technology, LTE-M cellular technology, 3GPP, 4G or 5G cellular technology, or other wireless technology. The water parameter data is generated by the sensors and collected by the microprocessor and sent wirelessly to a display means and/or a remotely positioned receiver apparatus. Remote computers or electronic communication devices can send control signals to the water meter and leak detection system 10, 126, (and 200 in FIG. 7) with water control valve mechanism 310. Examples of wireless protocols that can be utilized with the present invention include, but are not limited to, the IEEE 802.11a, IEEE 802.11b, IEEE 802.11g and IEEE 802.11n modulation techniques and the newer protocol associated with Wi-Fi3. Another example of the wireless protocols that can be utilized with the present invention are the ZigBee, Z-wave, or IEEE 802.15.4 modulation technologies. Furthermore, wireless low power and long-range technology such as "LoRa", M-Bus, or Ultra Narrow Band chips (Ultra High-Performance RF Narrowband Transceiver) can be used with the present invention. Applicant recognizes that there are numerous wireless protocols, such as Amazon Sidewalk, that have been recently developed that could be utilized with the present invention for data transfer purposes.

The water meter and leak detection system 10, 126, (and 200 in FIG. 7) with control valve mechanism 310 transmits water parameter data to a router that connects to the internet and then to remote computers/servers. It can also communicate the water leak condition to a user or owner of a home, condo, apartment or other residence, rental/leased house, condo or apartment or other resident, owner or representative of a company or corporate entity, owner or staff of a hotel/motel, institution facility, and/or a governmental agency, housing or facility. Cellular format technology can be used including all current and future variants, revisions and generations (e.g., third generation (3G), fourth generation (4G), fifth generation (5G), and all future generations) of Global System for Mobile Communication (GSM), General Packet Radio Service (GPSR), Code Division Multiple Access (CDMA), Evolution-Data Optimized (EV-DO), Enhanced Data Rates for GSM Evolution (EDGE), 3GSM, Digital Enhanced Cordless Telecommunications (DECT), Digital AMPS (IS-136/TDMA), Integrated Digital Enhance Network (iDEN), HSPA+, WiMAX, LTE, Flash-OFDM, HIPERMAN, Wi-Fi, IBurst, UMTS, W-CDMA, HSPDA+ HSUPA, UMTS-TDD, and other formats for utilizing cell phone technology, telephony antenna distributions, and/or any combinations thereof, and including the use of satellite, microwave technology, the internet, cell tower, telephony and/or public switched telephone network lines. Water data/information and leak conditions from the water meter and leak detection system 10, 126, 200 with water control valve mechanism 310 can be wirelessly communicated to a typical cell phone, smart phones, or similar apparatus including: all remote cellular phones using channel access methods defined above (with cellular equipment, public switched telephone network lines, satellite, tower and mesh technology), mobile phones, PDAs, tablets (e.g., refers to all current and future variants, revisions, and generations of the Apple IPAD, Samsung Galaxy, HP, Acer, Microsoft, Nook, Google Nexus, Sony, Kindle, and all future tablets manufactured by these and other manufactures), Apple IPOD Touch, television, watch, timepiece or fob watch, other similar apparatuses with Wi-Fi and wireless capability, and remote computers and/or controllers having internet or wireless connectivity. The display of the water data/information and leak condition data can be in various pleasing formats using digits, analog display, graphics, pictures, charts, and/or other characters to exhibit the data/information/leak condition to a user. Also, the transfer of data/information can use authentication, encryptions, integrity, and non-repudiation technology to ensure that data or information is communicated securely. In Figure 11, the APP shows graphs or charts 307, 327, 337 of water use 302 in gallon per liter 316, 326, 336 or total use 318, 328, and 338 by day 304, week 320, and year 334. Also, the APP shows graphs or charts 358, 362, 366 of water quality.

FIG. 12 shows a view of a typical cell phone, smart phones, or similar apparatus 400 having an application 410, commonly known as an "APP", programmed to display soft buttons or use control activators on the cell phone, smart phone, or similar apparatus 400, and designed to wirelessly communicate or send signals to and from the water meter and leak detection system 10, 126, (and 200 in FIG. 7) with water control valve mechanism 310. It is also anticipated that the apparatus 400 could be an Apple IPAD, HP, Samsung, LG, or other manufacturer's tablet and that the application (APP) 410 would function as described below. Furthermore, apparatus 400 could be a remote computer or television that is connected to the internet or has wireless capability. Shown in FIG. 12A is an example of application (APP) 410 which will typically display soft buttons for controlling water on 404 and water off 406 by sending wireless instructions to the water meter with leak detection system 10, 126, (and 200 in FIG. 7). It is anticipated by the Applicant that other configurations of application displays for remotely communicating can be used with the water meter and leak detection system 10, 126, (and 200 in FIG. 7). The application (APP) 410 can also have a soft schedule button 408 which adds displays for entering a predetermined schedule (dates/times) for turning on and off the water at the collection node of the water meter and leak detection system 10, 126, 200. The predetermined schedule can be sent to the water meter with leak detection system 10, 126, (and 200 in FIG. 7) for scheduling operations on a time (e.g., hourly, daily, weekly, monthly, or yearly) basis. The predetermined schedule can be programmed into a memory module at the water meter and leak detection system 10, 126, (and 200 in FIG. 7).

An option of the application (APP) 410 is shown as a decisional text message 413 inquiring if the individual would like the water turned off and sent to display 402 of the cell phone, smart phone, or similar apparatus 400. The cell phone, smart phone, or similar apparatus 400 would preferably have incorporated GPS technology that can determine the location of the cell phone, smart phone, or similar apparatus, and know the distance from the home or water meter with leak detection system 10, 126, 200 locations. Triangulation techniques between cell towers can also be used if the cell phone, smart phone, or similar apparatus 400 do not have GPS capability. The application (APP) 410 includes a routine that can program the distance from the water meter and leak detection system 200 so that an individual or user beyond a specified distance from the water meter 200 can be provided with a notice of the decisional text message. If the water is not turned off when the individual leaves the private or public property, and the cell phone, smart phone or similar apparatus 400 has been programmed for a set distance from the water meter collection node or optional communication hub 477, e.g., one quarter mile, then the decisional text message 417, for example, "Should I turn off the water supply", will be sent to the cell phone, smart phone or similar apparatus 400. The rational for the decisional text message is that, for the present invention to function as a water damage prevention system, substantial compliance with routine turning off the water when a private or public property in unoccupied is important. The decisional text message 417 provides the individual a soft button "yes" 412 to turn off the water by the water control valve mechanism 310 at the collection node of the water meter and leak detection system 10, 126, 200 or "no" 414 to leave the water control valve open and water on. Hard button activators 416A, 416B, and 416C can also be used to communicate with the water meter and leak detection system 10, 126, 200 to control the water control valve mechansim (on/off). These activators can also transfers water parameter data to the internet and then to remote computers/servers. Cell phones, smart phones, or a similar apparatus can receive water parameter data on display screens with no touch screen capability. For example, hard button 416A can communication with the water meter and leak detection system 10, 126, 200 to turn the water system on, hard button 416B can communication with the water meter and leak detection system 10, 126, 200 to turn the water system off, and hard button 416C can communication with water meter and leak detection system 10, 126, 200 to open a schedule page.

Another optional decisional text message 417 can be sent to the cell phone, smart phone, or similar apparatus 400 if one of the optional flow sensors detects a leaking condition. The text message could specify "Leak found in kitchen area, should I turn off the water supply?". The decisional text message 417 provides the individual a soft button "yes" 412 to turn off the water at the water meter and leak detection system 10, 126, 200 or "no" 414 and leave the water control valve open and water on. Hard button activators 416A, 416B and 416C can also be used to communicate with the water meter with leak detection system 10, 126, 200 for cell phones, smart phones, or a similar apparatus having limited display screens or no touch screen capability. This optional leak detection message 417 could also be sent to the insurance or municipality agency monitoring station by PSTN or wireless means to notify of the leakage condition. It is also anticipated by the Applicant that the leak detection message could also be transferred to the supplying municipality to inform them of the leak such that the municipality can act to control the water control valve mechanism 310 or the water supply, or to repair the leak condition.

Shown in FIG. 10 is a perspective view of an "APP" or programmed application that provides water use data in various example formats that are transferred from the water meter collection node or optional communication hub 477 to a remote display/recording apparatus 18, 50, 56, or a remote computer or a cell phone, smart phone, or similar apparatus 400. The programmed application or APP shows an average time of water use data, average water use data, water cost data, energy calculations using the water heater type, the state located, cost of natural gas or oil per Therm, efficiency information, and the average ambient water temperature and the desired water temperature use for hot water devices (e.g., shower, faucets). On the bottom of FIG. 10 is the water energy calculation and water costs for the day, week, month, year, and five-year dates. The Applicant contends that many different water energy calculations can be used with the present invention without deviation from its intended use. The water meter and leak detection system can communicate with a typical cell phone, smart phones, or similar apparatus including an application for a consumer/resident, corporate entity, or municipality that show the daily, weekly and/or monthly water use and/or daily, weekly, and/or monthly water costs.

Figure 14:
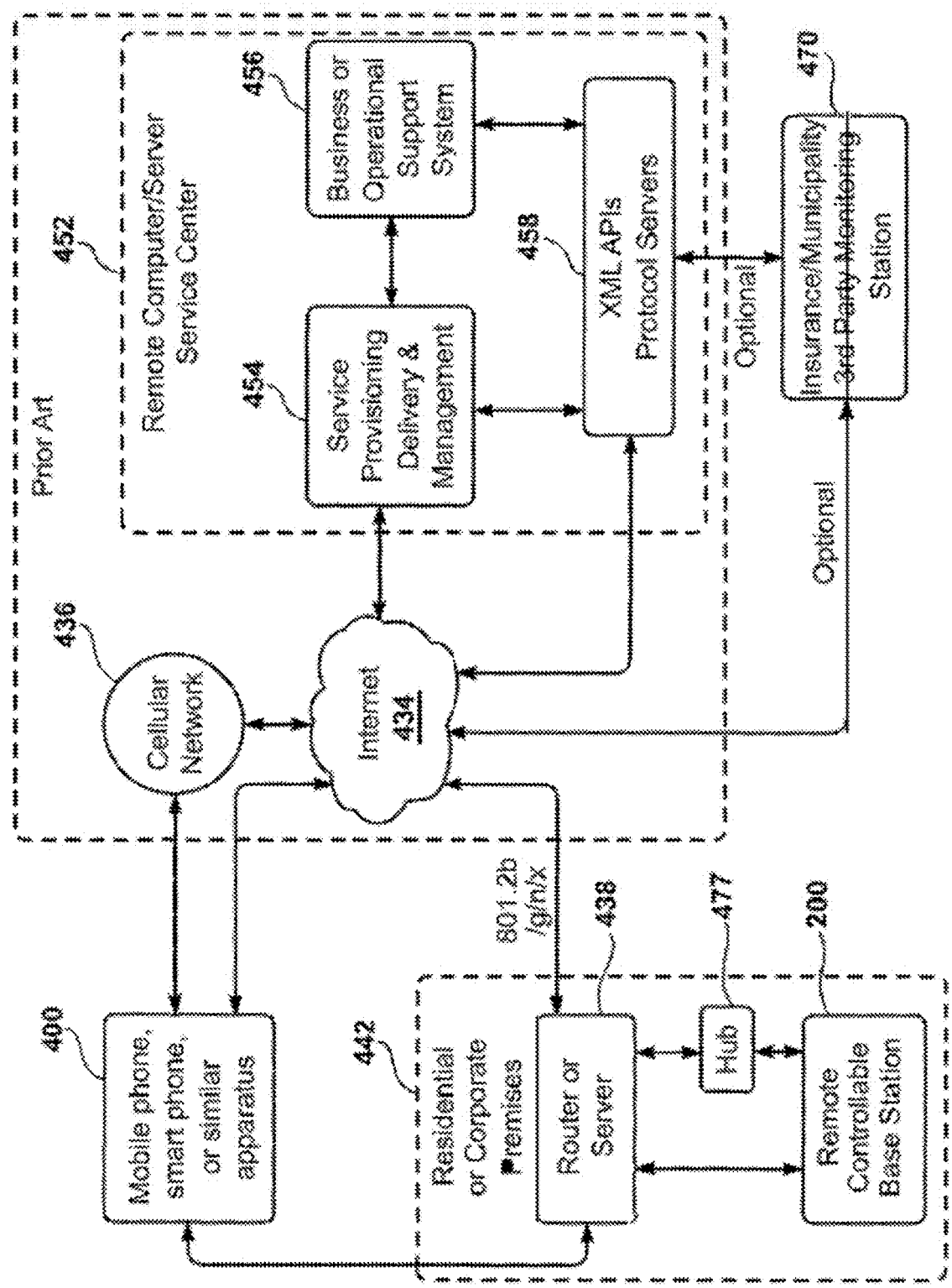
FIG. 14 is a block diagram of the more integrated system showing the software, hardware, and applications of the home or corporate premises communicating with the water meter and leak detection system and communicating with the internet and remote computer services ("the Cloud").

Shown in FIG. 11 is a view of an example application (APP), or a page of an application (APP) 300, displayed on a typical cell phone, smart phone, or similar apparatus 400 (FIGS. 12-14). This example application (APP) or page 300 is designed as a line graph format to be used by the resident of a home or a representative of a company or a corporation to monitor water conservation, but is it anticipated by the Applicant that the application (APP) 300 could be used by municipal or government representatives.

FIG. 11 shows an example of an application or page (APP) 300 for water use 302 having a daily 304 graph 306 with day hours 308, designated by the symbol AM 312 and the night hours 310 designated by the symbol PM 314. At the right side of the example application or page (APP) 300 is the daily total use of water 316 and the daily total cost in dollars (or other currency) 318, data that has been downloaded 340 from the registered or serving water municipality. Within the daily graph 306 is a plotted line 307 that shows the hourly water use. The plotted line 307 can have a rolling feature whereby new data replaces the oldest data in the graph. A gallon or liter scale can be included on the left side of the daily graph.

An example is shown of an application or page (APP) 300 for water use 302 that also has a weekly 320 graph 321 with days 324. At the right side of the example application or page (APP) 300 is the weekly total use of water 326 and the weekly total cost in dollars (or other currency) 328, data that has been downloaded 340 from the registered or serving water municipality. Within the weekly 320 graph 321 is a plotted line 327 that shows the daily water use. The plotted line 327 can have a rolling feature whereby new data replaces the oldest data in the graph. A gallon or liter scale can be included on the left side of the weekly graph 321.

The example of an application or page (APP) 300 for water use 302 also has a monthly 334 graph 330 with months. At the right side of the example application or page (APP) 300 is the monthly total use of water 336 and the monthly total cost in dollars (or other currency) 338, data that has been downloaded 340 from the registered or serving water municipality. Within the monthly graph 330 is a plotted line 337 that shows the monthly water use. The plotted line 337 can have a rolling feature whereby new data replaces the oldest data in the graph. A gallon or liter scale can be included on the left side of the monthly graph.

The water meter and leak detection system 10, 126, 200 is designed to transfer data and information by utilizing the wireless communication with the one or more remote display and/or recorder apparatus, or cell phone, smart phone or similar apparatus whereby the remote display and/or recorder apparatus or cell phone, smart phone or similar apparatus can automatically convert back and forth from radio frequency format, ZigBee, or Bluetooth format to a cellular format technology to accommodate different range requirements.

FIG. 11 shows a download button 340 which is designed to manually or automatically download water rates and expense data from the servicing and registered water municipality or other source. The cost per gallon, hundred cubic feet (HCF) or other measurement is usually dependent on volume used over a given period. For example, from 0-8 HCF could be billed at $3.64 per HCF, 9-24 HCF could be billed at $4.08 per HCF, and 25-36 HCF could be billed at $5.82 per HCF. This is only an example data that can be downloaded and utilized to determine the daily cost 318, weekly cost 328, or monthly cost 338. Other data can be downloaded from the water municipality or other sources such as warnings for drought conditions, metering policies, quality messages, limits, alarms, etc. The download button 340 can be used to download water use rates for different times of the day, or week or season.

FIG. 11 also depicts a user, whether it is a homeowner or company representative, who can Set Limits 342 for water use to command the water meter and leak detections system 10, 126, 200 to turn the water completely off for example, if a limit of water flow exceeds a limit, or sound a verbal or audio alarm. It is anticipated that the servicing and registered water municipality or other source can upload Set Limits 342 to the individual water meter and leak detections system 10, 126, 200. In addition, the Set Alarms 344 for water use can be used to display visually or provide audio signals of alarming conditions associated with the daily, weekly or monthly water use. The application (APP) 300 is designed to promote water conservation and monitor for leaking conditions.

FIG. 11 also shows an optional water quality section 350 of the application (APP) 300. As shown, optional water quality Sensor 1 (one) 352 can monitor one or more halogen elements or compounds, total dissolve solids, a metallic or iron ion/element or compound, water hardness, biological or fecal or coliform contaminates, pH, or any combinations thereof. The plotted line 358 for Sensor 1 (one) shows peaks and valleys over the time period 360. The time period can be selected as daily, weekly, or monthly. Sensor 2 (two) 354, can be another water quality sensor and Sensor X 356 can be one or more water quality sensors taken from the group above.

For the optional water quality sensors 350, shown is a Frequency soft button 370 which allows the user to define the monitoring time period, e.g., daily, weekly or monthly. A user, whether it is a homeowner or company representative, can Set Limits 372 for water quality to command the water meter and leak detection system 10, 126, 200 to turn the water completely off, limit the flow, or sound a verbal or audio alarm. It is anticipated that the servicing and registered water municipality or other water source or responsibility can upload Set Limits 372 to the individual water meter and leak detection system 10, 126, 200 (with water control valve mechanism 310). In addition, the Set Alarms 374 for water use can be used to display visually or provide audio signals of alarming water quality conditions associated with the daily, weekly or monthly water use.

As FIG. 11 is only an example presentation of water use and water quality data, it is anticipated that other formats can be used for displaying daily, weekly, monthly, or annual water use and water quality use. Such formats can be in bar graph format, pie graph format, cosmography formats, tabular formats, time series graph formats, histogram formats, data plot format, scatter plot format, other graph formats, or a combination of these graph formats. In addition, it is anticipated that the water flow data presented in line graphs, tabular formats, or graphic formats, or any combination of the formats listed herein can be presented on one or more pages or screens of the typical cell phone, smart phone, or similar apparatus.

FIG. 12 shows one or more visual signals 409, 411 (e.g., LED or LCD) lights that are turned on (and off after a period) to communicate to an individual that the water meter and leak detection system 10, 126, 200 with water control valve mechanism 310 has completed the programmed activity. For example, 409 could be a red LED light that illuminates when the water system is turned off and 411 could be a green LED light that illuminates when the water system is turned on. It is anticipated by the Applicant that verbal signals (verbal "water off" or verbal "water on" or simply a playing of certain ringtones) can also be used to communicate that the programmed activity has been completed. Also shown near the middle of the "APP" (program) page is a soft button 404 for turning on the water system by opening the water control valve mechanism 310, and soft button 406 for turning off the water system by closing the water control valve mechansism 310. A labeled 407 soft button 408 is used to bring up another page(s) that allows an individual to input a water on/off schedule. For example, one can have the water system or supply turned off automatically Monday-Friday from 8:00 a.m. until 5:00 p.m. when all the residences have been vacated (e.g., during work or school hours). For business and companies, the scheduling soft button 408 can turn off the water system or supply automatically when the employees of the business or company are vacated (e.g., from 6:00 p.m. until 7:00 a.m. Monday-Friday and all-day Saturday-Sunday). Various hard buttons 416A, 416B, and 416C can be used to supplement the soft buttons and/or menu pages for movement within the page or inputting data. On the bottom of the "APP" (program) is a text message 417, sent to the homeowner or resident or business or company employee, the option to turn on or off the water system or supply, e.g., if the water meter and leak detection system is aware that the home, building, or company is vacated or unoccupied (e.g., by temporal measurements, passive infrared sensors, entry and/or exit (badge) identification information). Shown on the side are the Bluetooth 420A, Wi-Fi, Wi-Fi versions 3/4/5/6 and Wi-Fi7 420B, and cellular and LoRa communication 420C technology(ies) that wirelessly connects the cell phone, smart phone, or similar apparatus 400 to the water meter and leak detections system 10, 126, (and 200 in FIG. 7).

Typical cell phones, smart phones, and similar apparatuses 400 may have one or more means of communication that can be established with a particular water meter and leak detections system 10, 126, (and 200 in FIG. 7) for wireless communication. The use of Bluetooth wireless communication technology 420A is commonly a feature found on many cell phones, smart phones, and similar apparatus. Such Bluetooth wireless communication technology 420A can be a means to communicate with the water meter and leak detection system 10, 126, 200 with water control valve mechanism 310 to turn the water on or off or receive decisional text messages 413, 417. Zigbee is another wireless technology that can be used. However, most current cell phones, smart phones, or similar apparatus 400 do not possess Zigbee wireless capability.

Wi-Fi is a wireless network protocol based on IEEE 802.11 standards or family of wireless local area network. Wireless technology 420B is commonly a feature found on many cell phones, smart phones, and similar apparatus 400 and wireless routers/servers. Such Wi-Fi wireless communication transceiver 420B can be a means to communicate remotely from a router/server directly to, or by the communication hub 477 circuitry, to the collection node circuitry of the water meter and leak detections system 10, 126, (and 200 in FIG. 7) with water control valve mechanism 310 to turn the water on or off or receive or send text messages. The water meter and leak detection system 10, 126, 200 can have the capability to receive and transfer wireless signals and decisional text messages 413 417 using Wi-Fi technology directly to the water meter and leak detection system 10, 126, 200 with water control valve mechanism 310. Alternately, the Wi-Fi communication technology 420B will communicate with a wireless router/server that has a HTML or other communication-based interface and configuration page graphic user interfaces. Remote access from the cell phone, smart phone, or similar apparatus 400 could use a short message service (SMS) interface and/or Voice of Internet Protocol (VOIP) which communicates with the wireless router. This Wi-Fi technology will access the internet through the wireless router and can recognize the cell phone, smart phone, or similar apparatus 400 phone number for remote capability using SMS interface. A digit numbers security can be used to maintain restricted integrity. Wireless transmitter(s) and receiver(s) and/or transceiver(s) can be used for Bluetooth, Bluetooth low energy, Wi-Fi, Wi-Fi versions 3/4/5/6, Wi-Fi7, and Li-Fi communications 420B to the water meter and leak detection system 10, 126, (and 200 in FIG. 7).

The use of cellular wireless technology 420C is a primary feature of cells phones, smart phones, and similar apparatus. Such cellular wireless communication technology 420C can be a means to communicate with the water meter and leak detection system 10, 126, 200 with water control valve mechanism 310 to turn the water on or off or to receive or send text messages.

The application 410 can interface with the Bluetooth and Bluetooth Low Energy (BLE) 420A , WI-FI 420B ; and/or LoRa, cellular 420C, or other long-range wireless communication technologies (and transceivers), and send instructions to a water meter and leak detection system 10, 126, 200 and/or the communication hub 477 for a pairing operation that allows for access to 1) observe the recorded data or 2) prevent an unauthorized individual to regulate the water control valve mechanism 310. Various pairing methods between the water meter and leak detection system 10, 126, (and 200 in FIG. 7) with water control valve mechanism 310 and the cell phone, smart phone, or similar apparatus 400 are contemplated to be needed to ensure that proper communication is established between a single and unique water meter and leak detection system 10, 126, 200 one or more unique cell phone, smart phone or similar apparatus 400. A Quick Response Code (QR code) unit address located on water meter and leak detection system 10, 126, (and 200 in FIG. 7) can communicate with a cell phone, smart phone, or similar apparatus 400 having a camera to read the QR code and establish a link to the water meter and leak detection system. Similarly, standard barcodes could pair and establish a link between the water meter and leak detection system 10, 126, 200 with water control valve mechanism 310 using the cell phone, smart phone, or similar apparatus 400. Near field link and RFID chip technology can also be used to facilitate pairing and establish a link between the water meter and leak detections system 10, 126, (and 200 in FIG. 7) and the cell phone, smart phone, or similar apparatus 400. Currently, bar code readers are applications that can be downloaded for a particular cell phone, smart phone, or similar apparatus. Near field links are becoming available on Samsung and Apple smart phones, but this technology may be expanded to many, if not all, cell phones, smart phones, or similar apparatus.

In operation, an individual who wants to turn off the water system would touch the off soft button 406 or reply to the text message to turn off the water system 413 417 "yes" soft button 412, or would push the hard button 416B on the cell phone, smart phone or similar apparatus 400. This will communicate with the water meter and leak detection system 10, 126, (and 200 in FIG. 7) via the internet using wireless technology (e.g., Bluetooth, ZigBee, Wi-Fi3/4/5/6, LoRa) and/or cellular format technology. Then the paired water meter and leak detection system 10, 126, (and 200 in FIG. 7) with water control valve mechanism or shut-off/on mechanism 310 would turn off the water system and, when completed (specified by switches and/or a flow sensor), send a return communication signal to the cell phone, smart phone or similar apparatus 400 and turn on a signal (audio or visual) message 409 that the water system is off. Comparably, an individual who wants to turn on the water system would touch the "on" soft button 404 or reply to the text message to turn off the water system 413 417 "no" soft button 414, or push the hard button 416A on the cell phone, smart phone or similar apparatus 400. This will communication with water meter and leak detections system 10, 126, 200 with water control valve mechanism 310 via the internet using wireless technology (e.g., Bluetooth, ZigBee, Wi-Fi3/4/5/6, LoRa) and/or cellular format technology. Then the paired water meter and leak detection system 200 with water control valve mechanism or shut-off/on mechanism 310 would turn on the water system and, when completed (specified by switches and/or a flow sensor), send a return communication signal to the cell phone, smart phone or similar apparatus 400 and turn on a signal (audio or visual) message 411 that the water system is on.

FIG. 13 shows another APP for displaying water data for the cell phone, smart phone, or similar apparatus 400 communicating with the water meter and leak detections system 10, 126, 200. The APP communicates using Bluetooth, Z-Wave, or ZigBee with wireless communication transceiver(s) 420A ; Wi-Fi, Wi-Fi3/4/5/6, or Wi-Fi7, with wireless communication transceiver(s) 420B; and/or LoRa, cellular, and/or other long-range wireless communication transceiver(s) 420C. The user of the APP can select the day, week, month, or year 420 for displaying a graph or table of water use devices and the water use volume. Shown is irrigatien at 27 gals 421, toilets 9 gals 423, shower 8 gals 425; and washing machine 10 gals 427. Also shown is leak detection information with an icon indicating no leak detectien 417. At the bottom of the APP, a program setting default 424 is provided for programming (e.g., alerts, water schedules, water parameter limits), settings (e.g., designation of units, screen settings such as orientations), and default parameters (e.g., using pre-established by the manufacturer or user).

FIG. 14 is a block diagram of the overall system (of an initially higher capital expense than a cloud service), showing the hardware and software applications of the private or public property communicating with the water meter and leak detection system 10, 126, (and 200 in FIG. 7) and communicating with the internet and remote computer service station. The water meter and leak detection system 10, 126, (and 200 in FIG. 7) with water shut-off/on or water control valve mechanism 310 includes a preferred, but optional, receiving station or communication hub 477 that connects either hard wired or wireless to a router/server 438 which connects in a duplex communication to the internet 434. The internet has duplex communication with the Remote Computer/Server Service Center 452, which is being replaced with cloud service companies (e.g., Amazon®, Microsoft®, Oracle® and/or Google®). The Remote Computer/Server Service Center communicates with a cell or mobile phone, smart phone, or similar apparatus 400, smart internet TVs, smart central hub listening and speaker devices, and/or home control systems. At a user's private or public property, the water meter and leak detection system 10, 126, (and 200 in FIG. 7) (with water control valve mechanism 310) connects to the router/server 438 with authentication, and preferably encrypted data. The water meter and leak detection system 10, 126, (and 200 in FIG. 7) with water control valve mechanism 310 system communicates with the remote computer(s) located in the Remote Computer/Server Service Center or hosted in an integrated security system data center, with the communication taking place via a communication network (e.g., cellular network, internet, etc.).

The cell or mobile phone, smart phone, or similar apparatus 400, computer, cell phone, smart phone and similar apparatus, smart internet TVs, smart central hub listening and speaker devices, and home control systems, is used to wirelessly communicate with the water meter and leak detection system 10, 126, 200 (with water control valve mechanism 310) via router/internet/remote servers. The cell or mobile phones, smart phones, or similar apparatuses 400, remote computers, smart internet TVs, smart central hub listening and speaker devices, and home or building control systems, preferably have downloaded programs or applications ("APPs") that communicated with the water meter and leak detection system 10, 126, 200 (with water control valve mechanism 310). The APP(s) displays water data, water use, energy use, and water quality as described herein. The cell or mobile phones, smart phones, or similar apparatuses 400, remote computers, smart internet TVs, smart central hub listening and speaker devices, and home or building control systems, that downloaded programs or applications ("APPs") that can turn on and/or turn off the water supply to a private or public property(ies), e.g., when it is not occupied, either directly using a soft button of the APP or by programming a schedule using the APP. The water meter and leak detection system 10, 126, (and 200 in FIG. 7) with water control valve mechanism 310 is not only designed to monitor for water use, energy use, and water quality, but to monitor of leak detection conditions and provide text messages, alerts signals, or emails regarding water leak conditions. The water meter and leak detection system 10, 126, (and 200 in FIG. 7) with water control valve mechanism 310 can be programmed by the user to automatically shut off the water supply when a leak condition is observed.

The Remote Computer/Server Service Center components: Service Provisioning Delivery and Management 454, Business or operational Support System 456, and XML APIs Protocol Servers 458 manage the main elements of the remote computer service. These components are examples and other, more modern components can be used which replace or add to these. Several of the components defined and described can be replaced by a newly designed operation(s), combined operations, or eliminated operation(s). Professional companies, such as Amazon Web Services, handle most, if not all, of the OSS and BSS services, database access, connectivity and provide database access and maintenance (e.g., SQL databases like MySQL, MariaSQL, Aurora, Redshift, and non-SQL databases like Dynamodb), server component access and maintenance, and load balancing, all on a cost base for the various factors. Cell phones, mobile phones, and similar apparatus 400, and remote computers can access the commercial database using certain protocols.

There are large cloud service companies with several computer server farms around the world that supplant the independent comprehensive internet infrastructure and communication network. Companies like Amazon®, Microsoft®, Oracle® and Google® have all built a significant quantity of computing infrastructure. Their data centers are vastly bigger, and significantly more efficient than those operated by or could be built by most other independent companies. The cloud service companies with their worldwide server farms allow for scalable and redundant data storage capabilities (Redundant Array of Independent Disks or RAID technology). The large cloud-computer companies can temporarily extend or customize the functionality for a client by transferring logic to the cloud service that it executes. Examples of this may include compiled components such as Java applets and client-side scripts such as JavaScript. Complying with these constraints and, thus conforming to the REST architectural style (REST an acronym for REpresentational State Transfer), enables any kind of program or distributed hypermedia system to have desirable emergent properties, such as performance, scalability, simplicity, modifiability, visibility, portability, and reliability (RestAPI). These large cloud companies are presently marketing and renting their computing capacity to developers and companies around the world. The developer or company doesn't have to incur the capital expense associated with designing network connectivity system, employing various Information technology (IT) professionals, purchasing the necessary computers and servers, developing the custom and non-custom software, and conducting the significant maintenance procedures.

A programmer/developer or a company simply pays for the cloud services. Using the cloud services provide the developer and company access to fundamentally unlimited computing power marketed by the cloud computing companies without incurring the expenses for developing and maintaining a private or corporate computer infrastructure.

There are various services, divided into certain categories, that are provided by the cloud computing companies. Infrastructure as a Service, or "IaaS," is the most basic layer of cloud computing. It provides customers with virtual servers, database storage, and Internet of Things (IoT) sensor communication and access. Platform as a Service, or "PaaS," is a set of application tools and services that make it easier for developers and IT professionals to build applications without the capital expense of purchasing software for application development. Software as a Service, or SaaS refers to applications that run in the cloud like Microsoft's Office 365, Google's G Suite, and Salesforce's products for sales and marketing.

The plan for cloud service companies is to make their services indispensable to both independent software developers and small, medium, and large companies. Customers might venture into cloud computing with a single software application (APP) but, as their businesses grow, their cloud-computer needs increase and the cloud service companies expect that their cloud usage and revenue will increase. Amazon® has increased their presence in the cloud industry by sacrificing short-term profits to enhance the customer's experience and maximize long-term gain. The more customers a cloud platform provider contracts with, the more servers and serving farms under their control can be developed. And the more servers the cloud service companies have, the better they can take advantage of economies of scale and offer customers lower prices for more robust features and appeal to large enterprises. The efforts to market their cloud services support that the future of internet infrastructures and communication networks will increasingly be controlled and maintained by the large cloud service companies.

Specific communication protocols are becoming important to interface between the cloud service companies and the company's local or cloud database for access by computer, cell phone, smart phone and similar apparatus, smart internet TVs, smart central hub listening and speaker devices, and/or home control systems. Access to acquire requested data and send commands utilizes, for example, SQL database requests to perform instructional activities (e.g., turn on/off water). Of these communication protocols, the Representational state transfer or RestAPI (or REST API), SOAP API, Java API, DOM API, SAX API, StAX API, or XML API are gaining in popularity.

Once a user sets up a service, an activation application delivers a display (GUI or graphical user interface) to the user on either a display means of the computer, cell phone, smart phone, mobile phone or similar apparatus 400, smart internet TVs, smart central hub listening and speaker devices, and/or home control systems, or on the water meter and leak detection system 10, 126, (and 200 in FIG. 7), and/or on a display means on the remote electronic devices.

Numerous applications provided by the large cloud service companies ensure overall management of the computer infrastructure and network service. These pre-defined applications are configured to offer off-the-shelf programs and operating systems solutions management of the integrated cloud system services, overall service monitoring, customer support, and reporting.

The water meter base station communicates with one or more communication hubs (repeater apparatuses), the one or more communication hubs (repeater apparatuses) function to extend the wireless range and utilize mesh technology or peer-to-peer connection or point-to-point connection to communicate with two or more water meters, or forms a private network or corporate network. The network utilizes application programming interface (API) software to communicate with a remote computer operation center, a commercial cloud-service or web-based service, and/or the private network or corporate network. Wireless technologies and transceivers comprise at least one of a Wi-Fi versions 3/4/5/6, WiFi7, Li-Fi, LoRa and LoRaWAN, Sigfox, Ultra Narrow Band, 6LowPAN, NB-IoT, M-Bus, WiMAX, Amazon Sidewalk, LTE-M cellular technology, 4G cellular technology, and 5G cellular technology. The wireless communication transceiver(s) of the base station(s) and the second wireless communication transceiver(s) of the communication hub(s) are ccnfigured to form a private network or a corporate network. The private network or the corporate network utilizes the API when communicating with remote computer system(s).

The water meter and leak detection system having hardware, network components, and services including one or more wireless communication transceivers, one at mere base stations, one or more second wireless communication transceivers, one or more communication hubs, private network(s) or corporate network(s), commercial cloud service(s) with one or more databases, application programming interface(s) (API), remote computer operation center(s), or one or more remote computer system(s), or any combination thereof, are marketed, sold, leased, supplied, or any combination thereof, as one or more of indepnnent parts, components, services, a total system, or a partial system, or any combination thereof. These components and services, or a subset thereof, can be can be provided as a water project for a corporate entity, municipality, utility, town, or city.

Figure 15A:
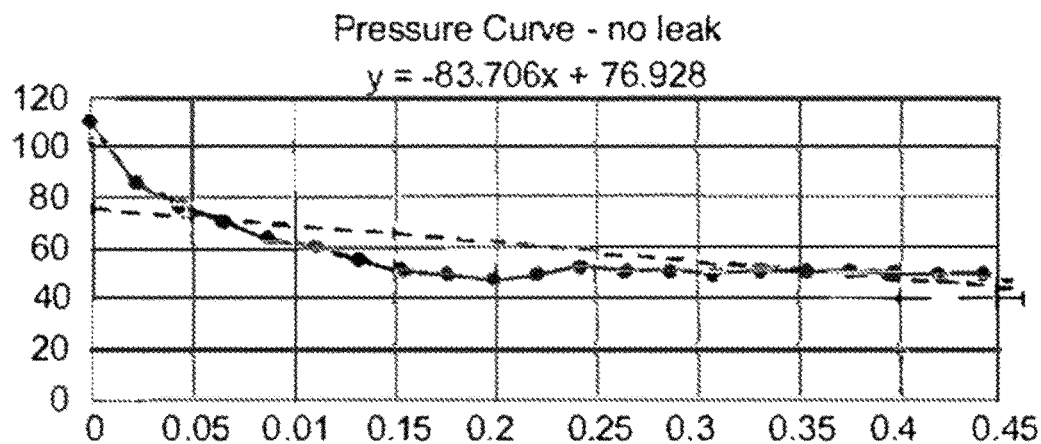
FIG. 15a is an illustration of the pressure drop within a typical 3-bedroom residence having copper plumbing and a pressure regulator wherein there is no leak.

FIG. 15A is an illustration of the treasure drop within a typical 3-bedroom residence having copper plumbing and a pressure regulator wherein there is no leak. This test was done as a leak detection analysis where the water control valve mechanism 310 is closed and the pressure measured over time. This example pressure curve demonstrates an initial equalization with a stable curve that does not exhibit any significant decay in pressure. This leak detection analysis can be initiated by the user sending a signal or command from an electronic communication device or a remote computer system. The sequence of this leak detection test begins by closing the water control valve mechanism 310 and then monitoring the pressure (and water flow rate) for a period.

Figure 15B:
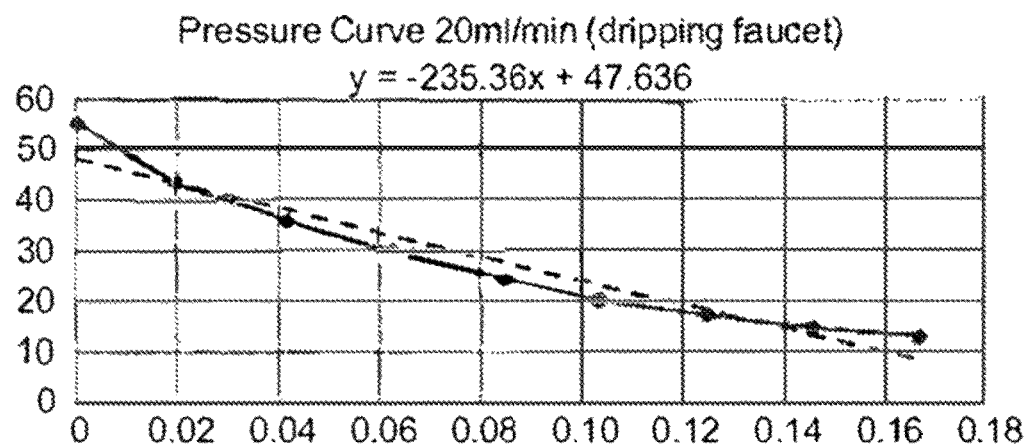
FIG. 15b is an illustration of the pressure drop within a typical 3-bedroom residence having copper plumbing and a pressure regulator wherein the leak is approximately 20 ml/min.

Figure 15B is an illustration of the pressure drop within a typical 3-bedroom residence having copper plumbing and a pressure regulator wherein the leak is approximately 20 ml/min. This test was done as a leak detection analysis where the water central valve mechanism 310 is closed and the pressure measured over time. This example pressure curve shows a gradual decay in pressure, but the small leak (dripping faucet at 20 ml per minute) is clearly visible. This leak detection analysis can be initiated by the user sending a signal or command from an electronic communication device or a remote computer system. The sequence of this leak detection test begins by closing the water central valve mechanism and then monitoring the pressure (and water flow rate) for a period.

Figure 15C:
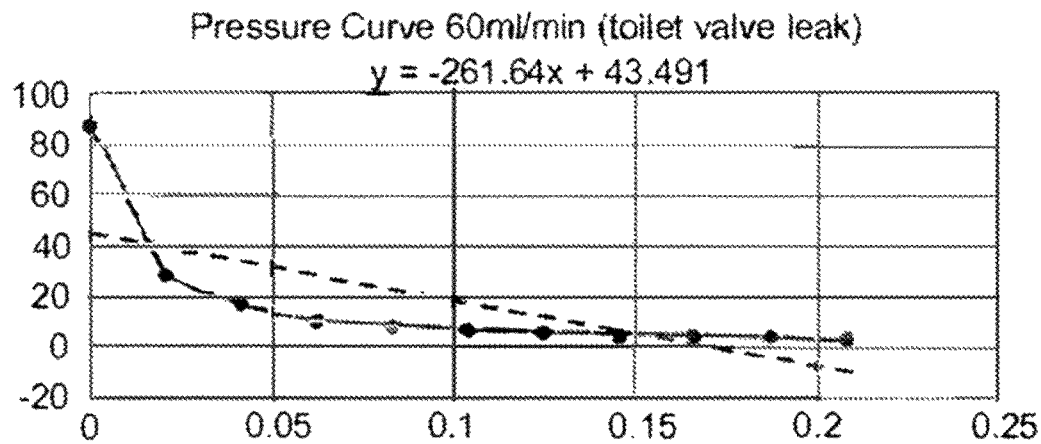
FIG. 15c is an illustration of the pressure drop within a typical 3-bedroom residence having copper plumbing and a pressure regulator wherein the leak is approximately 60 ml/min.

Figure 15C is an illustration of the pressure drop within a typical 3-bedroom residence having copper plumbing and a pressure regulator wherein the leak is approximately 60 ml/min. This test was done as a leak detection analysis where the water control valve mechanism 310 is closed and the pressure measured over time. This example pressure curve shows a steep decline in pressure over time and the large leak (toilet flapper valve leak of 60 ml per minute) is clearly visible. This leak detection analysis can he initiated by the user sending a signal or command from an electronic communication device or a remote computer system. The sequence of this leak detection test begins by closing the water control valve mechanism and then monitoring the pressure (and water flow rate) for a period.

While this invention has been described as having a preferred design, the present invention can be further modified within the spirit and scope of this disclosure. The application is therefore intended to cover any variations, uses, or adaptations of the invention using its general principles. Further, this application is intended to cover such departures from the present disclosure that arise from known or customary practice and the art to which this invention pertains, and which fall within the limits of the appended claims.

The invention claimed is:

1. A water meter and leak detection system comprising:
a base station configured to be installed between a main water supply line for one or more buildings or structures and a water supply from a water source provider;
the base station comprising:
   a) an electrical circuitry including at least one of a CPU, a microprocessor, or a microcontroller, or any combination thereof;
   b) one or more water flow rate sensors or one or more positive displacement water meters configured to sense a water flow through the main water supply line;
   c) a power source configured to be electrically connected to the electrical circuitry;
   d) a memory including instructions that, when executed by at least one of the CPU, the microprocessor, or the microcontroller, or any combination thereof, monitor water data of the one or more buildings or structures, the water data comprising one or more of water flow rates, water flow durations, total water volumes, or water energy uses, or any combination thereof;
   e) one or more wireless communication transceivers, at least one of the one or more wireless communication transceivers is configured to communicate via:
      a wireless network protocol based on IEEE 802.11 standards;
      an infrared light transmission scheme;
      a low-power and long-range chirp spread spectrum modulation technology;
      a network that uses the low-power and long-range chirp spread spectrum modulation technology;
      a wireless technology that transmits over an ultra narrow band;
      an Internet Protocol (IPv6) that uses a sub-1 GHz frequency;
      a network, based on a star, ring, or bus topology network with master and slave devices and specified in EN 13757 standards, that uses operating modes S, T, R, (868 MHz), F (433 MHz), or N (169 MHz);
      a narrowband internet of things (IoT) protocol that uses a low-power wide-area network technology standard by 3GPP for cellular network devices and services;
      a network protocol that uses a differential binary phase-shift keying and a Gaussian frequency shift keying over an ultra narrow band:
      a wireless communication technology based on IEEE 802.16 standards;
      a wireless network configured to provide cloud connectivity for one or more internet of things (IoT) devices and to use smart speakers or bridge devices, or any combination thereof;
      a third-generation wireless mobile telecommunications technology;
      a fourth-generation wireless mobile telecommunications technology, or
      a fifth-generation wireless mobile telecommunications technology;
      or any combination thereof;
wherein the one or more wireless communication transceivers configured to communicate via one or more wireless mobile telecommunications technologies utilize a cellular transceiver configured to download an embedded Subscriber Identity Module (eSIM) code;
wherein at least one of the CPU, the microprocessor, or the microcontroller, or any combination thereof, is configured to monitor for a leak condition and, upon detection of the leak condition, provide an alert or a notification to one or more remote computer systems or one or more electronic communication devices, or any combination thereof;
wherein the one or more wireless communication transceivers are configured to utilize an authentication or an encryption, or any combination thereof, when; transmitting the water data; or receiving a signal or a command; or any combination thereof;
wherein at least one of the one or more wireless communication transceivers is configured to, via an application programming interface (API): (i) transmit the water data from the base station to the one or more remote computer systems; or (ii) receive, from the one or more remote computer systems or from the one or more electronic communication devices communicating through the one or more remote computer systems, the signal or the command to conduct an operational procedure; or any combination thereof.

2. The water meter and leak detection system as recited in claim 1, wherein the application programming interface (API) comprises at least one of: (i) a direct internet message encapsulation, (ii) a simple object access protocol, (iii) an architectural style that sends requests and receives responses using methods to access and process data for different systems via an Internet connection, (iv) a platform that uses a Java development kit to facilitate communication between APPs and external services over a HTTP, (v) a document object module that is written in JavaScript and uses Java to process operations of a web document, (vi) a simple event-driven algorithm for lexing and parsing XML documents, (vii) a bidirectional read/write event-based method for lexing and parsing XML documents, or (vili) an extensible markup language application programming interface, or any combination thereof.

3. The water meter and leak detection system as recited in claim 1, further comprising a water control valve mechanism including a ball valve, a three-way valve, a variable open design valve, a solenoid valve, or a gate valve, or a piston valve, or any combination thereof, the water control valve mechanism is configured to connect with the electrical circuitry.

4. The water meter and leak detection system as recited in claim 3 wherein the base station is configured to receive the signal or the command, from the one or more remote computer systems or the one or more electronic communication devices, to transmit the water data, close or open the water control valve mechanism, or perform a leak detection analysis, or any combination thereof.

5. The water meter and leak detection system as recited in claim 1, wherein the base station is configured to transmit the alert or the notification, in response to detecting the leak condition, to the one or more remote computer systems or the one or more electronic communication devices to inform a user, an owner, or a monitoring facility, or any combination thereof.

6. The water meter and leak detection system as recited in claim 1, further comprising a temperature sensor, the memory further including instructions that, when executed by at least one of the CPU, the microprocessor, or the microcontroller, or any combination thereof, perform, based on temperature data from the temperature sensor that a water temperature approaches a freeze point of 32 degrees Fahrenheit or 0 degrees Celsius: (i) sending a warning or a message to the one or more remote computer systems or the one or more electronic communication devices, or any combination thereof; (ii) communicating with an intelligent thermostat with wireless technology to turn on a heating system for the one or more buildings or structures; or (iii) conducting a water freeze protection procedure including draining the main water supply line or replacing at least a portion of the water in the main water supply line with air, nitrogen, or another gas or liquid having a low freezing point; or anycombination thereof.

7. The water meter and leak detection system as recited in claim 1, wherein the one or more electronic communication devices comprise at least one of a smart cell phone, a mobile phone, a PDA, a tablet, a remote computer, a server, a web portal, an internet capable television, a wireless smartwatch, a remote computer operation center, or another electronic communication apparatus, or any combination thereof.

8. The water meter and leak detection system as recited in claim 1, further comprising an acoustic sensor, the memory further including instructions that, when executed by at least one of the CPU, the microprocessor, or the microcontroller, or any combination thereof, perform, based on acoustic data from the acoustic sensor; (i) monitoring sound patterns and establishing sound signatures to identify one or more water control valves, or (ii) detecting the leak condition, or any combination thereof.

9. The water meter and leak detection system as recited in claim 1, further comprising a communication hub having a second electrical circuitry including: at least one of a second CPU, a second microprocessor, or a second microcontroller, or any combination thereof; one or more second wireless communication transceivers; and a second power source.

10. The water meter and leak detection system as recited in claim 9, wherein the communication hub is configured to: extend a range of the one or more wireless communication transceivers of one or more base stations; or perform as a repeater device; or any combination thereof.

11. The water meter and leak detection system as recited in claim 1, wherein at least one of the CPU, the microprocessor, or the microcontroller, or any combination thereof, and at least one of the one or more wireless communication transceivers enter a sleep mode until awakened by a water flow event, a leak detection analysis, the signal or the command, or the alert or the notification, or any combination thereof.

12. The water meter and leak detection system as recited in claim 10, wherein the one or more second wireless communication transceivers are configured to: (i) perform an authentication pairing procedure to establish a remote wireless communication connection with the one or more wireless communication transceivers; (ii) communicate with the one or more wireless communication transceivers; (iii) communicate with the one or more wireless communication transceivers via a mesh technology, a point-to-point connection, or a peer-to-peer connection, or any combination thereof: or (iv) communicate with one or more access points: or any combination thereof.

13. The water meter and leak detection system as recited in claim 1, further comprising one or more water quality sensors configured to monitor at least one of a pH, a halogen, total dissolved solids, a biological or a fecal contamination, a water hardness, a metallic ion, or any combination thereof.

14. The water meter and leak detection system as recited in claim 3, wherein the one or more electronic communication devices include an application program or an APP that performs (i) presenting historical information of a water use or a water quality, or any combination thereof, (ii) displaying the water use of water use devices, fixtures, or appliances, or any combination thereof, (iii) programming a schedule to turn off or on the water control valve mechanism. (iv) programming the alert or the notification for a water flow rate limit, a water use limit, or a total volume limit, or any combination thereof, (v) setting water measurement units, or (vi) conducting a leak detection analysis, or any combination thereof.

15. The water meter and leak detection system as recited in claim 10, wherein at least one of the one or more wireless communication transceivers or at least one of the one or more second wireless communication transceivers, or any combination thereof is configured to use a blockchain technology to transmit the water data and receive the signal or the command.

16. The water meter and leak detection system as recited in claim 3, further comprising a pressure sensor, the memory further including instructions that, when executed by at least one of the CPU, the microprocessor, or the microcontroller, or any combination thereof, perform, based on pressure data from the pressure sensor: (i) monitoring pressure patterns and establishing pressure signatures, (ii) detecting the leak condition, or (iii) monitoring pressure changes when the base station closes the water control valve mechanism, or any combination thereof.

17. The water meter and leak detection system as recited in claim 10, wherein the one or more wireless communication transceivers of the one or more base stations and the one or more second wireless communication transceivers of one or more communication hubs are configured to form a private network or a corporate network, the private network or the corporate network utilizes the application programming interface (API) when communicating with the one or more remote computer systems.

18. The water meter and leak detection system as recited in claim 17, wherein the one or more wireless communication transceivers, the one or more base stations, the one or more second wireless communication transceivers, the one or more communication hubs, the private network or the corporate network, a commercial cloud service with one or more databases, the application programming interface (API), a remote computer operation center, or the one or more remote computer systems, or any combination thereof, are marketed, sold, leased, supplied, or any combination thereof, as one or more of independent parts, components, services, a total system, or a partial system, or any combination thereof.

19. The water meter and leak detection system as recited in claim 1, wherein at least one of the CPU, the microprocessor, or the microcontroller, or any combination thereof, includes a software program that performs a water use device calibration mode, the water use device calibration mode informs a user to activate a water use device, fixture, or appliance, monitors and records one or more water flow events, and utilizes at least one of a software calculation, an algorithm, or an artificial intelligence, or any combination thereof, to monitor a water pattern and establish a water signature to identify the water use device, fixture, or appliance.

20. The water meter and leak detection system as recited in claim 1, wherein at least one of the CPU, the microprocessor, or the microcontroller, or any combination thereof, includes a software program that performs an automatic learning mode, the automatic learning mode executes a period of self-learning, monitors and records one or more water flow events, and utilizes at least one of a software calculation, an algorithm, or an artificial intelligence, or any combination thereof, to monitor water patterns and establish water signatures to identify water use devices, fixtures, or appliances, or any combination thereof.

* * * * *